United States Patent
Barris et al.

(10) Patent No.: US 6,800,117 B2
(45) Date of Patent: Oct. 5, 2004

(54) FILTRATION ARRANGEMENT UTILIZING PLEATED CONSTRUCTION AND METHOD

(75) Inventors: Marty A. Barris, Lakeville, MN (US); Mark A. Gogins, Roseville, MN (US); Thomas M. Weik, Deephaven, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 20 days.

(21) Appl. No.: 09/871,582

(22) Filed: May 31, 2001

(65) Prior Publication Data

US 2002/0073667 A1 Jun. 20, 2002

Related U.S. Application Data

(60) Provisional application No. 60/230,138, filed on Sep. 5, 2000.

(51) Int. Cl.[7] .......................... B01D 39/16; B01D 46/00
(52) U.S. Cl. ...................... 95/273; 55/385.1; 55/385.3; 55/486; 55/487; 55/498; 55/510; 55/521; 55/527; 55/528
(58) Field of Search ............................. 55/385.3, 482, 55/486, 487, 495, 498, 502, 527, 528, 385.1, 510, 521; 442/36; 95/273

(56) References Cited

U.S. PATENT DOCUMENTS

| | | |
|---|---|---|
| 567,399 A | 9/1896 | Laws |
| 2,835,341 A | 5/1958 | Parker, Jr. |
| 2,980,204 A | 4/1961 | Jordan |
| 3,102,793 A | 9/1963 | Alban |
| 3,236,679 A | 2/1966 | Spiller et al. |
| 3,251,475 A | 5/1966 | Till et al. |
| 3,258,900 A | 7/1966 | Harms |
| 3,360,598 A | 12/1967 | Earnhart |
| 3,565,979 A | 2/1971 | Palmer |
| 3,570,675 A | 3/1971 | Pall et al. |
| 3,689,608 A | 9/1972 | Hollberg et al. |
| 3,745,748 A | 7/1973 | Goldfield et al. |
| 3,755,527 A | 8/1973 | Keller et al. |
| 3,772,136 A | 11/1973 | Workman |
| 3,825,380 A | 7/1974 | Harding et al. |
| 3,839,529 A | 10/1974 | Serres et al. |
| 3,851,023 A | 11/1974 | Brethauer et al. |
| 3,888,610 A | 6/1975 | Brackmann et al. |
| 3,994,258 A | 11/1976 | Simm |
| 4,011,067 A | 3/1977 | Carey, Jr. |
| 4,020,230 A | 4/1977 | Mahoney et al. |

(List continued on next page.)

FOREIGN PATENT DOCUMENTS

| | | |
|---|---|---|
| DE | 299 07 699 U1 | 9/1999 |
| EP | 0 811 412 A1 | 12/1997 |
| EP | 1 048 335 A1 | 11/2000 |
| GB | 745030 | 2/1956 |
| GB | 969327 | 8/1960 |
| WO | WO 99/16532 | 4/1999 |
| WO | WO 00/01737 | 1/2000 |

OTHER PUBLICATIONS

Adanur, S. et al., "Recovery and Reuse of Waster PVC Coated Fabrics. Part 1: Experimental Procedures and Separation of Fabric Components", *Jour. of Coated Fabrics*, Vol. 28, pp. 37–55 (Jul. 1998).

(List continued on next page.)

*Primary Examiner*—Duane Smith
*Assistant Examiner*—Jason M. Greene
(74) *Attorney, Agent, or Firm*—Merchant & Gould P.C.

(57) ABSTRACT

Filter arrangements include a barrier media, usually pleated, treated with a deposit of fine fibers. The media is particularly advantageous at high temperature (greater than 140° F.) systems. Such systems may include engine systems and fluid compressor systems. Filter arrangements may take the form of tubular, radially sealing elements; tubular, axial sealing elements; forward flow air cleaners; reverse flow air cleaners; and panel filters.

100 Claims, 33 Drawing Sheets

U.S. PATENT DOCUMENTS

| | | |
|---|---|---|
| 4,020,783 A | 5/1977 | Anderson et al. |
| 4,135,899 A | 1/1979 | Gauer |
| 4,143,196 A | 3/1979 | Simm et al. |
| 4,148,595 A | 4/1979 | Bednarz |
| 4,210,615 A | 7/1980 | Engler et al. |
| 4,215,682 A | 8/1980 | Kubik et al. |
| 4,223,101 A | 9/1980 | Fine et al. |
| 4,230,650 A | 10/1980 | Guignard |
| 4,242,115 A | 12/1980 | Harold et al. |
| 4,261,710 A | 4/1981 | Sullivan |
| 4,278,623 A | 7/1981 | Niegisch |
| 4,290,987 A | 9/1981 | Soehngen et al. |
| 4,323,525 A | 4/1982 | Bornat |
| 4,331,459 A | 5/1982 | Copley |
| 4,340,479 A | 7/1982 | Pall |
| 4,350,509 A | 9/1982 | Alseth et al. |
| 4,359,330 A | 11/1982 | Copley |
| 4,364,751 A | 12/1982 | Copley |
| 4,370,290 A | 1/1983 | Makino et al. |
| 4,468,428 A | 8/1984 | Early et al. |
| 4,507,203 A | 3/1985 | Johnston |
| 4,650,506 A | 3/1987 | Barris et al. |
| 4,689,186 A | 8/1987 | Bornat |
| 4,720,292 A | 1/1988 | Engel et al. |
| 4,824,451 A | 4/1989 | Vogt et al. |
| 4,826,519 A | 5/1989 | Miyagi et al. |
| 4,842,505 A | 6/1989 | Annis et al. |
| 4,842,924 A | 6/1989 | Farris et al. |
| 4,874,399 A | 10/1989 | Reed et al. |
| 4,900,671 A | 2/1990 | Pokora et al. |
| 4,915,886 A | 4/1990 | Repetti et al. |
| 4,929,502 A | 5/1990 | Giglia |
| 4,992,515 A | 2/1991 | Ballard |
| 5,030,264 A | 7/1991 | Klotz et al. |
| 5,082,476 A | 1/1992 | Kahlbaugh et al. |
| 5,104,537 A | 4/1992 | Stifelman et al. |
| 5,112,372 A | 5/1992 | Boeckermann et al. |
| 5,125,941 A | 6/1992 | Ernst et al. |
| 5,203,201 A | 4/1993 | Gogins |
| 5,238,474 A | 8/1993 | Kahlbaugh et al. |
| 5,238,735 A | 8/1993 | Nagou et al. |
| 5,273,565 A | 12/1993 | Milligan et al. |
| 5,364,456 A | 11/1994 | Kahlbaugh et al. |
| 5,401,285 A | 3/1995 | Gillingham et al. |
| 5,411,576 A | 5/1995 | Jones et al. |
| 5,472,481 A | 12/1995 | Jones et al. |
| 5,494,497 A | 2/1996 | Lee |
| 5,496,507 A | 3/1996 | Angadjivand et al. |
| 5,613,992 A | 3/1997 | Engel |
| 5,672,399 A | 9/1997 | Kahlbaugh et al. |
| 5,740,774 A | 4/1998 | Kennedy |
| 5,759,217 A | 6/1998 | Joy |
| 5,762,665 A | 6/1998 | Abrahamian et al. |
| 5,820,646 A | 10/1998 | Gillingham et al. |
| 5,843,442 A | 12/1998 | Soule et al. |
| 5,853,442 A | 12/1998 | Glen et al. |
| 5,863,701 A | 1/1999 | Mertesdorf |
| 5,895,510 A | 4/1999 | Butler et al. |
| 5,902,361 A | 5/1999 | Pomplun et al. |
| 5,908,598 A | 6/1999 | Rousseau et al. |
| 5,919,847 A | 7/1999 | Rousseau et al. |
| 5,954,849 A | 9/1999 | Berkhoel et al. |
| 5,968,635 A | 10/1999 | Rousseau et al. |
| D416,308 S | 11/1999 | Ward et al. |
| 5,976,208 A | 11/1999 | Rousseau et al. |
| 5,993,580 A | 11/1999 | Nakayama et al. |
| 6,002,017 A | 12/1999 | Rousseau et al. |
| 6,048,661 A | 4/2000 | Nishi et al. |
| 6,051,042 A | 4/2000 | Coulonvaux |
| D425,189 S | 5/2000 | Gillingham et al. |
| 6,068,799 A | 5/2000 | Rousseau et al. |
| 6,090,173 A | 7/2000 | Johnson et al. |
| 6,099,606 A | 8/2000 | Miller et al. |
| 6,110,249 A | 8/2000 | Medcalf et al. |
| 6,123,751 A | 9/2000 | Nelson et al. |
| 6,395,046 B1 | 5/2002 | Emig et al. |

OTHER PUBLICATIONS

Angelo, R. et al., "Preparation and Characterization of Selectively Isotopically Labeled Nylon 66 Polymers,", *Macromolecules,* Vol. 22. pp. 117–121 (1989).

Basatkar, P. et al., "Synthesis and Characterization of Phenylated Aromatic Poly(amide–amides)s", *Jour. of Applied Polymer Science,* Vol. 68, pp. 1523–1530 (1998).

Baumgarten, P., "Electrostatic Spinning of Acrylic Microfibers", *Jour. of Colloid and Interface Science* Vol. 36, No. 1, 9 pages (May 1971).

Benavente, J. et al., "Electrical Properties of Modified Aromatic Polyamide Membranes", *Separation Science and Technology,* Vol. 32, No. 13, pp 2189–2199 (1997).

Bognitzki, M. et al., "Polymer, Metal and Hybrid Nano–and Mesotubes by Coating of Degradable Polymer Template Fibers (Turf–process)", Philipps–University Marburg, Department of Chemistry, Mainz, Germany, pp. 45 and 46 (Date Unknown).

Bognitzki, M. et al., "Submicrometer Shaped Polylactide Fibers by Electrospinning", Philipps–University Marburg, Department of Chemistry, Mainz, Germany, pp. 115 and 116 (Date Unknown).

Chun, I. et al., "Carbon Nanofibers from Polyacrylonitrile and Mesophase Pitch" *Jour. of Advanced Materials,* Vol. 31, No. 1, pp. 36–41 (Jan. 1999).

Deitzel, J. et al., "Generation of Polymer Nanofibers Through Electrospinning", *Army Research Labm. Aberdeen Providing Ground,* MD 21005–5066, ARL–TR–1898, pp 1–36 (Jun. 1999).

Dhawan, S. et al., Conducting Fabrics as a Shield Against Electromagnetic Interference (EMI), *Jour. of Coated Fabrics,* Vol. 28, pp. 29–36 (Jul. 1998).

Donaldson* Brochure, Ultra–Wch* "Premium QualityHigh Efficiency Filters", 4 pp. (1994).

Donaldson Brochure, Donaldson* Gas Turbine Systems, DZ2000™ Panel Fibers with Spider–Web & Filter Media, 4 pp. (1997).

Donaldson* High Purity Products Brochure, "High Efficiency Cleanroom Filters", 4 pp. (1997).

Donaldson Brochure, Eon™ Fine Fiber Technology by Donaldson, 6 pp. (1999).

Donaldson® Brochure, Tech Topics, "Do Spider–Web Replacement Filters Really 'Cost' Extra? Analysis Shows How Savings from High Performance Far Outweigh a Premium Price", 2 pp. (Jul. 1999).

Donaldson Brochure, ". . . the air inside your cab is like the prairie in springtime!", 2 pp. (before Sep. 5, 2000).

Donaldson® Brochure, Filtration Solutions for Gas Turbines, Generators, and Compressors, "DZ2000 Air Filter Media, The Longer Life, Higher Value Filter media for Fas Turbine Inlet Air filter Systems", 4 pp.s (Dec. 2000).

Doshi, J., "The Electrospinning Process and Applications of Electrospun Fibers", *UMI Dissertation Services* University of Akron, pp. 1–170, including sections (Aug. 1994).

Fang, X., "Application of Electrospinning for Polymers", *UMI Dissertation Services,* University of Akron, pp. 1168, including sections (Aug. 1997).

Gibson, P. et al., "Electrospinning Technology: Direct Application of Tailorable Ultrathin Membranes", Jour. of Coated Fabrics, Vol. 28, pp. 63–72 (Jul. 1998).

Giessmann, A. et al., "Multipurpose Production Line for the Coated Textile Industry", Jour. of Coated Fabrics, Vol. 28, pp. 56–79 (Jul. 1998).

Huang, M. et al., "The Modification of Nylon 6 by a Phenol–Formaldehyde Resin", Jour. of Applied Polymer Science, Vol. 48, pp. 563–572 (1993).

Huang, R. et al., "Crosslinked Blended Poly(vinyl alcohol)/N–Methylol Nylon–6 Membranes for the Prevaporation Separation of Ethanol–Water Mixtures", Jour. of Applied Polymer Science, Vol. 70, pp. 317–327 (1998).

Huang, I. "Modification of Nylon 6 by Phenol–Coating Polymers" Jour. of Applied Polymer Science, Vol. 73, pp. 295–300 (1999).

Kim, J. et al., "Polybenzimidazole Nanofiber Produced by Electrospinning", Polymer Engineering and Science Vol. 39, No. 5, pp. 849–854 (May 1999).

Kirichenko, V. et al., "Acceleration of a Free Jet of Low-conducting Liquid in an Electric Field", Sov. Phys. Dokl, Vol. 35, No. 12, pp. 564–566 (Dec. 1990).

Kirichenko, V. et al., "Charge Transfer due to the Electrohydrodynamic Atomization of a Liquid", Sov. Phys. Dokl., Vol. 33, No. 8, pp. 564–566 (Aug. 1988).

Kirchenko, V. et al., "Domains of Existence of Free, Stationary Liquid Jets in a Strong External Electric Field", Sov. Phys. Dokl., Vol. 32, No. 7, pp. 544–547 (Jul. 1987).

Kirichenko, V. et al., "Gas Flow and Filtration Through Permeable Channel Walls", Phys. Dokl, Vol. 38, No. 4, pp. 1391–41 (Apr. 1993).

Kirichenko, V. et al., "Shape of a Free, Stationary Liquid Jet in a Strong Uniform Electric Field", Sov. Phys. Dokl. Vol. 32, No. 7, pp. 546–547 (Jul. 1987).

Kirichenko, V. et al., "Specific Charge of the Liquid in Electrohydrodynamic Atomization and Microfilament Forming Processes", Sov. Phys. Dokl. Vol. 35, No. 12, pp. 10154020 (Dec. 1990).

Kirichenko, V. et al., "Transverse Splitting of a Liquid Jet in a Strong Electric Field", Sov. Phys. Dokl., Vol. 33, No. 9, pp. 653–654 (Sep. 1988).

Mahajan, S. et al. "Fibrillation Behavior of Oriented Tapes of Polyethylene and Its Blends, IV", Jour. of Applied Polymer Science, Vol. 60, pp. 1551–1560 (1996).

Margnissen, J., "Electrosprays with Application in Aerosol Technology and Material Synthesis", 1994 International Aerosol.

Conference Tutorial Sessions, Los Angeles, Calif. pp. 1–67 (Aug. 29, 1994).

Maslowski, E. et al., "New Processes for Fiber–Like PE Structures", Fiber World, pp. 12–14 (March 1987).

National Textile Center, "Electrostatic Spinning and Properties of Ultrafine Fibers", http://www.ntcresearch.org/currently/year8/M98-DO1.htm, last updated 05/19/1999, pp. 1–4.

Ohzawa, Y. et al., "Studies on Dry Spinning, I. Fundamental Equations", Jour. of Applied Polymer Science Vol. 13, pp. 257–283 (1969).

Ohzawa, Y. et al., "Studies on Dry Spinning, II. Numerical Solutions for Some Polymer–Solvent Systems Based on the Assumption that Drying is Controlled by Boundary–Layer Mass Transfer" Jour. of Applied Polymer Science, Vol. 14, pp 1879–1899 (1970).

Petryanov, I. et al., "Adhesion of Finely Dispersed Particles to the Surface of Coating Materials", Translated from Doklady Akademii Nauk SSSR, Vol. 288, No. 5, pp. 515–51, Original Article submitted Jul. 3, 1985.

SBCCOM–Natick Public Afters, "Army Teams with Universities to Develop Electrospun Membranes and Fabrics for Soldier Protection", http://www.Natick.army.mil/pao/1998/98-26.htm, last updated 0/27/00, pp. 1–2.

Shambaugh, R., "A Macroscopic View of the Melt–Blowering Process for Producing Microfibers", Ind. Eng. Chem. Res., Vol. 27, No. 12, pp. 2363–2372 (1988).

Shepelev, A. et al., "Polymeric Fiber Materials for Fine Cleaning of Gases", J. Aerosol Sci. Suppl. 1, Vol. 26, pp. 59195920, (1995).

Shieh, J. et al., "Preparation of N–Methylol Nylon–6 Membranes for Pervaporation of Ethanol–Water Mixtures" Department of Chemical Engineering University of Waterloo, Ontario N2L 3G1, Canada, pp. 855–863 (Received Jun. 24, 1996).

Stone, J., "The Coating Company of the Future", Jour. of Coated Fabrics, Vol. 28, pp. 73–79 (Jul. 1998).

Smith, J., "Cellulose Acetate Fibres: a Fibrillated Pulp with High Surface Area", Tappi Journal, pp. 185–193 (Dec. 1988).

Smith, R. et al., "Phase Behavior and reaction of Nylon 6/6 in Water at High Temperatures and Pressures" Jour. of Applied Polymer Science, Vol. 76, pp. 1062–1073 (2000).

"Survey of Soluble Polyamide Parents", RT–2488–R, pp 1–6 (Oct. 14, 1954).

Taylor, G., Viscosity And Molecular Weight of Nylon, "The Relation of the Viscosity of Nylon Solutions in Formic Acid to Molecular Weight as Determined by End–Group Measurements", Contribution From The Chemical Department, Experimental Station, E. I. Du Pont De Nemours & Company, pp. 635–637 (Mar. 1947).

Wadsworth, L. et al., "Development of Highly Breathable and Effective Blood/Viral Barrier Laminates of Microporous Films, Staple Fibers and Nonwovens", Jour. of Coated Fabrics, Vol. 28, pp. 12–28 (Jul. 1998).

Wang, F. et al., "Hydrogen Bonding in Polyamide Toughened Novolac Type Phenolic Resin", Jour. of Applied Polymer Science Vol. 74, pp. 2283–2289 (1999).

Wang, H. et al., "Synthesis and Properties of Nylon 6 Modified with Various Aromatic Polyamides" Jour. of Applied Polymer Science, Vol. 68, pp. 1031–1043 (1998).

Wente, V., "Superfine Thermoplastic Fibers", Industrial And Bio_Chemistry, Naval Research Laboratory, Washington 25, D.C., Vol. 48, No. 8, pp 1342–1346 (Aug. 1986).

Declaration of Doug Crofoot with Exhibits A and B, dated Sep. 10, 2001.

Copy of the Supplemental Declaration of Douglas G. Crofoot filed in U.S Patent Application Serial No. 09/871,156.*

* cited by examiner

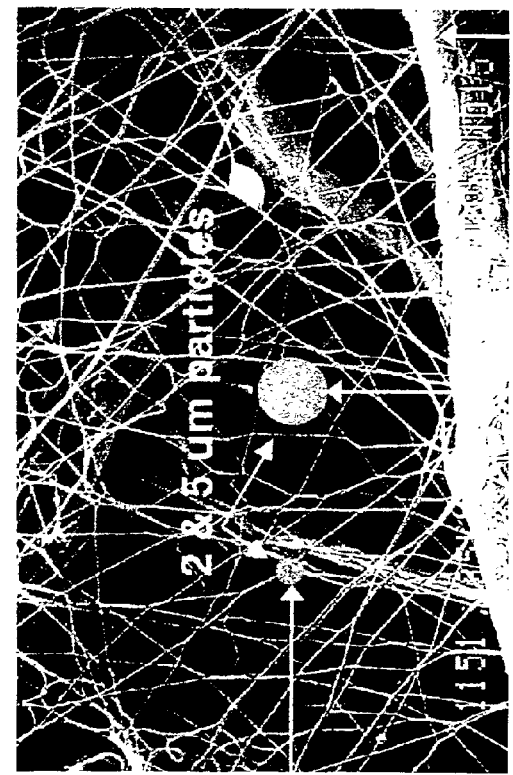
FIG. 3A Cellulose Media
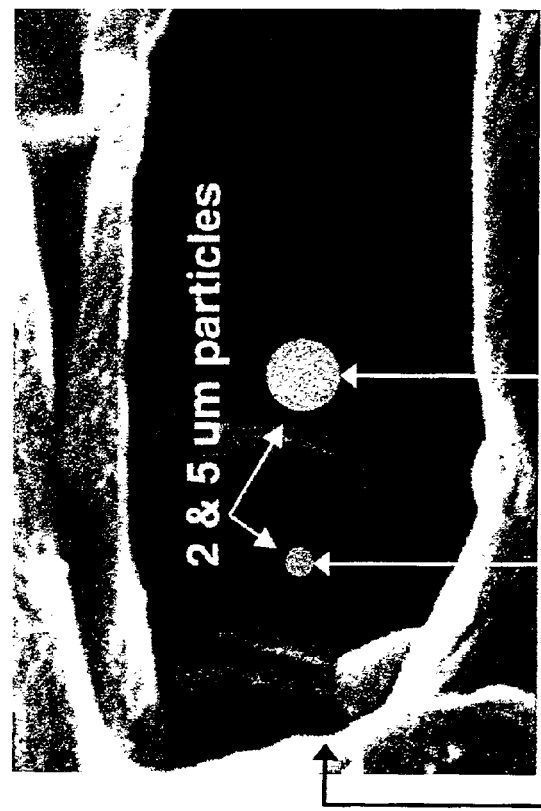
FIG. 3B Ultra-Web
2,000 X Scanning Electron Microscope Images

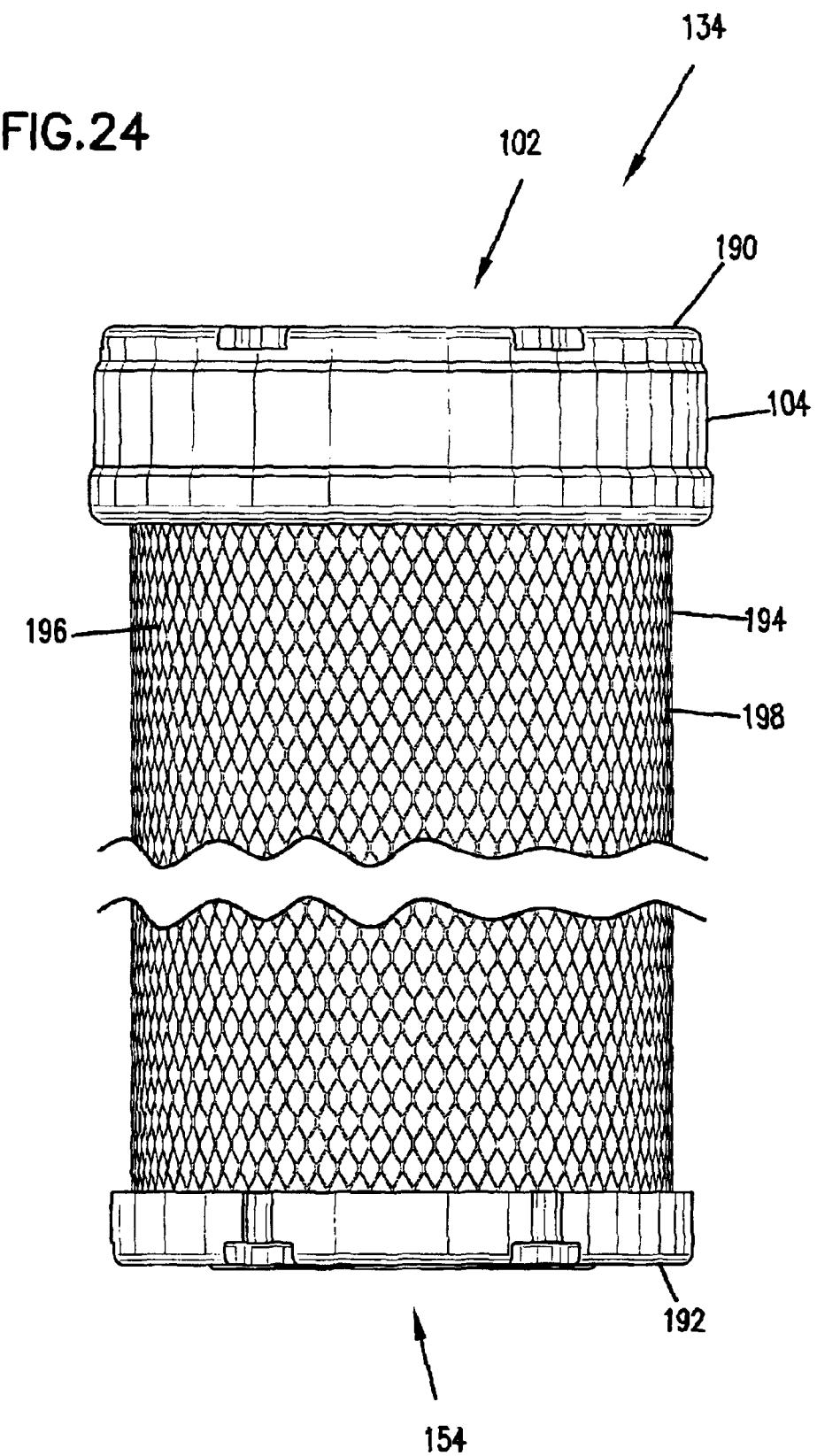

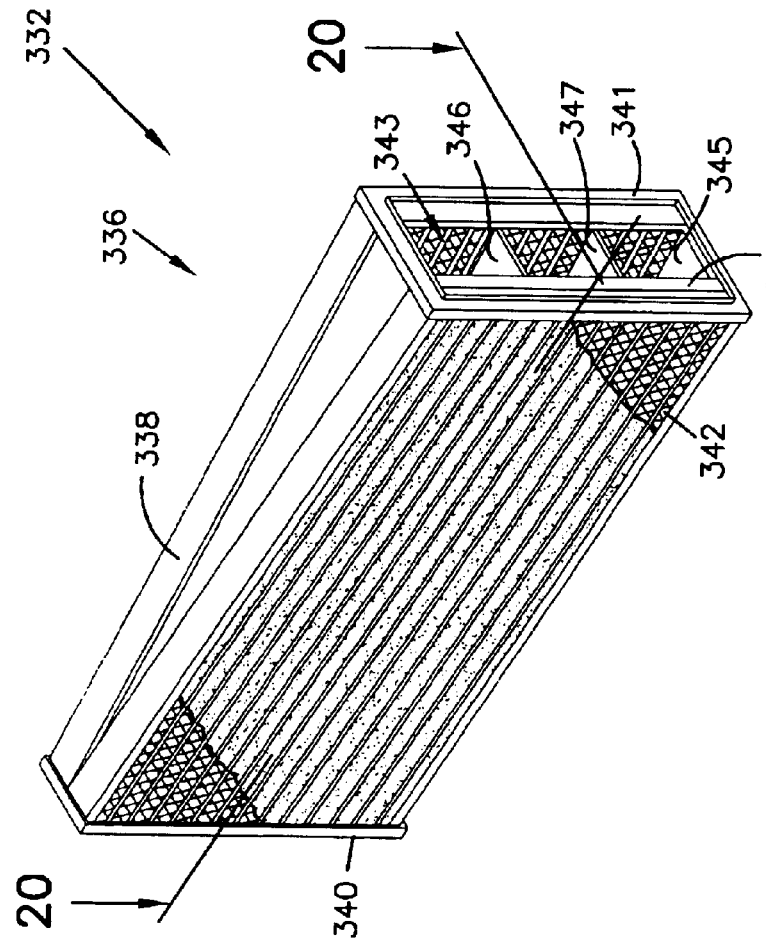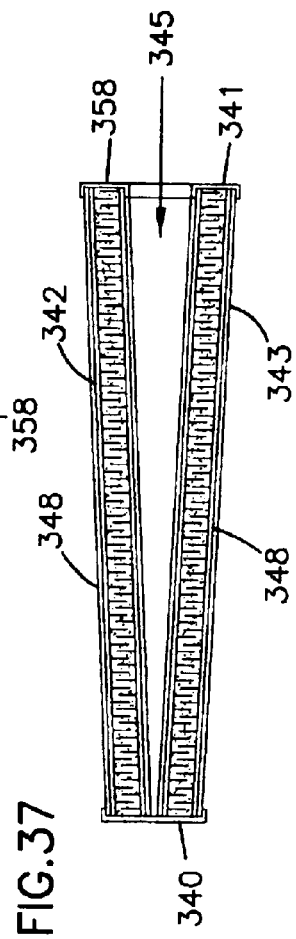

FILTRATION ARRANGEMENT UTILIZING PLEATED CONSTRUCTION AND METHOD

RELATED APPLICATION

This application claims priority under 35 U.S.C. §119(e) to U.S. provisional application Ser. No. 60/230,138, filed on Sep. 5, 2000, incorporated by reference herein.

FIELD OF THE INVENTION

The present invention relates to a filter arrangement and filtration method. More specifically, it concerns an arrangement for filtering particulate material from a gas flow stream, for example, an air stream. The invention also concerns a method for achieving the desirable removal of particulate material from such a gas flow stream.

The present invention is an on-going development of Donaldson Company Inc., of Minneapolis, Minn., the assignee of the present invention. The disclosure concerns continuing technology development related, in part, to the subjects characterized in U.S. Pat. Nos.: B2 4,720,292; Des 416,308; 5,613,992; 4,020,783; and 5,112,372. Each of the patents identified in the previous sentence is also owned by Donaldson, Inc., of Minneapolis, Minn.; and, the complete disclosure of each is incorporated herein by reference.

The invention also relates to polymer material and fiber that can be manufactured with improved environmental stability to heat, humidity, reactive materials and mechanical stress. Such materials can be used in the formation of fine fibers such as microfibers and nanofiber materials with improved stability and strength. As the size of fiber is reduced the survivability of the materials is increasingly more of a problem. Such fine fibers are useful in a variety of applications. In one application, filter structures can be prepared using this fine fiber technology. The techniques described concern structures having one or more layers of fine fibers in the filter media. The structure, composition and fiber size are selected for a combination of properties and survivability.

BACKGROUND OF THE INVENTION

Gas streams often carry particulate material therein. In many instances, removal of some or all of the particulate material from a gas flow stream is essential. For example, air intake streams to engines for motorized vehicles or power generation equipment, gas streams directed to gas turbines, and air streams to various combustion furnaces, often include particulate material. The particulate material can cause substantial damage to operating equipment. The particulate is preferably removed from the gas flow upstream of the engine, turbine, furnace or other equipment.

In other instances, production gases or off gases may contain particulate material, for example, those generated by processes that included milling, chemical processing, sintering, painting, etc. Before such gases can be, or should be, directed through various downstream equipment and/or to the atmosphere, a substantial removal of particulate material from those streams is important.

The invention relates to filter elements in structures and to improved filter technology. The invention also relates to polymeric compositions with improved properties that can be used in a variety of related applications including the formation of fibers, microfibers, nanofibers, fiber webs, fibrous mats, permeable structures such as membranes, coatings or films. The polymeric materials of the invention are compositions that have physical properties that permit the polymeric material, in a variety of physical shapes or forms, to have resistance to the degradative effects of humidity, heat, air flow, chemicals and mechanical stress or impact in filtration structures and methods.

In making non-woven fine fiber filter media, a variety of materials have been used including fiberglass, metal, ceramics and a wide range of polymeric compositions. A variety of techniques have been used for the manufacture of small diameter micro- and nanofibers. One method involves passing the material through a fine capillary or opening either as a melted material or in a solution that is subsequently evaporated. Fibers can also be formed by using "spinnerets" typical for the manufacture of synthetic fiber such as nylon. Electrostatic spinning is also known. Such techniques involve the use of a hypodermic needle, nozzle, capillary or movable emitter. These structures provide liquid solutions of the polymer that are then attracted to a collection zone by a high voltage electrostatic field. As the materials are pulled from the emitter and accelerate through the electrostatic zone, the fiber becomes very thin and can be formed in a fiber structure by solvent evaporation.

As more demanding applications are envisioned for filtration media, significantly improved materials are required to withstand the rigors of high temperature 100° F. to 250° F. and up to 300° F., high humidity 10% to 90% up to 100% RH, high flow rates of both gas and liquid, and filtering micron and submicron particulates (ranging from about 0.01 to over 10 microns) and removing both abrasive and non-abrasive and reactive and non-reactive particulate from the fluid stream.

Accordingly, a substantial need exists for polymeric materials, micro- and nanofiber materials and filter structures that provide improved properties for filtering streams with higher temperatures, higher humidities, high flow rates and said micron and submicron particulate materials.

SUMMARY OF THE INVENTION

Herein, general techniques for the design and application of air cleaner arrangements are provided. The techniques include preferred filter element design, as well as the preferred methods of application and filtering.

In general, the preferred applications concern utilization, within an air filter, of barrier media, typically pleated media, and fine fibers, to advantage.

The filter media includes at least a micro- or nanofiber web layer in combination with a substrate material in a mechanically stable filter structure. These layers together provide excellent filtering, high particle capture, efficiency at minimum flow restriction when a fluid such as a gas or liquid passes through the filter media. The substrate can be positioned in the fluid stream upstream, downstream or in an internal layer. A variety of industries have directed substantial attention in recent years to the use of filtration media for filtration, i.e. the removal of unwanted particles from a fluid such as gas or, in certain instances, liquid. The common filtration process removes particulate from fluids including an air stream or other gaseous stream or from a liquid stream such as a hydraulic fluid, lubricant oil, fuel, water stream or other fluids. Such filtration processes require the mechanical strength, chemical and physical stability of the microfiber and the substrate materials. The filter media can be exposed to a broad range of temperature conditions, humidity, mechanical vibration and shock and both reactive and non-reactive, abrasive or non-abrasive particulates entrained in the fluid flow. Further, the filtration media often require the self-cleaning ability of exposing the filter media to a reverse pressure pulse (a short reversal of fluid flow to remove surface coating of particulate) or other cleaning mechanism that can remove entrained particulate from the surface of the filter media. Such reverse cleaning can result in substantially improved (i.e.) reduced pressure drop after the pulse cleaning. Particle capture efficiency typically is not improved after pulse cleaning, however pulse cleaning will reduce pressure drop, saving energy for filtration operation. Such filters can often be removed for service and cleaned in aqueous or non-aqueous cleaning compositions. Such media are often manufactured by spinning fine fiber and then forming a layer, a web or an interlocking web of microfiber on a porous substrate. In the spinning process the fiber can form physical bonds between fibers to interlock or integrate the layer and to secure the fiber mat into a layer. Such a material can then be bonded to a substrate, and fabricated into the desired filter format such as cartridges, flat disks, canisters, panels, bags and pouches. Within such structures, the media can be substantially pleated, rolled or otherwise positioned on support structures. The filter arrangements described herein can be utilized in a wide variety of applications including: equipment enclosures, vehicle cabin ventilation, cabin air filters, on-road and off-road engines; and, industrial equipment, such as compressors and other related applications.

BRIEF DESCRIPTION OF THE DRAWINGS

FIG. 3 is a depiction of the typical internal structure of a support material and a separate depiction of the fine fiber material of the invention compared to small, i.e. 2 and 5 micron particulate materials.

FIG. 24 is a side elevational, fragmented view of the safety element depicted in FIG. 21.

FIG. 36 is a perspective view of a filter assembly (V-pack) utilized in the air filter arrangement of FIG. 37.

FIG. 37 is a cross-sectional view of the filter assembly taken along the line 20—20 in FIG. 36.

DETAILED DESCRIPTION OF THE INVENTION

Figure 1:
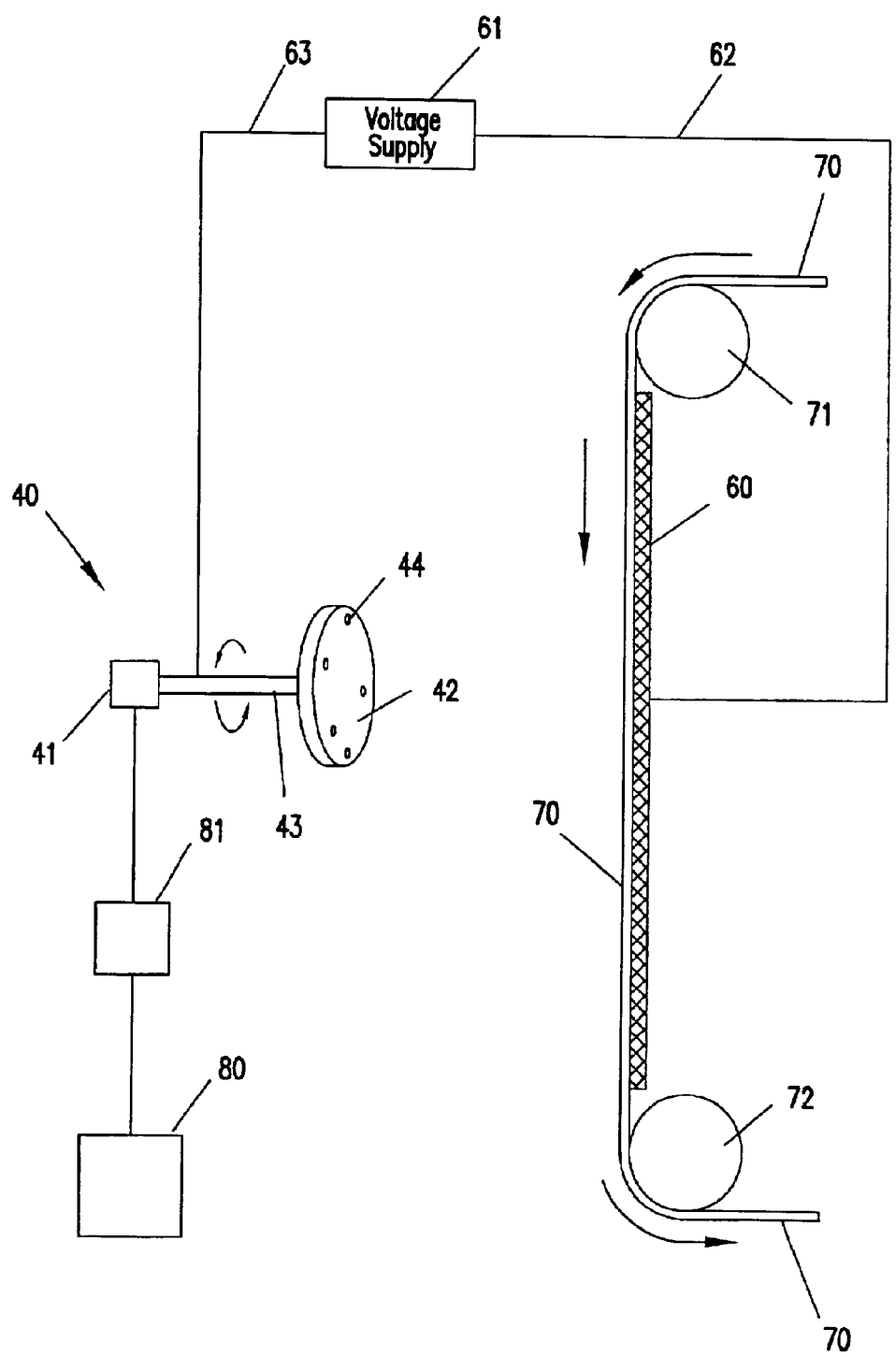
FIG. 1 depicts a typical electrostatic emitter driven apparatus for production of the fine fibers of the invention.

A. Microfiber or Fine Fiber Polymeric Materials

The invention provides an improved polymeric material. This polymer has improved physical and chemical stability. The polymer fine fiber, with a diameter of 200 nanometers to 10 microns, (microfiber and nanofiber) can be fashioned into useful product formats (e.g., when formed onto a substrate). Nanofiber is a fiber with diameter less than 200 nanometer or 0.2 micron. Microfiber is a fiber with diameter larger than 0.2 micron, but not larger than 10 microns. This fine fiber can be made in the form of an improved multi-layer microfiltration media structure. The fine fiber layers of the invention comprise a random distribution of fine fibers which can be bonded to form an interlocking net.

Filtration performance is obtained largely as a result of the fine fiber barrier to the passage of particulate. Structural properties of stiffness, strength, pleatability are provided by the substrate to which the fine fiber adhered. The fine fiber interlocking networks have as important characteristics, fine fibers in the form of microfibers or nanofibers and relatively small openings, orifices or spaces between the fibers. Such spaces typically range, between fibers, of about 0.01 to about 25 microns or often about 0.1 to about 10 microns.

The filter products comprise a fine fiber layer formed on a substrate. Fibers from synthetic, natural sources (e.g., polyester and cellulose layers) are thin, appropriate substrate choices. The fine fiber adds less than a micron in thickness to the overall fine fiber plus substrate filter media. In service, the filters can stop incident particulate from passing through the fine fiber layer and can attain substantial surface loadings of trapped particles. The particles comprising dust or other incident particulates rapidly form a dust cake on the fine fiber surface and maintains high initial and overall efficiency of particulate removal. Even with relatively fine contaminants having a particle size of about 0.01 to about 1 micron, the filter media comprising the fine fiber has a very high dust capacity.

The polymer materials as disclosed herein have substantially improved resistance to the undesirable effects of heat, humidity, high flow rates, reverse pulse cleaning, operational abrasion, submicron particulates, cleaning of filters in use and other demanding conditions. The improved microfiber and nanofiber performance is a result of the improved character of the polymeric materials forming the microfiber or nanofiber. Further, the filter media of the invention using the improved polymeric materials of the invention provides a number of advantageous features including higher efficiency, lower flow restriction, high durability (stress related or environmentally related) in the presence of abrasive particulates and a smooth outer surface free of loose fibers or fibrils. The overall structure of the filter materials provides an overall thinner media allowing improved media area per unit volume, reduced velocity through the media, improved media efficiency and reduced flow restrictions.

The fine fiber can be made of a polymer material or a polymer plus additive. One preferred mode of the invention is a polymer blend comprising a first polymer and a second, but different polymer (differing in polymer type, molecular weight or physical property) that is conditioned or treated at elevated temperature. The polymer blend can be reacted and formed into a single chemical specie or can be physically combined into a blended composition by an annealing process. Annealing implies a physical change, like crystallinity, stress relaxation or orientation. Preferred materials are chemically reacted into a single polymeric specie such that a Differential Scanning Calorimeter analysis reveals a single polymeric material. Such a material, when combined with a preferred additive material, can form a surface coating of the additive on the microfiber that provides oleophobicity, hydrophobicity or other associated improved stability when contacted with high temperature, high humidity and difficult operating conditions. The fine fiber of the class of materials can have a diameter of about 0.01 to 5 microns. Such microfibers can have a smooth surface comprising a discrete layer of the additive material or an outer coating of the additive material that is partly solubilized or alloyed in the polymer surface, or both. Preferred materials for use in the blended polymeric systems include nylon 6; nylon 66; nylon 6-10; nylon (6-66-610) copolymers and other linear generally aliphatic nylon compositions. A preferred nylon copolymer resin (SVP-651) was analyzed for molecular weight by the end group titration. (J. E. Walz and G. B. Taylor, determination of the molecular weight of nylon, Anal. Chem. Vol. 19, Number 7, pp 448–450 (1947). A number average molecular weight ($M_n$) was between 21,500 and 24,800. The composition was estimated by the phase diagram of melt temperature of three component nylon, nylon 6 about 45%, nylon 66 about 20% and nylon 610 about 25%. (Page 286, Nylon Plastics Handbook, Melvin Kohan ed. Hanser Publisher, New York (1995)).

Reported physical properties of SVP 651 resin are:

| Property | ASTM Method | Units | Typical Value |
| --- | --- | --- | --- |
| Specific Gravity | D-792 | — | 1.08 |
| Water Absorption (24 hr immersion) | D-570 | % | 2.5 |
| Hardness | D-240 | Shore D | 65 |
| Melting Point | DSC | °C.(° F.) | 154 (309) |
| Tensile Strength @ Yield | D-638 | MPa (kpsi) | 50 (7.3) |
| Elongation at Break | D-638 | % | 350 |
| Flexural Modulus | D-790 | MPa (kpsi) | 180 (26) |
| Volume Resistivity | D-257 | ohm-cm | $10^{12}$ |

A polyvinylalcohol having a hydrolysis degree of from 87 to 99.9+ % can be used in such polymer systems. These are preferably cross linked by physical or chemical agents. These PVOH polymers are most preferably crosslinked and combined with substantial quantities of the oleophobic and hydrophobic additive materials.

Another preferred mode of the invention involves a single polymeric material combined with an additive composition to improve fiber lifetime or operational properties. The preferred polymers useful in this aspect of the invention include both condensation polymers and additive polymers such as nylon polymers, polyvinylidene chloride polymers, polyvinylidene fluoride polymers, polyvinylalcohol polymers and, in particular, those listed materials when combined with strongly oleophobic and hydrophobic additives that can result in a microfiber or nanofiber with the additive materials formed in a coating on the fine fiber surface. Again, blends of similar polymers such as a blend of similar nylons, similar polyvinylchloride polymers, blends of polyvinylidene chloride polymers are useful in this invention. Further, polymeric blends or alloys of differing polymers are also contemplated by the invention. In this regard, compatible mixtures of polymers are useful in forming the microfiber materials of the invention. Additive composition such a fluoro-surfactant, a nonionic surfactant, low molecular weight resins (e.g.) tertiary butylphenol resin having a molecular weight of less than about 3000 can be used. The resin is characterized by oligomeric bonding between phenol nuclei in the absence of methylene bridging groups. The positions of the hydroxyl and the tertiary butyl group can be randomly positioned around the rings. Bonding between phenolic nuclei always occurs next to hydroxyl group, not randomly. Similarly, the polymeric material can be combined with an alcohol soluble non-linear polymerized resin formed from bis-phenol A. Such material is similar to the tertiary butylphenol resin described above in that it is formed using oligomeric bonds that directly connect aromatic ring to aromatic ring in the absence of any bridging groups such as alkylene or methylene groups.

A particularly preferred material of the invention comprises a microfiber material having a dimension of about 0.001 to 10 microns. A preferred fiber size range between 0.05 to 0.5 micron. Depending on end use and pulse cleaner or cleaning options, the fiber may be selected from 0.01 to 2 microns fiber, from 0.005 to 5 microns fiber or from 0.1 to 10 microns fiber. Such fibers with the preferred size provide excellent filter activity, ease of back pulse cleaning and other aspects. The highly preferred polymer systems of the invention have adhering characteristic such that when contacted with a cellulosic substrate adheres to the substrate with sufficient strength such that it is securely bonded to the substrate and can resist the delaminating effects of a reverse pulse cleaning technique and other mechanical stresses. In such a mode, the polymer material must stay attached to the substrate while undergoing a pulse clean input that is substantially equal to the typical filtration conditions except in a reverse direction across the filter structure. Such adhesion can arise from solvent effects of fiber formation as the fiber is contacted with the substrate or the post treatment of the fiber on the substrate with heat or pressure. However, polymer characteristics appear to play an important role in determining adhesion, such as specific chemical interactions like hydrogen bonding, contact between polymer and substrate occurring above or below Tg, and the polymer formulation including additives. Polymers plasticized with solvent or steam at the time of adhesion can have increased adhesion.

An important aspect of the invention is the utility of such microfiber or nanofiber materials formed into a filter structure. In such a structure, the fine fiber materials of the invention are formed on and adhered to a filter substrate. Natural fiber and synthetic fiber substrates, like spun bonded fabrics, non-woven fabrics of synthetic fiber and non-wovens made from the blends of cellulosics, synthetic and glass fibers, non-woven and woven glass fabrics, plastic screen like materials both extruded and hole punched, UF and MF membranes of organic polymers can be used. Sheet-like substrate or cellulosic non-woven web can then be formed into a filter structure that is placed in a fluid stream including an air stream or liquid stream for the purpose of removing suspended or entrained particulate from that stream. The shape and structure of the filter material is up to the design engineer. One important parameter of the filter elements after formation is its resistance to the effects of heat, humidity or both. One aspect of the filter media of the invention is a test of the ability of the filter media to survive immersion in warm water for a significant period of time. The immersion test can provide valuable information regarding the ability of the fine fiber to survive hot humid conditions and to survive the cleaning of the filter element in aqueous solutions that can contain substantial proportions of strong cleaning surfactants and strong alkalinity materials. Preferably, the fine fiber materials of the invention can survive immersion in hot water while retaining at least 50% of the fine fiber formed on the surface of the substrate as an active filter component. Retention of at least 50% of the fine fiber can maintain substantial fiber efficiency without loss of filtration capacity or increased back pressure. Most preferably retaining at least 75%.

The fine fibers that comprise the micro- or nanofiber containing layer of the invention can be fiber and can have a diameter of about 0.001 to 10 microns, preferably 0.05 to 0.5 micron. The thickness of the typical fine fiber filtration layer ranges from about 1 to 100 times the fiber diameter with a basis weight ranging from about 0.01 to 240 micrograms-cm$^{-2}$.

Fluid streams such as air and gas streams often carry particulate material therein. The removal of some or all of the particulate material from the fluid stream is needed. For example, air intake streams to the cabins of motorized vehicles, air in computer disk drives, HVAC air, clean room ventilation and applications using filter bags, barrier fabrics, woven materials, air to engines for motorized vehicles, or to power generation equipment; gas streams directed to gas turbines; and, air streams to various combustion furnaces, often include particulate material therein. In the case of cabin air filters it is desirable to remove the particulate matter for comfort of the passengers and/or for aesthetics. With respect to air and gas intake streams to engines, gas turbines and combustion furnaces, removal of the particulate material is needed because particulate can cause substantial damage to the internal workings to the various mechanisms involved. In other instances, production gases or off gases from industrial processes or engines may contain particulate material therein. Before such gases can be, or should be, discharged through various downstream equipment to the atmosphere, it may be desirable to obtain a substantial removal of particulate material from those streams.

A general understanding of some of the basic principles and problems of air filter design can be understood by consideration of the following types of filter media: surface loading media; and, depth media. Each of these types of media has been well studied, and each has been widely utilized. Certain principles relating to them are described, for example, in U.S. Pat. Nos. 5,082,476; 5,238,474; and 5,364,456. The complete disclosures of these three patents are incorporated herein by reference.

The "lifetime" of a filter is typically defined according to a selected limiting pressure drop across the filter. The pressure buildup across the filter defines the lifetime at a defined level for that application or design. Since this buildup of pressure is a result of load, for systems of equal efficiency a longer life is typically directly associated with higher capacity. Efficiency is the propensity of the media to trap, rather than pass, particulates. Typically the more efficient a filter media is at removing particulates from a gas flow stream, in general, the more rapidly the filter media will approach the "lifetime" pressure differential (assuming other variables to be held constant). In this application the term "unchanged for filtration purposes" refers to maintaining sufficient efficiency to remove particulate from the fluid stream as is necessary for the selected application.

Polymeric materials have been fabricated in non-woven and woven fabrics, fibers and microfibers. The polymeric material provides the physical properties required for product stability. These materials should not change significantly in dimension, suffer reduced molecular weight, become less flexible or subject to stress cracking or physically deteriorate in the presence of sunlight, humidity, high temperatures or other negative environmental effects. The invention relates to an improved polymeric material that can maintain physical properties in the face of incident electromagnetic radiation such as environmental light, heat, humidity and other physical challenges.

Polymer materials that can be used in the polymeric compositions of the invention include both addition polymer and condensation polymer materials such as polyolefin, polyacetal, polyamide, polyester, cellulose ether and ester, polyalkylene sulfide, polyarylene oxide, polysulfone, modified polysulfone polymers and mixtures thereof. Preferred materials that fall within these generic classes include polyethylene, polypropylene, poly(vinylchloride), polymethylmethacrylate (and other acrylic resins), polystyrene, and copolymers thereof (including ABA type block copolymers), poly(vinylidene fluoride), poly(vinylidene chloride), polyvinylalcohol in various degrees of hydrolysis (87% to 99.5%) in crosslinked and non-crosslinked forms. Preferred addition polymers tend to be glassy (a Tg greater than room temperature). This is the case for polyvinylchloride and polymethylmethacrylate, polystyrene polymer compositions or alloys or low in crystallinity for polyvinylidene fluoride and polyvinylalcohol materials. One class of polyamide condensation polymers are nylon materials. The term "nylon" is a generic name for all long chain synthetic polyamides. Typically, nylon nomenclature includes a series of numbers such as in nylon-6,6 which indicates that the starting materials are a $C_6$ diamine and a $C_6$ diacid (the first digit indicating a $C_6$ diamine and the second digit indicating a $C_6$ dicarboxylic acid compound). Another nylon can be made by the polycondensation of epsilon ($C_6$) caprolactam (or other $C_{6-12}$ lactams) in the presence of a small amount of water. This reaction forms a nylon-6 (made from a cyclic lactam—also known as episilon—minocaproic acid) that is a linear polyamide. Further, nylon copolymers are also contemplated. Copolymers can be made by combining various diamine compounds, various diacid compounds and various cyclic lactam structures in a reaction mixture and then forming the nylon with randomly positioned monomeric materials in a polyamide structure. For example, a nylon 6,6-6,10 material is a nylon manufactured from hexamethylene diamine and a $C_6$ and a $C_{10}$ blend of diacids. A nylon 6-6,6-6,10 is a nylon manufactured by copolymerization of epsilonaminocaproic acid, hexamethylene diamine and a blend of a $C_6$ and a $C_{10}$ diacid material.

Block copolymers are also useful in the process of this invention. With such copolymers the choice of solvent swelling agent is important. The selected solvent is such that both blocks were soluble in the solvent. One example is a ABA (styrene-EP-styrene) or AB (styrene-EP) polymer in methylene chloride solvent. If one component is not soluble in the solvent, it will form a gel. Examples of such block copolymers are Kraton® type of styrene-b-butadiene and styrene-b-hydrogenated butadiene(ethylene propylene), Pebax® type of e-caprolactam-b-ethylene oxide, Sympatex® polyester-b-ethylene oxide and polyurethanes of ethylene oxide and isocyanates.

Addition polymers like polyvinylidene fluoride, syndiotactic polystyrene, copolymer of vinylidene fluoride and hexafluoropropylene, polyvinyl alcohol, polyvinyl acetate, amorphous addition polymers, such as poly(acrylonitrile) and its copolymers with acrylic acid and methacrylates, polystyrene, poly(vinyl chloride) and its various copolymers, poly(methyl methacrylate) and its various copolymers, can be solution spun with relative ease because they are soluble at low pressures and temperatures. However, highly crystalline polymer like polyethylene and polypropylene require high temperature, high pressure solvent if they are to be solution spun. Therefore, solution spinning of the polyethylene and polypropylene is very difficult. Electrostatic solution spinning is one method of making nanofibers and microfiber.

We have also found a substantial advantage to forming polymeric compositions comprising two or more polymeric materials in polymer admixture, alloy format or in a crosslinked chemically bonded structure. We believe such polymer compositions improve physical properties by changing polymer attributes such as improving polymer chain flexibility or chain mobility, increasing overall molecular weight and providing reinforcement through the formation of networks of polymeric materials.

In one embodiment of this concept, two related polymer materials can be blended for beneficial properties. For example, a high molecular weight polyvinylchloride can be blended with a low molecular weight polyvinylchloride. Similarly, a high molecular weight nylon material can be blended with a low molecular weight nylon material. Further, differing species of a general polymeric genus can be blended. For example, a high molecular weight styrene material can be blended with a low molecular weight, high impact polystyrene. A Nylon-6 material can be blended with a nylon copolymer such as a Nylon-6; 6,6; 6,10 copolymer. Further, a polyvinylalcohol having a low degree of hydrolysis such as a 87% hydrolyzed polyvinylalcohol can be blended with a fully or superhydrolyzed polyvinylalcohol having a degree of hydrolysis between 98 and 99.9% and higher. All of these materials in admixture can be crosslinked using appropriate crosslinking mechanisms. Nylons can be crosslinked using crosslinking agents that are reactive with the nitrogen atom in the amide linkage. Polyvinylalcohol materials can be crosslinked using hydroxyl reactive materials such as monoaldehydes, such as formaldehyde, ureas, melamine-formaldehyde resin and its analogues, boric acids and other inorganic compounds. dialdehydes, diacids, urethanes, epoxies and other known crosslinking agents. Crosslinking technology is a well known and understood phenomenon in which a crosslinking reagent reacts and forms covalent bonds between polymer chains to substantially improve molecular weight, chemical resistance, overall strength and resistance to mechanical degradation.

We have found that additive materials can significantly improve the properties of the polymer materials in the form of a fine fiber. The resistance to the effects of heat, humidity, impact, mechanical stress and other negative environmental effect can be substantially improved by the presence of additive materials. We have found that while processing the microfiber materials of the invention, that the additive materials can improve the oleophobic character, the hydrophobic character and can appear to aid in improving the chemical stability of the materials. We believe that the fine fibers of the invention in the form of a microfiber are improved by the presence of these oleophobic and hydrophobic additives as these additives form a protective layer coating, ablative surface or penetrate the surface to some depth to improve the nature of the polymeric material. We believe the important characteristics of these materials are the presence of a strongly hydrophobic group that can preferably also have oleophobic character. Strongly hydrophobic groups include fluorocarbon groups, hydrophobic hydrocarbon surfactants or blocks and substantially hydrocarbon oligomeric compositions. These materials are manufactured in compositions that have a portion of the molecule that tends to be compatible with the polymer material affording typically a physical bond or association with the polymer while the strongly hydrophobic or oleophobic group, as a result of the association of the additive with the polymer, forms a protective surface layer that resides on the surface or becomes alloyed with or mixed with the polymer surface layers. The additive can be used at an amount of 1% to 25% by weight total on fiber. For 0.2-micron fiber with 10% additive level, the surface thickness is calculated to be around 50 Å, if the additive has migrated toward the surface. Migration is believed to occur due to the incompatible nature of the oleophobic or hydrophobic groups in the bulk material. A 50 Å thickness appears to be reasonable thickness for protective coating. For 0.05-micron diameter fiber, 50 Å thickness corresponds to 20% mass. For 2 microns thickness fiber, 50 Å thickness corresponds to 2% mass. Preferably the additive materials are used at an amount of about 2 to 25 wt. %. Useful surface thickness can range from 10 Å to 150 Å.

Oligomeric additives that can be used in combination with the polymer materials of the invention include oligomers having a molecular weight of about 500 to about 5000, preferably about 500 to about 3000 including fluorochemicals, nonionic surfactants and low molecular weight resins or oligomers. Fluoro-organic wetting agents useful in this invention are organic molecules represented by the formula $R_fG$ wherein $R_f$ is a fluoroaliphatic radical and G is a group which contains at least one hydrophilic group such as cationic, anionic, nonionic, or amphoteric groups. Nonionic materials are preferred. $R_f$ is a fluorinated, monovalent, aliphatic organic radical containing at least two carbon atoms. Preferably, it is a saturated perfluoroaliphatic monovalent organic radical. However, hydrogen or chlorine atoms can be present as substituents on the skeletal chain. While radicals containing a large number of carbon atoms may function adequately, compounds containing not more than about 20 carbon atoms are preferred since large radicals usually represent a less efficient utilization of fluorine than is possible with shorter skeletal chains. Preferably, $R_f$ contains about 2 to 8 carbon atoms.

The cationic groups that are usable in the fluoro-organic agents employed in this invention may include an amine or a quaternary ammonium cationic group which can be oxygen-free (e.g., —$NH_2$) or oxygen-containing (e.g., amine oxides). Such amine and quaternary ammonium cationic hydrophilic groups can have formulas such as —$NH_2$, —$(NH_3)X$, —$(NH(R^2)_2)X$, —$(NH(R^2)_3)X$, or —$N(R_2)_2$→O, where x is an anionic counterion such as halide, hydroxide, sulfate, bisulfate, or carboxylate, $R^2$ is H or $C_{1-18}$ alkyl group, and each $R^2$ can be the same as or different from other $R^2$ groups. Preferably, $R^2$ is H or a $C_{1-16}$ alkyl group and X is halide, hydroxide, or bisulfate.

The anionic groups which are usable in the fluoro-organic wetting agents employed in this invention include groups which by ionization can become radicals of anions. The anionic groups may have formulas such as —COOM, —$SO_3M$, —$OSO_3M$, —$PO_3HM$, —$OPO_3M_2$, or —$OPO_3HM$, where M is H, a metal ion, $(NR^1_4)^+$, or $(SR^1_4)^+$, where each $R^1$ is independently H or substituted or unsubstituted $C_1$–$C_6$ alkyl. Preferably M is $Na^+$ or $K^+$. The preferred anionic groups of the fluoro-organo wetting agents used in this invention have the formula —COOM or —$SO_3M$. Included within the group of anionic fluoro-organic wetting agents are anionic polymeric materials typically manufactured from ethylenically unsaturated carboxylic mono- and diacid monomers having pendent fluorocarbon groups appended thereto. Such materials include surfactants obtained from 3M Corporation known as FC-430 and FC-431.

The amphoteric groups which are usable in the fluoro-organic wetting agent employed in this invention include groups which contain at least one cationic group as defined above and at least one anionic group as defined above.

The nonionic groups which are usable in the fluoro-organic wetting agents employed in this invention include groups which are hydrophilic but which under pH conditions of normal agronomic use are not ionized. The nonionic groups may have formulas such as —$O(CH_2CH_2)xOH$ where x is greater than 1, —$SO_2NH_2$, —$SO_2NHCH_2CH_2OH$, —$SO_2N(CH_2CH_2H)_2$, —$CONH_2$, —$CONHCH_2CH_2OH$, or —$CON(CH_2CH_2OH)_2$. Examples of such materials include materials of the following structure:

$F(CF_2CF_2)_n$—$CH_2CH_2O$—$(CH_2CH_2O)_m$—H wherein n is 2 to 8 and m is 0 to 20.

Other fluoro-organic wetting agents include those cationic fluorochemicals described, for example in U.S. Pat. Nos. 2,764,602; 2,764,603; 3,147,064 and 4,069,158. Such amphoteric fluoro-organic wetting agents include those amphoteric fluorochemicals described, for example, in U.S. Pat. Nos. 2,764,602; 4,042,522; 4,069,158; 4,069,244; 4,090,967; 4,161,590 and 4,161,602. Such anionic fluoro-organic wetting agents include those anionic fluorochemicals described, for example, in U.S. Pat. Nos. 2,803,656; 3,255,131; 3,450,755 and 4,090,967.

Examples of such materials are duPont Zonyl FSN and duPont Zonyl FSO nonionic surfactants. Another aspect of additives that can be used in the polymers of the invention include low molecular weight fluorocarbon acrylate materials such as 3M's Scotchgard material having the general structure:

$CF_3(CX_2)_n$-acrylate wherein X is, independently, —F or —$CF_3$ and n is 1 to 7.

Further, nonionic hydrocarbon surfactants including lower alcohol ethoxylates, fatty acid ethoxylates, nonylphenol ethoxylates, etc. can also be used as additive materials for the invention. Examples of these materials include Triton X-100 and Triton N-101.

A useful material for use as an additive material in the compositions of the invention are tertiary butylphenol oligomers. Such materials tend to be relatively low molecular weight aromatic phenolic resins. Such resins are phenolic polymers prepared by enzymatic oxidative coupling. The absence of methylene bridges result in unique chemical and physical stability. These phenolic resins can be crosslinked with various amines and epoxies and are compatible with a variety of polymer materials. These materials are generally exemplified by the following structural formulas which are characterized by phenolic materials in a repeating motif in the absence of methylene bridge groups having phenolic and aromatic groups.

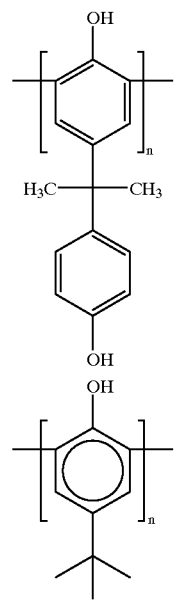

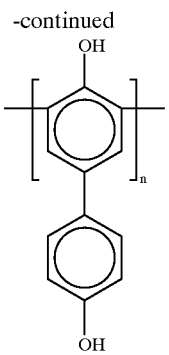

wherein n is 2 to 20. Examples of these phenolic materials include Enzo-BPA, Enzo-BPA/phenol, Enzo-TBP, Enzo-COP and other related phenolics were obtained from Enzymol International Inc., Columbus, Ohio.

It should be understood that an extremely wide variety of fibrous filter media exist for different applications. The durable nanofibers and microfibers described in this invention can be added to any of the media. The fibers described in this invention can also be used to substitute for fiber components of these existing media giving the significant advantage of improved performance (improved efficiency and/or reduced pressure drop) due to their small diameter, while exhibiting greater durability.

Polymer nanofibers and microfibers are known, however their use has been very limited due to their fragility to mechanical stresses, and their susceptibility to chemical degradation due to their very high surface area to volume ratio. The fibers described in this invention address these limitations and will therefore be usable in a very wide variety of filtration, textile, membrane and other diverse applications.

DETAILED DESCRIPTION OF CERTAIN DRAWINGS

The microfiber or nanofiber of the unit can be formed by the electrostatic spinning process. A suitable apparatus for forming the fiber is illustrated in FIG. 1. This apparatus includes a reservoir 80 in which the fine fiber forming polymer solution is contained, a pump 81 and a rotary type emitting device or emitter 40 to which the polymeric solution is pumped. The emitter 40 generally consists of a rotating union 41, a rotating portion 42 including a plurality of offset holes 44 and a shaft 43 connecting the forward facing portion and the rotating union. The rotating union 41 provides for introduction of the polymer solution to the forward facing portion 42 through the hollow shaft 43. The holes 44 are spaced around the periphery of the forward facing portion 42. Alternatively, the rotating portion 42 can be immersed into a reservoir of polymer fed by reservoir 80 and pump 81. The rotating portion 42 then obtains polymer solution from the reservoir and as it rotates in the electrostatic field, a droplet of the solution is accelerated by the electrostatic field toward the collecting media 70 as discussed below.

Facing the emitter 40, but spaced apart therefrom, is a substantially planar grid 60 upon which the collecting media 70 (i.e. substrate or combined substrate is positioned. Air can be drawn through the grid. The collecting media 70 is passed around rollers 71 and 72 which are positioned adjacent opposite ends of grid 60. A high voltage electrostatic potential is maintained between emitter 40 and grid 60 by means of a suitable electrostatic voltage source 61 and connections 62 and 63 which connect respectively to the grid 60 and emitter 40.

In use, the polymer solution is pumped to the rotating union 41 or reservoir from reservoir 80. The forward facing portion 42 rotates while liquid exits from holes 44, or is picked up from a reservoir, and moves from the outer edge of the emitter toward collecting media 70 positioned on grid 60. Specifically, the electrostatic potential between grid 60 and the emitter 40 imparts a charge to the material which cause liquid to be emitted therefrom as thin fibers which are drawn toward grid 60. In the case of the polymer in solution, solvent is evaporated off the fibers during their flight to the grid 60. The fine fibers bond to the substrate fibers first encountered at the grid 60. Electrostatic field strength is selected to ensure that the polymer material as it is accelerated from the emitter to the collecting media 70, the acceleration is sufficient to render the material into a very thin microfiber or nanofiber structure. Increasing or slowing the advance rate of the collecting media can deposit more or less emitted fibers on the forming media, thereby allowing control of the thickness of each layer deposited thereon. The rotating portion 42 can have a variety of beneficial positions. The rotating portion 42 can be placed in a plane of rotation such that the plane is perpendicular to the surface of the collecting media 70 or positioned at any arbitrary angle. The rotating media can be positioned parallel to or slightly offset from parallel orientation.

Figure 2:
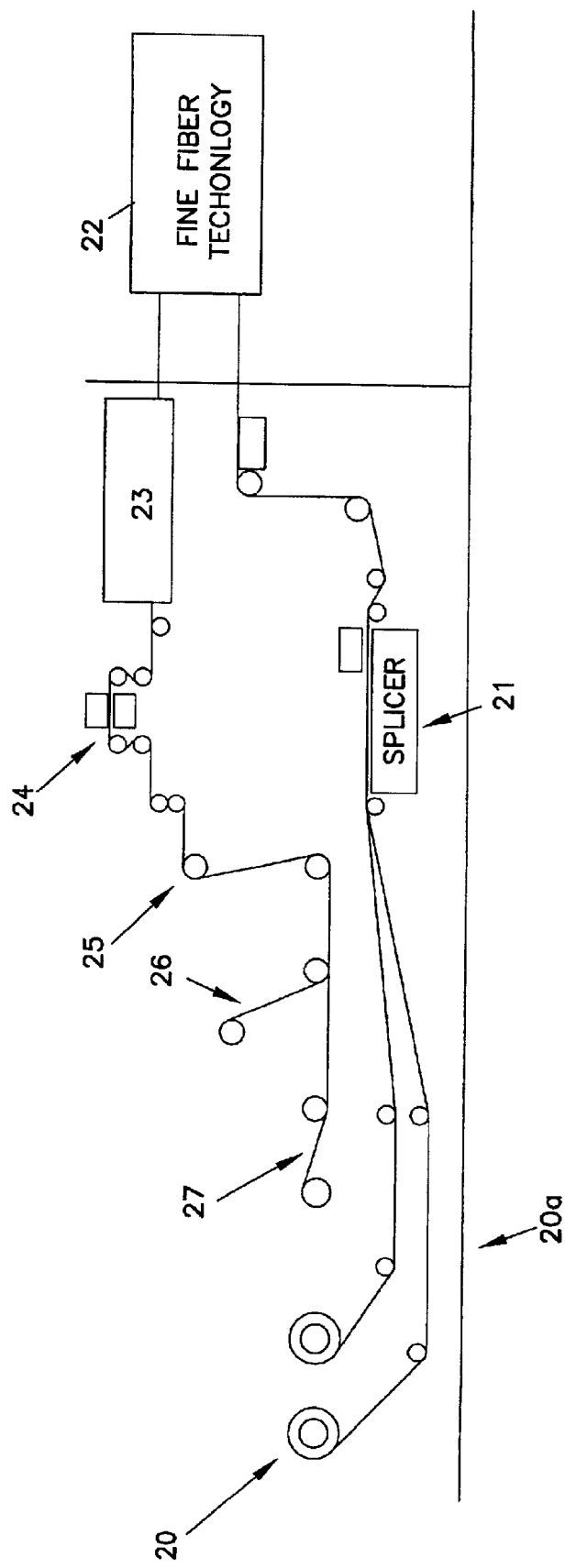
FIG. 2 shows the apparatus used to introduce fine fiber onto filter substrate into the fine fiber forming technology shown in FIG. 1.

FIG. 2 is a general schematic diagram of a process and apparatus for forming a layer of fine fiber on a sheet-like substrate or media. In FIG. 2, the sheet-like substrate is unwound at station 20. The sheet-like substrate 20a is then directed to a splicing station 21 wherein multiple lengths of the substrate can be spliced for continuous operation. The continuous length of sheet-like substrate is directed to a fine fiber technology station 22 comprising the spinning technology of FIG. 1 wherein a spinning device forms the fine fiber and lays the fine fiber in a filtering layer on the sheet-like substrate. After the fine fiber layer is formed on the sheet-like substrate in the formation zone 22, the fine fiber layer and substrate are directed to a heat treatment station 23 for appropriate processing. The sheet-like substrate and fine fiber layer is then tested in an efficiency monitor 24 (see U.S. Pat. No. 5,203,201 which is expressly incorporated by reference herein for process and monitoring purposes) and nipped if necessary at a nip station 25. The sheet-like substrate and fiber layer is then steered to the appropriate winding station to be wound onto the appropriate spindle for further processing 26 and 27.

FIG. 3 is a scanning electromicrograph image showing the relationship of typical dust particles having a diameter of about 2 and about 5 microns with respect to the sizes of pores in typical cellulose media and in the typical fine fiber structures. In FIG. 3A, the 2 micron particle 31 and the 5 micron particle 32 is shown in a cellulosic media 33 with pore sizes that are shown to be quite a bit larger than the typical particle diameters. In sharp contrast, in FIG. 3B, the 2 micron particle appears to be approximately equal to or greater than the typical openings between the fibers in the fiber web 35 while the 5 micron particle 32 appears to be larger than any of the openings in the fine fiber web 35.

We have found that filters in storage or transportation to end use can be exposed to extremes in environmental conditions. Filters in Saudi Arabian desert can be exposed to temperature as high as 150° F. or higher. Filters installed in Indonesia or Gulf Coast of US can be exposed high humidity above 90% RH and high temperature of 100° F. Or, they can be exposed to rain. We have found that filters used under the hood of mobile equipment like cars, trucks, buses, tractors, and construction equipment can be exposed to high temperature (180° F. to 280° F.), high relative humidity and other chemical environment. When operating normally the filter temperature is generally at ambient. This temperature condition is most severe when the equipment or engine is operating abnormally or is used at or near maximum power and is then shut down. We have developed test methods to evaluate survivability of microfiber systems under harsh conditions. Soaking the filter media samples in hot water (140° F.) for 5 minutes or exposure to high humidity, high temperature and air flow.

B. General Principles Relating to Air Cleaner Design

Herein, the term "air cleaner" will be used in reference to a system which functions to remove particulate material from an air flow stream. The term "air filter" references a system in which removal is conducted by passage of the air, carrying particulate therein, through filter media. The term "filter media" or "media" refers to a material or collection of material through which the air passes, with a concomitant deposition of the particles in or on the media. The term "surface loading media" or "barrier media" refers to a system in which as the air passes through the media, the particulate material is primarily deposited on the surface of the media, forming a filter cake, as opposed to into or through the depth of the media.

Herein the term "filter element" is generally meant to refer to a portion of the air cleaner which includes the filter media therein. In general, a filter element will be designed as a removable and replaceable, i.e. serviceable, portion of the air cleaner. That is, the filter media will be carried by the filter element and be separable from the remainder portion of the air cleaner so that periodically the air cleaner can be rejuvenated by removing a loaded or partially loaded filter element and replacing it with a new, or cleaned, filter element. Preferably, the air cleaner is designed so that the removal and replacement can be conducted by hand. By the term "loaded" or variants thereof in this context, reference is meant to an air cleaner which has been on-line a sufficient period of time to contain a significant amount of trapped particles or particulates thereon, for example, at least a weight gain of 5%. In many instances, during normal operation, a filter element will increase in weight, due to particulate loading therein, of two or three times (or more) its original weight. The fine fiber layers formed on the substrate in the filters of the invention should be substantially uniform in both filtering performance and fiber location. By substantial uniformity, we mean that the fiber has sufficient coverage of the substrate to have at least some measurable filtration efficiency throughout the covered substrate. Adequate filtration can occur with wide variation in fiber add-on. Accordingly, the fine fiber layers can vary in fiber coverage, basis weight, layer thickness or other measurement of fiber add-on and still remain well within the bounds of the invention. Even a relatively small add-on of fine fiber can add efficiency to the overall filter structure.

Herein, in some instances references will be made to "on-road" and "off-road" elements. In general, a typical difference between on-road and off-road element design and use concerns the presence of a "safety element". More specifically, in many instances, off-road filter elements are utilized in association with the safety elements. For forward flow arrangements, the safety element is generally a cylindrical element that is positioned inside of the "primary" element during use. The term "primary", in this and similar contexts, is meant to refer to the element which conducts the majority of particle collection, in normal use. Typically, it will be the more "upstream" element, if a safety element is involved. Herein, when the term "element" is used, reference is meant to the primary element, if a safety element is involved. Reference to safety elements will generally be specific by the use of the term "safety".

In the filter art, elements are often referenced with respect to whether they are constructed for "light duty", "medium duty" or "heavy duty" application. With respect to on-road, the specification generally relates to the minimum expected lifetime for the element, in terms of miles of operation of the vehicle involved. Typical light duty applications or elements are constructed and arranged to operate effectively for at least 20,000 miles, typically at least 30,000 miles. Medium duty elements are generally ones constructed and arranged to operate for an average of at least 40,000 miles, typically at least 50,000 miles. Heavy duty elements are elements constructed and arranged to operate for at least about 90,000 miles, typically 100,000 miles or longer. Of course, the characterization is on a continuum. An element designed for 80,000 miles, for example, might be classified by some as a heavy duty element.

Off-road elements are also generally characterized as light duty, medium duty or heavy duty elements. For off-duty specifications, however, the definitions are generally with respect to expected hours of use, prior to filter element change. In general, light duty elements, for off-road use, are elements constructed and arranged for an expected operation period of at least about 90 hours and typically at least 100 hours without changeout; medium duty elements are generally constructed and arranged for operation in the field for at least about 225 hours, typically at least 250 hours, without changeout; and, heavy duty elements are generally elements constructed and arranged to be used in the field for at least about 450 hours, typically at least 500 hours, without changeout. Again, a continuum is involved.

In general, specifications for the performance of an air cleaner system are, generated by the preferences of the original equipment manufacturer (OEM) for the engine involved and/or the OEM of the truck or other equipment involved. While a wide variety of specifications may be involved, some of the major ones are the following:

1. Engine air intake need (rated flow)
2. Initial Restriction
3. Initial efficiency
4. Average or overall operating restriction
5. Overall efficiency
6. Filter service life The engine air intake need is a function of the engine size, i.e., displacement and rpm at maximum, full or "rated" load. In general, it is the product of displacement and rated rpm, modified by the volumetric efficiency, a factor which reflects turbo efficiency, duct efficiency, etc. In general, it is a measurement of the volume of air, per unit time, required by the engine or other system involved, during rated operation or full load. While air intake need will vary depending upon rpm, the air intake requirement is defined at a rated rpm, often at 1800 rpm or 2100 rpm for many typical truck engines. Herein this will be characterized as the "rated air flow" or by similar terms. The filter can be expose to air flows as low as 1 to 3 cfm (about 1 cfm per HP) from small engine air intake applications with engine power of about 2 to 8 HP. Larger engines consume an intake air flow of 50 to 1000 cfm, often 100 to 800 cfm. In general the filter must be rated to permit flow at least at the rated amount or higher without failure. In other applications In general, principles characterized herein can be applied to air cleaner arrangements used with systems specified for operation over a wide range of ratings or demands, including, for example, ones in the range of about 50 cubic feet/min. (cfm) up to 10,000 cfm. Such equipment includes, for example: automotive engines, pickup trucks and sport utility vehicle engines, engines for small trucks and delivery vehicles, buses, over-the-highway trucks, agricultural equipment (for example tractors), construction equipment, mining equipment, marine engines, a variety of generator engines, and, in some instances, gas turbines and air compressors.

Air cleaner overall efficiency is generally a reflection of the amount of "filterable" solids which pass into the air cleaner during use, and which are retained by the air cleaner. It is typically represented as the percentage of solids passing into the air cleaner which are retained by the air cleaner in normal use, on a weight basis. It is evaluated and reported for many systems by using SAE standards, which techniques are generally characterized in U.S. Pat. No. 5,423,892 at Column 25, line 60; Column 26, line 59; Column 27, lines 1–40. A typical standard used is SAE J726, incorporated herein by reference.

With respect to efficiency, engine manufacturer and/or equipment manufacturer specifications will vary, in many instances, with efficiency demands (based on either SAE J726 or field testing) for overall operation often being set at 99.5% or higher, typically at 99.8% or higher. With typical vehicle engines having air flow demands of 500 cfm or above, specifications of 99.8% overall average, or higher, are not uncommon.

Initial efficiency is the measurable efficiency of the filter when it is first put on line. As explained in U.S. Pat. No. 5,423,892 at Column 27, lines 1–40, especially with conventional pleated paper (barrier type or surface-loading) filters, initial efficiency is generally substantially lower than the overall average efficiency during use. This is because the "dust cake" or contaminant build-up on the surface of such a filter during operation, increases the efficiency of the filter. Initial efficiency is also often specified by the engine manufacturer and/or the vehicle manufacturer. With typical vehicle engines having air flow demands of 500 cfm or above, specifications of 98% or above (typically 98.5% or above) are common.

Restriction is the pressure differential across an air cleaner or air cleaner system during operation. Contributors to the restriction include: the filter media through which the air is directed; duct size through which the air is directed; and, structural features against which or around which the air is directed as it flows through the air cleaner and into the engine. With respect to air cleaners, initial restriction limits are often part of the specifications and demands of the engine manufacturer and/or equipment manufacturer. This initial restriction would be the pressure differential measured across the air cleaner when the system is put on line with a clean air filter therein and before significant loading occurs. Typically, the specifications for any given system have a maximum initial restriction requirement.

In general, engine and equipment manufacturers design equipment with specifications for air cleaner efficiency up to a maximum restriction. As reported in U.S. Pat. No. 5,423,892, at Column 2, lines 19–29; and, column 6, line 47, column 7, line 3, the limiting restriction: for typical truck engines is a pressure drop of about 20–30 inches of water, often about 25 inches of water; for automotive internal combustion engines is about 20–25 inches of water; for gas turbines, is typically about 5 inches of water; and, for industrial ventilation systems, is typically about 3 inches of water.

In general, some of the principal variables of concern in air cleaner design in order to develop systems to meet the types of specifications characterized in the previous section, are the following:

1. filter media type, geometry and efficiency;
2. air cleaner shape and structure; and
3. filter element size.

For example, conventional cellulose fiber media or similar media is generally a "barrier" filter. An example is paper media. In general, the operation of such media is through surface loading, i.e., when air is directed through the media, the surface of the media acts as a barrier or sieve, preventing passage of particulate material therethrough. In time, a dust cake builds on the surface of the media, increasing media efficiency. In general, the "tightness" or "porosity" of the fiber construction determines the efficiency, especially the initial efficiency, of the system. In time, the filter cake will effect (increase) the efficiency.

In general, such media is often defined or specified by its permeability. The permeability test for media is generally characterized in U.S. Pat. No. 5,672,399 at Col. 19, lines 27–39. In general, it is the media face velocity (air) required to induce a 0.50 inch water restriction across a flat sheet of the referenced material, media or composite. Permeability, as used herein, is assessed by a Frazier Perm Test, according to ASTM D737 incorporated herein by reference, for example using a Frazier Perm Tester available from Frazier Precision Instrument Co., Inc., Gaithersburg, Md., or by some analogous test.

The permeability of cellulose fiber media used in many types of engine filters for trucks having rated air flows fibers of 500 cfm or more manufactured by Donaldson Company, is media having a permeability of less than about 15 fpm, typically around 13 fpm. In general, in the engine filtration market, for such equipment, a variety of barrier media (pleated media) having permeability values of less than about 25 fpm, and typically somewhere within the range of 10–25 fpm, have been widely utilized by various element manufacturers.

With respect to media geometry, in general, with barrier filters, preferred geometries are typically pleated, cylindrical, patterns. Such cylindrical patterns are generally preferred because they are relatively straightforward to manufacture, use conventional filter manufacturing techniques, and are relatively easy to service. The pleating of surface loading media increases the surface area positioned within a given volume. Generally, major parameters with respect to such media positioning are: pleat depth; pleat density, typically measured as a number of pleats per inch along the inner diameter of the pleated media cylinder; and, cylindrical length or pleat length. In general, a principal factor with respect to selecting media pleat depth, pleat length, and pleat density, especially for barrier arrangements is the total surface area required for any given application or situation.

With respect to efficiency, principles vary with respect to the type of media involved. For example, cellulose fiber or similar barrier media is generally varied, with respect to efficiency, by varying overall general porosity or permeability. As explained in U.S. Pat. Nos. 5,423,892 and 5,672,399, the efficiency of barrier media can be modified in some instances by oiling the media and in others by applying, to a surface of the media, a deposit of relatively fine fibers, typically less than 5 microns and in many instances submicron sized (average) fibers. With respect to fibrous depth media constructions, for example, dry laid fibrous media, as explained in U.S. Pat. No. 5,423,892, variables concerning efficiency include: percent solidity of the media, and how compressed the media is within the construction involved; overall thickness or depth; and, fiber size.

With many engine air cleaner arrangements currently in the market, at least one of two general types of sealing arrangements between the element and the housing are used. One of these is a radially sealing arrangement. A variety of configurations of radially sealing arrangements are known, including: (1) the form available under the Donaldson trademark RadialSeal® from Donaldson Company of Minneapolis, Minn., and generally as described and characterized in European Patent 0329659B1, incorporated herein by reference; (2) the type described by Mann and Hummel in German Patent 4,241,586, and the corresponding (English language) published South African document 93/09129 published May 8, 1994, incorporated herein by reference; and, (3) the type characterized by Fleetguard in U.S. Pat. No. 5,556,440 at column 10, lines 53–67 and FIG. 26, incorporated herein by reference. In general, with radially sealing arrangements, a seal is formed as a result of forces directed radially around a tube to which the element is sealed.

Another common type of sealing arrangement is generally referred to as "axial". Axial systems are shown, for example, in U.S. Pat. Nos. 3,078,650; 3,488,928; 4,20,783; 4,647,373; and 5,562,746 each of which is incorporated herein by reference. In general, sealing forces for such arrangements are directed along the longitudinal axis of the cylindrical air filter element that result from compression of a gasket between an end surface of the air filter and a surface of a housing in which the air filter is positioned, with the seal oriented circumferentially around (or circumscribing) an air flow aperture or tube.

C. Typical System; Engine Air Intake

Figure 20:
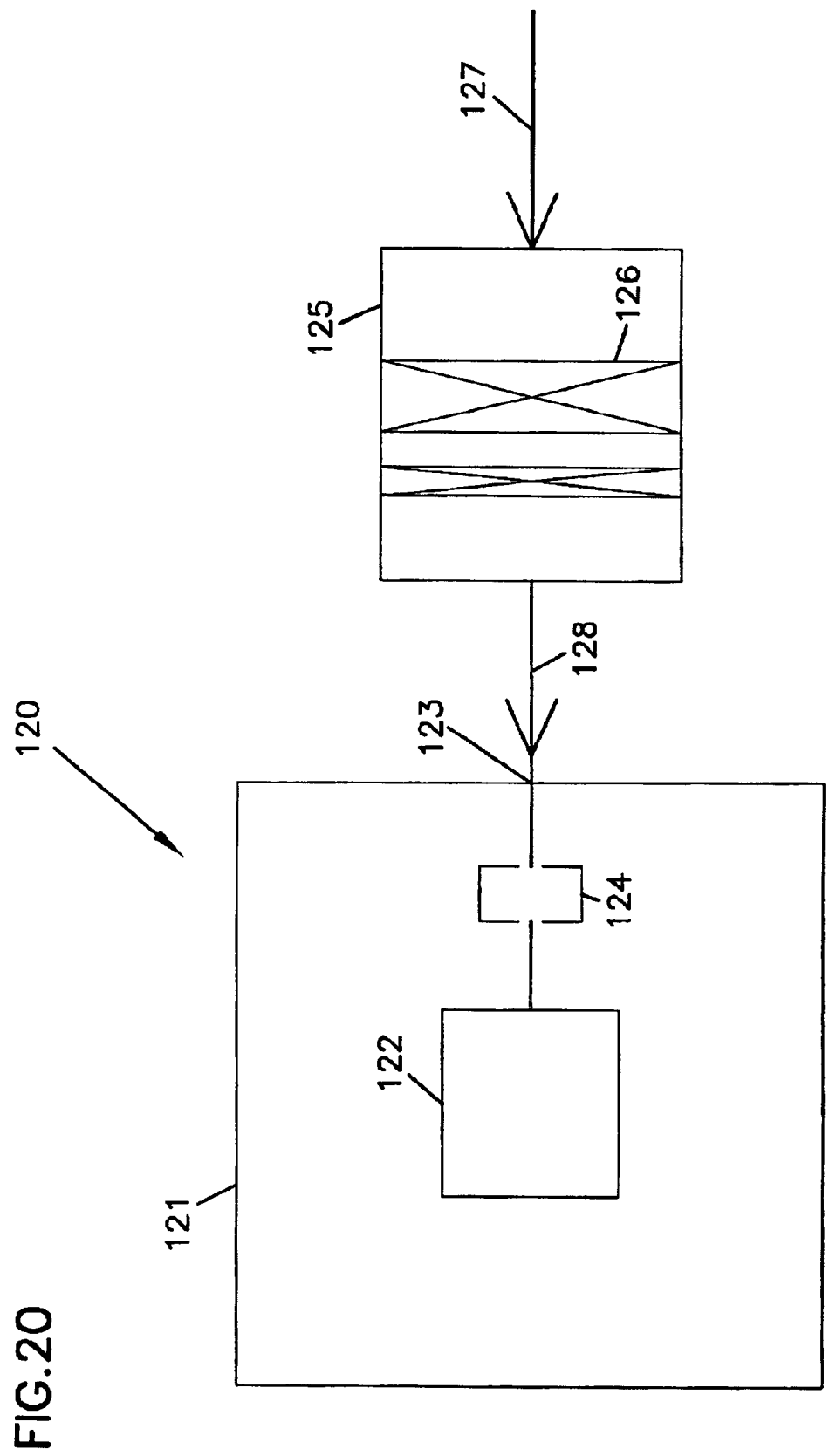
FIG. 20 is a schematic view of a system having an engine with an air intake system and an air cleaner therein.

In FIG. 20, a schematic view of a system is shown generally at 120. System 20 is one example type of system in which air cleaner arrangements and constructions described herein is usable. In FIG. 20, equipment 121, such as a vehicle, having an engine 122 with some defined rated air flow demand is shown schematically. Equipment 121 may comprise a bus, an over the highway truck, an off-road vehicle, a tractor, or marine application such as a power boat. Engine 122 powers equipment 121, through use of an air, fuel mixture. In FIG. 20, air flow is shown drawn into engine 122 at an intake region 123. An optional turbo 124 is shown in phantom, as optionally boosting the air intake into the engine 122. An air cleaner 125 having a media pack 126 is upstream of the engine 122 and turbo 124. In general, in operation, air is drawn in at arrow 127 into the air cleaner 125 and through media pack 126. There, particles and contaminants are removed from the air. The cleaned air flows downstream at arrow 128 into the intake 123. From there, the air flows into engine 122, to power equipment 121.

In engine systems, during operation of the engine and depending on conditions of power setting, load, external ambient temperature and other variables, the temperature, under the hood, typically is at least 80° F. to 120° F., and often is in the range of 140° F. to 220° F. While under normal operations the filter is often near ambient temperatures, during periods of low air flow or other non-standard operations the temperature can reach 220° F. or more. Such temperatures can adversely affect the operating efficiency of the filter element. Regulations on emissions can increase the restriction on the engine exhaust, causing further increased temperatures. As explained below, constructing the filter media in the form of a composite of a barrier media and at least a single layer, and in some instances, multiple layers of "fine fiber" can improve the performance (the operating efficiency, in particular) of the filter element over prior art filter elements that are not constructed from such media composites.

D. Example Air Cleaners

In reference now to FIGS. 21–24, a first embodiment of an air cleaner 130 including a primary filter element 132 and a safety element 134 is depicted. The air cleaner 130, in the particular embodiment depicted in FIGS. 21–24, is the type of air cleaner constructed for sealing by way of a radially directed seal.

Figure 22:
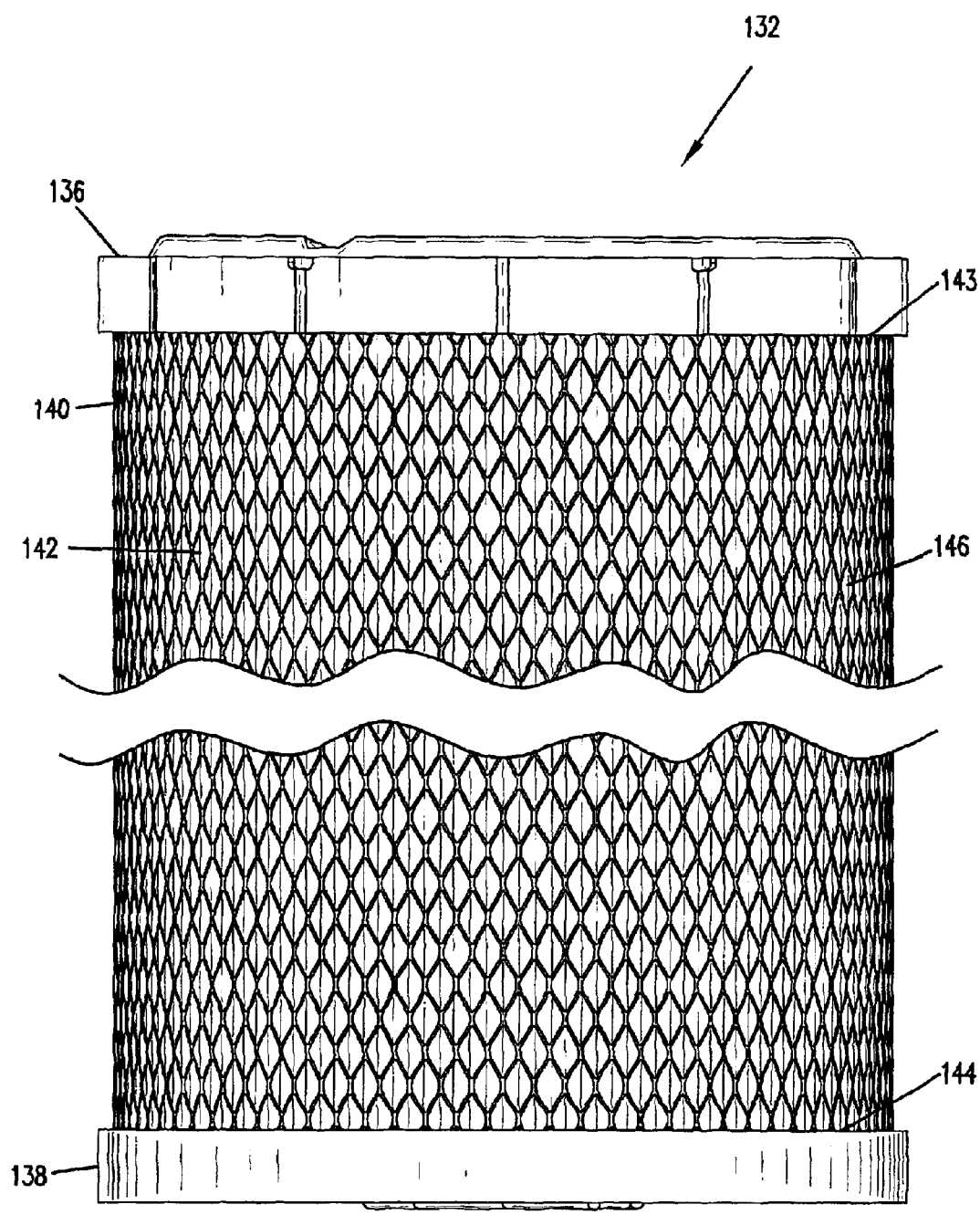
FIG. 22 is a side elevational, fragmented view of the primary filter element depicted in FIG. 21.

Turning first to the primary element 132, FIG. 22 illustrates the primary element 132 in side, elevational view. The primary element 132 depicted includes first and second opposite end caps 136, 138; an outer support tube or liner 140; and a media pack 142 for filtering the air. The media pack 142 has first and second opposite ends 143, 144. At the first end 143 of the media pack 142, the first end cap 136 is secured to the media pack 142; analogously, the second end 144 of the media pack 142 is secured to the second end cap 138. In typical arrangements, the first and second end caps 136, 138 are molded from a compressible material, such as polyurethane foam. In such arrangements, the media pack 142 is bonded to the first and second end caps 136, 138 by potting the media in the polyurethane foam, before the polyurethane material has cured. Certain example materials for the first and second end caps 136, 138 are described further below.

In preferred arrangements, the media pack 142 comprises a pleated construction 146. By "pleated construction," it is meant that the media pack 142 has a series or plurality of folds or pleats, usually uniformly distributed about the media pack 142.

Figure 21:
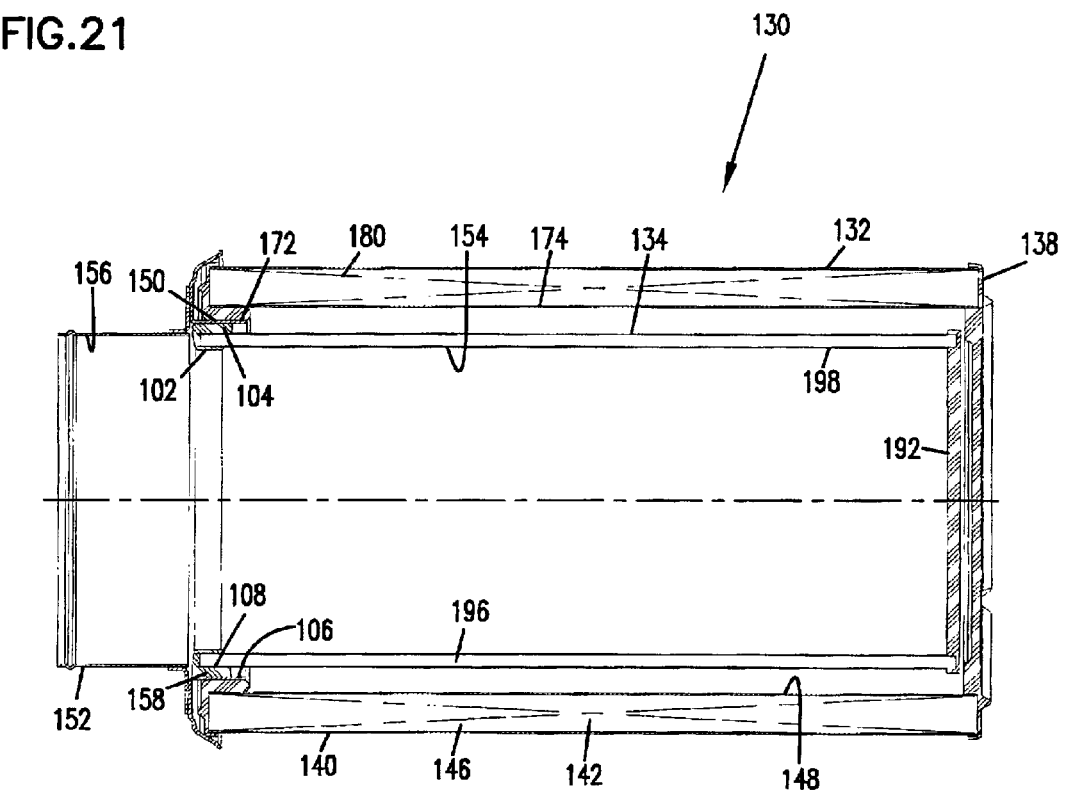
FIG. 21 is a schematic, cross-sectional view of a primary filter element and a safety filter element mounted therein, both of which are mounted on an air flow tube for use with an engine system such as that depicted in FIG. 20.

In reference now to FIG. 21, it can be seen that the pleated construction 146 is preferably in the form of a tube, preferably cylindrical, defining an open filter interior 148. The primary filter element 132 forms a seal 150 with an air cleaner outlet tube 152 to inhibit the passage of air from bypassing the media pack 142 and flowing directly out through the outlet tube.

General principles of operation of the primary filter element 132 may now be appreciated. In general, air to be filtered flows through the media pack 142 from an external environment and into the open interior 148. The media pack 148 operates to remove particulate matter from the air stream. From there, the air flows through the safety element 134 and into an open interior 154 of the safety element. The cleaned air then exits the air cleaner 130 through the flow conduit 156 formed by the outlet tube 152. The seal 150 between the primary filter element 132 and the outlet tube 152 prevents unfiltered air from bypassing the media pack 142 and flowing directly through the flow conduit 156. A seal 158 between the safety element 134 and the outlet tube 152 prevents air from bypassing the safety element 134. This is explained further below.

In reference now to FIG. 123, a preferred shape for the first end cap 136 is utilized in order to obtain the seal 150. In particular, the end cap 136 includes an axial portion 160 and a radial portion 162. The radial portion 162 circumscribes an end cap opening 164, which is in air flow communication with the open filter interior 148. The radial portion 162 also acts as a sealing portion 166. The sealing portion 166 is made from a compressible material, such that it can be squeezed to deflect toward the media pack 142 with hand pressure (less than 75 lbs.). The sealing portion 166 preferably is in the form of a stepped construction 168, which increases in thickness from the axial portion 160 of the end cap toward the interior 148. In particular, the stepped construction 168 includes three steps 169, 170, 171 of increasing cross-sectional thickness. This stepped construction 168 helps to allow the primary element 132 to more easily fit over the outlet tube 152 when mounting the primary element 132 onto the outlet tube 152. Once seated properly, the sealing portion 166 forms the seal 150 with the outlet tube 152, and in particular, a radial seal 172. The radial seal 172 is formed by compression of the sealing portion 66 between and against the outlet tube 152 and an inner support tube or liner 174. The inner support liner 174 extends between the first and second end caps 136, 138 and is usually potted within them and bonded thereto. The inner support tube 174 is usually constructed analogously as the outer liner 140. As such, it is porous and air permeable, and can be constructed from expanded metal.

The radial seal 162 is described in detail in U.S. Pat. No. 4,720,292 B2, incorporated herein by reference.

Figure 23:
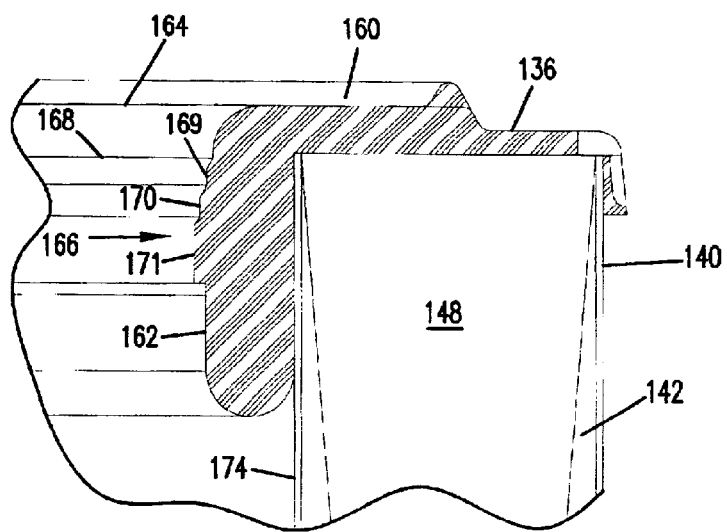
FIG. 23 is an enlarged, schematic, fragmented, cross-sectional view of the end cap and sealing portion of the primary filter element depicted in FIGS. 21 and 22.

The second end cap 138 is a closed end cap, in the embodiment depicted in FIGS. 22 and 23. By the term "closed," it is meant that the second end cap 138 is solid throughout and defines no apertures allowing for the flow of fluid therethrough.

The sealing portion 166, and preferably the entire first end cap 136, is formed by a compressible material, preferably polyurethane, more preferably polyurethane foam. In one usable embodiment, the material comprises polyurethane foam having an as-molded density of 14–22 lbs. per cubic inch. For a properly functioning radial seal 172, the sealing portion 166 needs to be substantially compressed when the primary element 132 is mounted on the outlet tube 152. In many preferred constructions, it is compressed between about 15% and 40% (often about 20–33%) of its thickness, in the thickest portion 171, to provide for a strong robust seal yet still be one that can result from hand installation of the element 132 with forces on the order of 80 lbs. or less, preferably 75 lbs. or less, and generally 50–70 lbs. A usable material for the sealing portion 166 is described in U.S. Pat. No. 5,613,992, incorporated herein by reference.

Turning now to FIG. 22 and the media pack 142, as described above, the air cleaner 130 when used in engine systems 120 may be subject to temperatures on the order of 80° F. to 220° F. The media pack 142 can be designed for improved overall efficiencies, as compared to prior art air cleaners. In general, the media pack 142 is arranged as a composite of a substrate with a deposit of fine fibers thereon. In the particular embodiment illustrated, the substrate 180 is arranged in the pleated construction 146. In many engine systems 120, the substrate 180 comprises paper media or cellulose.

A particular preferred characteristic with respect to the substrate 180 is permeability. In the embodiments utilized with an engine system 120, paper media having a permeability of at least 8 ft. per minute, and typically and preferably about at least 12 ft. per minute, and most preferably within the range of 14 ft. per minute to 300 ft. per minute, prior to any treatment or deposit of fine fibers thereto will be preferred. Preferably, a cellulose media having a basis weight of 50–80 lbs./300 ft.$^2$ and a thickness of 0.010–0.018 inch is used.

The media composite includes a treatment, deposit, or coating of fine fibers in order to increase efficiency under the high temperature conditions of the engine system 120.

Turning now to FIG. 24, the safety element 134 is depicted. The safety element 134 includes first and second opposite end caps 190, 192; an outer support tube or liner 194; and a media pack 196 extending between and bonded to the first end cap 190 and second end cap 192. The media pack 196 is depicted as a pleated construction 198 in a tubular or cylindrical shape defining the open interior 154.

The first end cap 190 is constructed as an open end cap, defining an air flow conduit 102 in gas flow communication with the open interior 154. The second end cap 192 is depicted as solid or closed end cap. The safety element 134 may optionally include an inner support tube or liner extending between the first and second end caps 190, 192 and between the media pack 196 and the open interior 154.

The first end cap 190 includes a ring 104 of soft, pressable material thereon, constructed and arranged to fit within the outlet tube 152 to seal against the inner surface 106 of the tube 152 in use. The safety element 134 is preferably sized and configured to fit underneath the primary element 132, when mounted (see FIG. 21). The ring 104 preferably is constructed of the same polyurethane foam described above for the sealing portion 166. A radial seal 108 is formed by compression of the material of the ring 104 between the media pack 196 and the outlet tube 152.

In many preferred arrangements, the media pack 96 comprises a composite including a cellulose substrate and a layer of fine fiber. The treatment of fine fiber on the cellulose media of the pleated construction 98 helps to increase operating efficiency or useful life in service without unduly increasing restriction, when utilized in environments such as engine system 120 with operating temperatures greater than 80° F. to 140° F.

Attention is next directed to the embodiment of FIGS. 25–28. Depicted in FIGS. 25–28 is another air cleaner 115 that is usable with the engine system 120. With the exception of the preferred media arrangement described in Section H, the general structure and geometry of the air cleaner 115 is described in U.S. Pat. No. 5,613,992, incorporated by reference herein.

The air cleaner 115 is the type generally described as a "reverse flow" air cleaner. By the term "reverse flow," it is meant that air to be filtered generally enters the interior of the filter element and flows outwardly through the element into the volume between the air cleaner housing and the element, and then is directed into the engine air intake 123.

Figure 25:
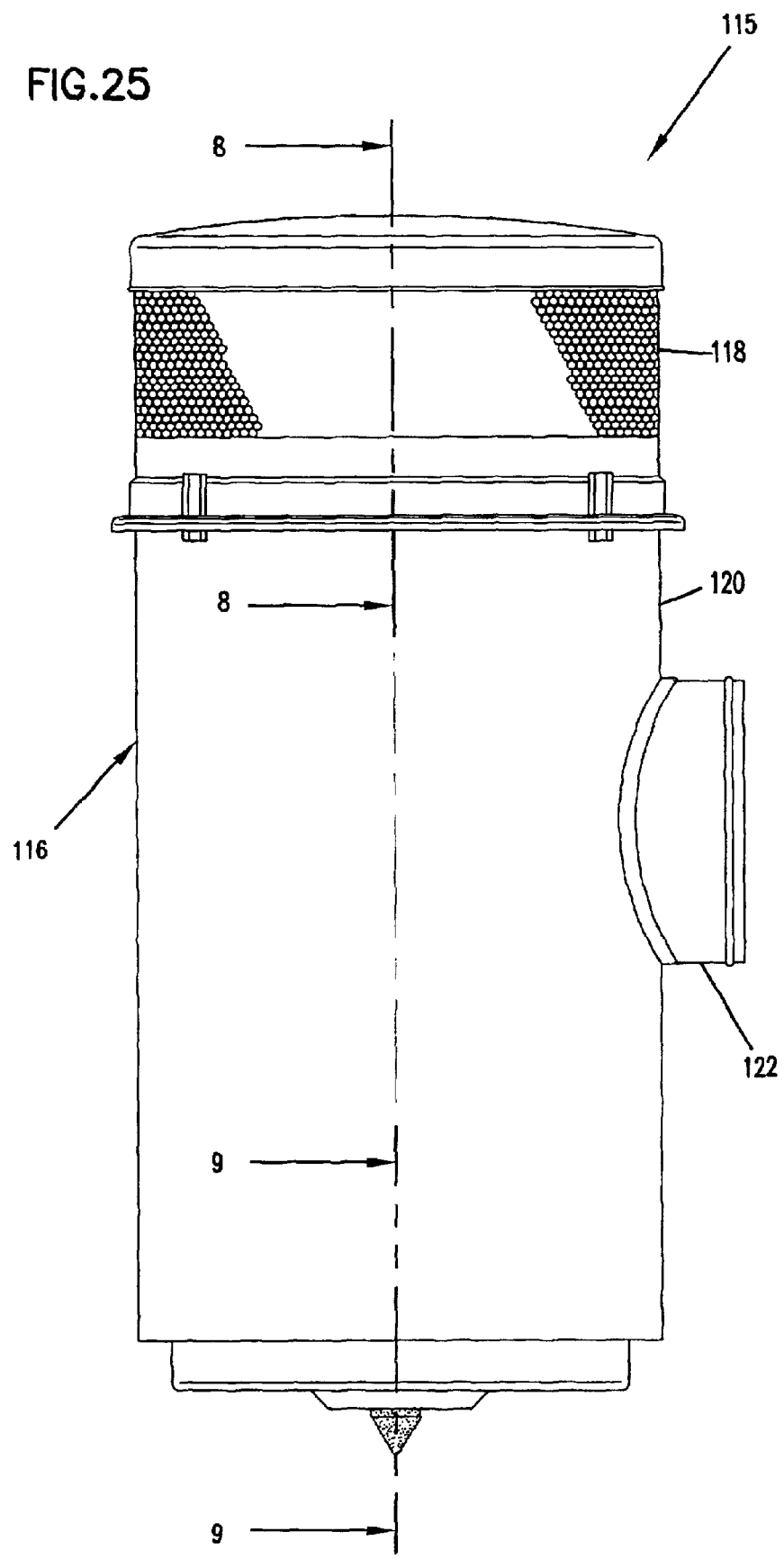
FIG. 25 is a side elevational view of another air cleaner that can be utilized with the engine system depicted in FIG. 20.

In FIG. 25, the air cleaner 115 is shown in side elevational view. The air cleaner 115 includes a housing 116. The housing 116 generally includes an air intake hood 118 and a can 120. The can 120 includes an outlet tube 122. The outlet tube 122 defines an aperture and directs the cleaned air from the housing 116 into the air intake region 23.

Figure 26:
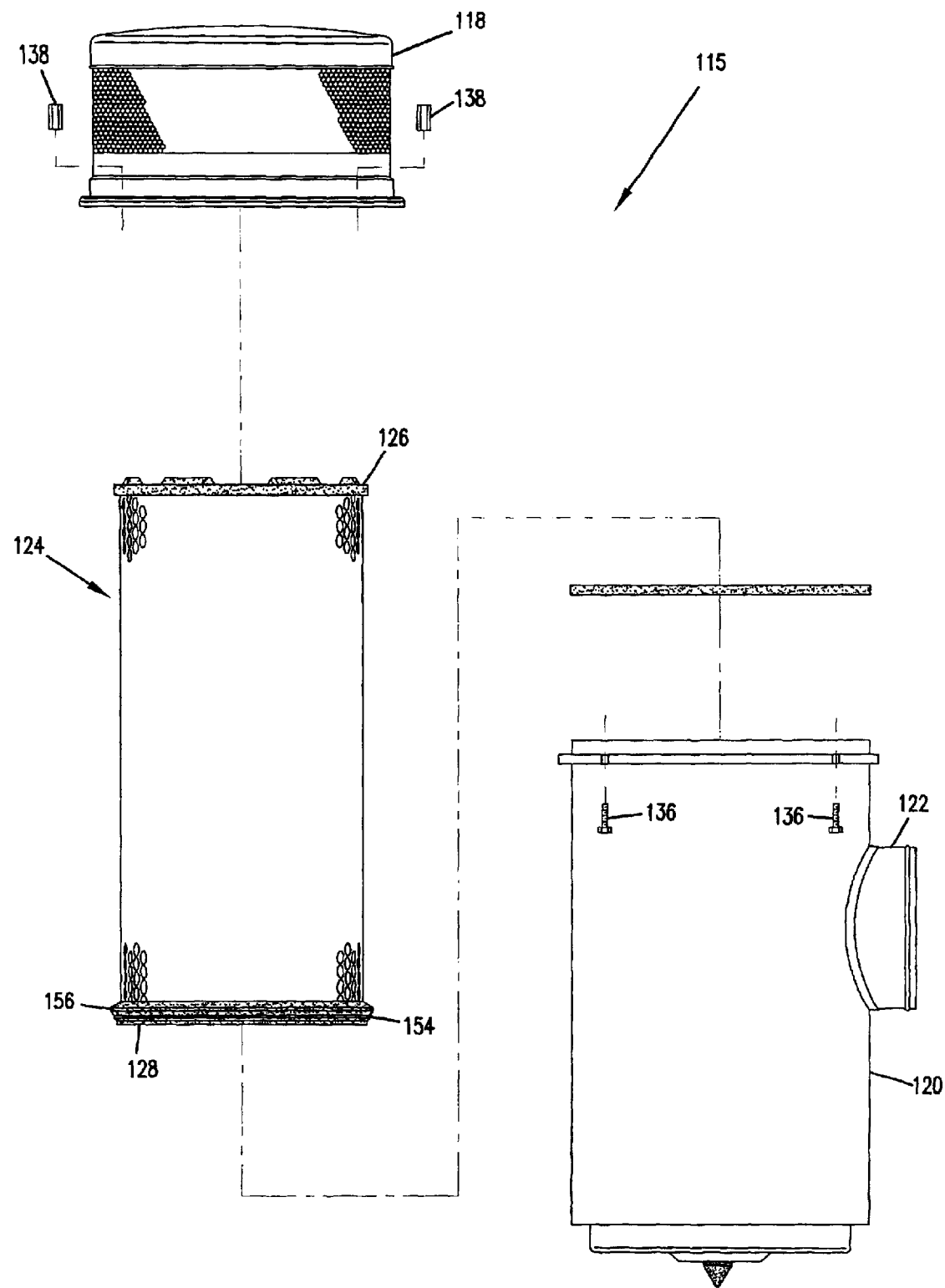
FIG. 26 is a schematic, exploded, side elevational view of the air cleaner, including the housing and the primary filter element depicted in FIG. 25.
Figure 27:
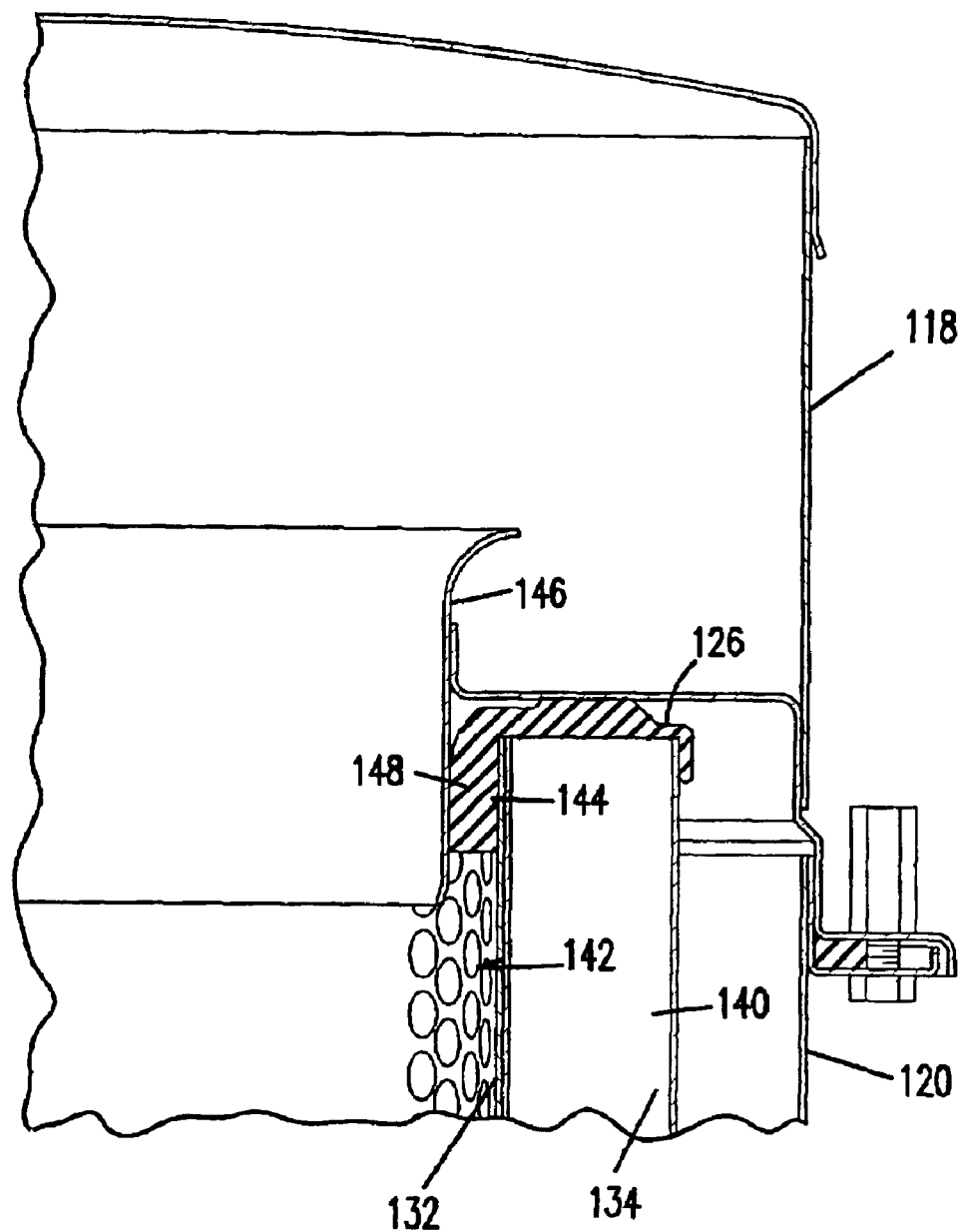
FIG. 27 is an enlarged, cross-sectional view of the primary filter element operably installed in the air cleaner housing taken along the line 8—8 of FIG. 25.

In FIG. 26, an exploded view of the air cleaner 115 is depicted. A filter element 124 is shown removed from the housing 116. The filter element 124 includes first and second opposite end caps 126, 128; an outer liner 130 extending between the first and second end caps 126, 128; an inner liner 132 (FIG. 27) also extending the first and second end caps 126, 128; and a media pack 134 (FIG. 27). In general, the filter element 124 is removable and replaceable from the housing 116. Fasteners 136, 138 are shown in FIG. 26. It can be appreciated from reviewing FIG. 26 that the air intake hood 118 can be removed from the can 120 by disconnecting the fasteners 136, 138. Once the intake hood 118 is removed from the can 120, it provides access to the filter element 124. The filter element 124 may then be grasped and removed from the can 120. A replacement filter element may then be installed to refurbish the air cleaner 115.

Figure 28:
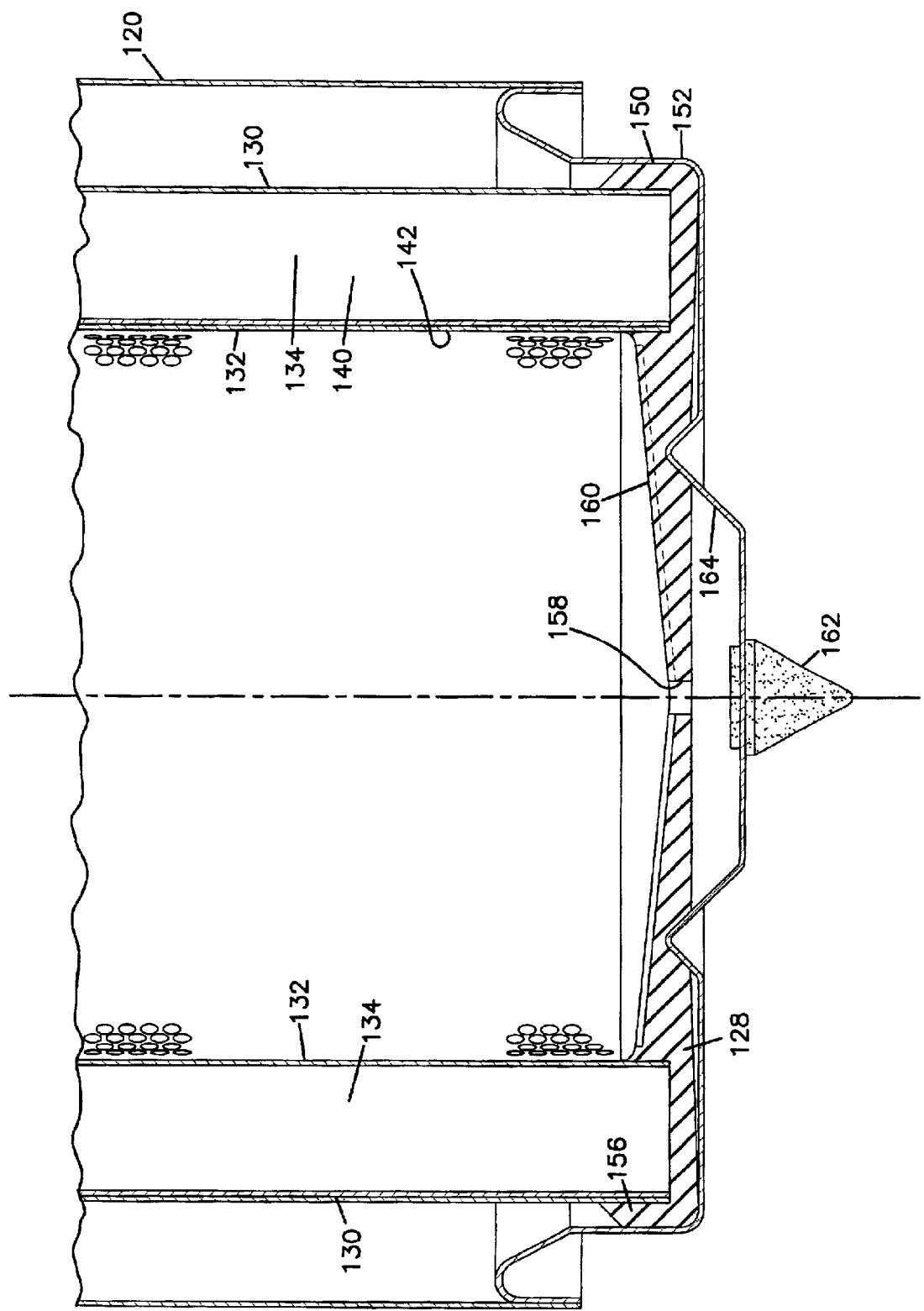
FIG. 28 is an enlarged, cross-sectional view of another portion of the primary filter element operably installed in the air cleaner housing taken along the line 9—9 of FIG. 25.

The media pack 134, in the preferred embodiment, takes the form of a tubular, usually cylindrical, pleated construction 140. The pleated construction 140 defines an open filter interior 142 (FIGS. 27 and 28). The media is preferably formulated for high temperature (greater than 140° F.) conditions.

Referring now to FIGS. 27 and 28, it can be seen how the filter element 124 seals within the can 120. In FIG. 27, the first end cap 126 includes a sealing portion 144, which is compressible and deflectable. The sealing portion 144 is at a radially inwardly part of the end cap 126. When the air inlet hood 118 is mounted over the element 124, the inlet tube 146 of the hood 118 presses against the sealing portion 144 and compresses the material of the end cap 126 against the inner liner 132. This forms a radial seal 148 between and against the inlet tube 146 and the inner liner 142. Indeed, the construction and manner in which the radial seal 148 is formed is analogous to the sealing portion 66 and radial seal 72 in the embodiment of FIGS. 21–23. The sealing portion 144 is preferably constructed out of the same polyurethane foam described above with respect to the sealing portion 66.

In FIG. 28, the bottom end cap 128 is shown forming another radial seal 150 between and against the outer liner 130 and the wall 152 of the can 120. In this case, the radial seal 150 is outwardly directed, somewhat analogous to the manner in which the safety element 34 forms radial seal 108. In FIG. 26, it can be seen that the end cap 128 includes a stepped construction 154 along the sealing portion 156, which corresponds to the outside radial portion of the end cap 128. The sealing portion 156 deflects and compresses when the filter element 124 is operably installed in the can 120 and within the wall 152. In particular, the sealing portion 156 is compressed between and against the outer liner 130 and the wall 152 to form the radial seal 150. Preferred end cap materials include the same polyurethane foam described above for the sealing portion 144 and sealing portion 66.

In FIG. 28, it can also be appreciated that the second end cap 128 defines an aperture 158. Preferably, the aperture 158 is centrally located. The aperture 158 allows for the drainage of moisture that collects in the filter interior 142. The end cap 128 is sloped to form a funnel surface 160, by sloping from the inner liner 132 to the central aperture 158. This funnel surface 160 helps to direct collected moisture into the aperture 158 and outside of the filter element 124. Periodically, a plug 162 may be removed from the can 120 to drain the moisture that collects in the pan 164.

Figure 29:
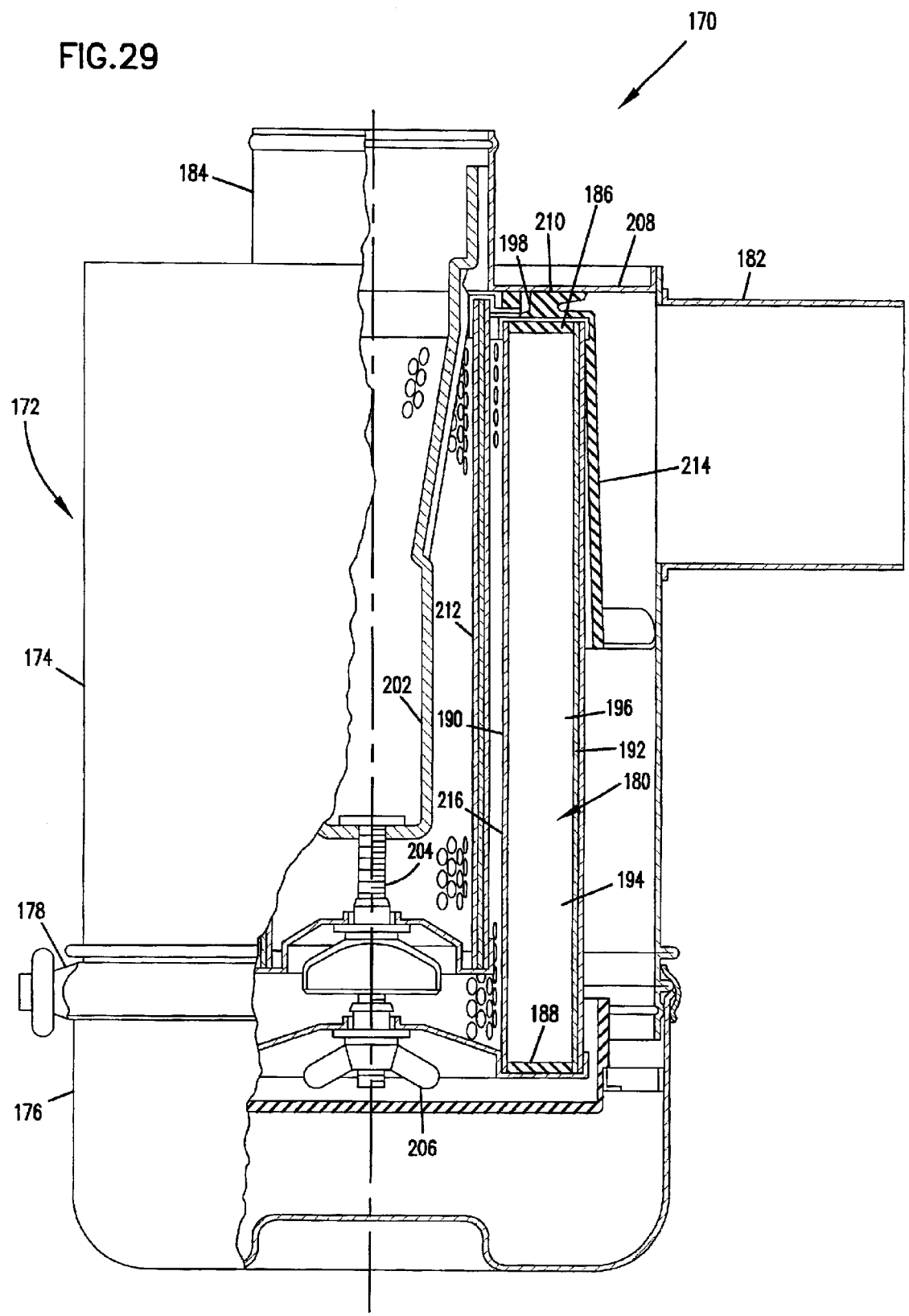
FIG. 29 is a side elevational, partially fragmented and partially cross-sectional view of another air cleaner that may be utilized with the engine system depicted in FIG. 20.

Attention is now directed to FIG. 29, where another embodiment of an air cleaner 170 is depicted. Air cleaner 170 is usable in the engine system 20. The structure and geometry is described, in general, in U.S. Pat. No. 4,020,783, which is incorporated herein by reference.

The air cleaner 170 is of the type generally referred to as an axial sealing air cleaner. The air cleaner 170 includes a housing 172, which has a body 174 and a removable cover 176. The cover 176 may be selectively removed from the body 174 by loosening the clamp arrangement 178. This will expose and give access to the removable and replaceable filter element 180. The body 174 includes a side or tangential inlet tube 182 and an outlet tube 184. Dirty air to be cleaned before being channeled into the engine intake 23 flows through the inlet tube 182, through the filter element 180, and exits through the outlet tube 184.

The filter element 180 includes first and second end caps 186, 188; an inner and outer liner 190, 192 extending between the first and second end caps 186, 188; and a media pack 194 bonded to the first and second end caps 186, 188.

The media pack 194 is depicted as a tubular, preferably cylindrical pleated construction 196. The particular materials for the media in the pleated construction 196 is formulated for operation in a high temperature environment such as the engine system 20.

In this embodiment, the first and second end caps 186, 188 are constructed of sheet metal. The first end cap 186 supports an axially directed seal member 198. The air cleaner 170 includes a yoke construction 202, which includes a bolt 204 and a wing nut 206. The wing nut 206 can be rotated about the bolt 204 and cause axially directed forces between the end wall 208 of the body 174 and the seal member 198 to form an axial seal 210 between and against the first end cap 186 and the wall 208 of the body 174.

The air cleaner 170 also includes a safety element 212 operably installed therein. Other features of the housing 172 include a baffle member 214 in order to deflect air taken in through the inlet tube 182.

In operation, air to be filtered flows through the inlet tube 182, is deflected by the baffle member 214, and swirls within the housing 172. The swirling action causes the heavier dust particles to drop by gravity to the bottom cover 176. The air to be cleaned then flows through the media pack 194 and into the open filter interior 216. It then flows through the safety element 212 and through the porous yoke construction 202, before it finally passes out through the outlet tube 184. The cleaned air is then directed to an intake, such as air intake 123 of engine 122.

Figure 30:
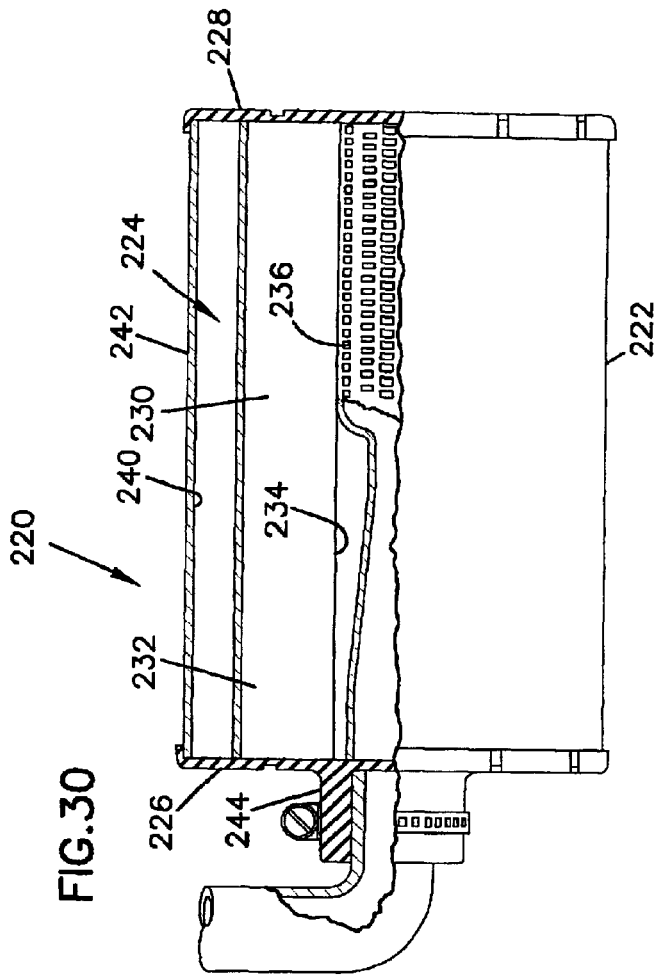
FIG. 30 is a fragmented, side elevational, partially cross-sectional view of another air cleaner that may be utilized with the engine system depicted in FIG. 20.
Figure 31:
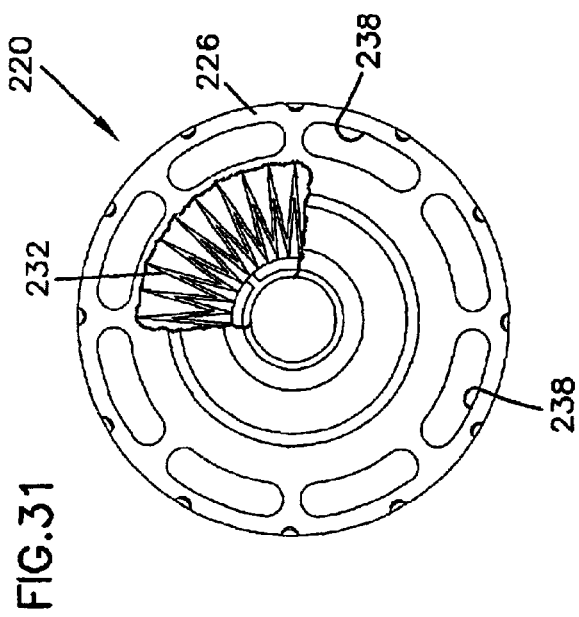
FIG. 31 is an end elevational, partially fragmented view of the air cleaner depicted in FIG. 30.

In FIGS. 30 and 31, another air cleaner 220 is depicted that is usable in the engine system 120. The structure and geometry of air cleaner 220 is described in U.S. Pat. Nos. 5,112,372 and 4,350,509, each of which is incorporated by reference herein.

The air cleaner 220 includes a housing 222 that is preferably integral with a filter element 224. As such, the filter element 224 includes first and second end caps 226, 228 that is integral with the housing 222. The filter element 224 includes a media pack 230 secured to the first and second end caps 226, 228 and extending therebetween. The media pack 230 comprises a tubular, preferably cylindrical, pleated construction 232 defining an open filter interior 234. The pleated construction 232 is preferably made from media formulations as described below which are particularly adapted for high temperature applications.

The air cleaner 220 also includes a resonator 236 oriented within the open interior 234.

FIG. 31 is an end view of the air cleaner 220. To provide a source of intake air for the air cleaner 220, at least one aperture is formed in one of the end caps 226, 228. In the particular one illustrated in FIG. 31, a plurality of apertures 238 are defined by the first end cap 226 to allow air to enter the air cleaner 220 and occupy the volume 240 between the housing wall 242 and the media pack 230.

An outlet tube 244 projects from the first end cap 226 and allows for the exit of cleaned air from the air cleaner 220.

In operation, air to be filtered enters the air cleaner 220 through the apertures 238 and flows into the volume 240. The air then flows through the pleated construction 232 and into the open filter interior 234. The sound is attenuated by the resonator 236, and the cleaned air flows through the outlet tube 244 to exit the air cleaner 220. From there, the air is directed to an air intake, such as intake region 23 of system 20.

Figure 32:
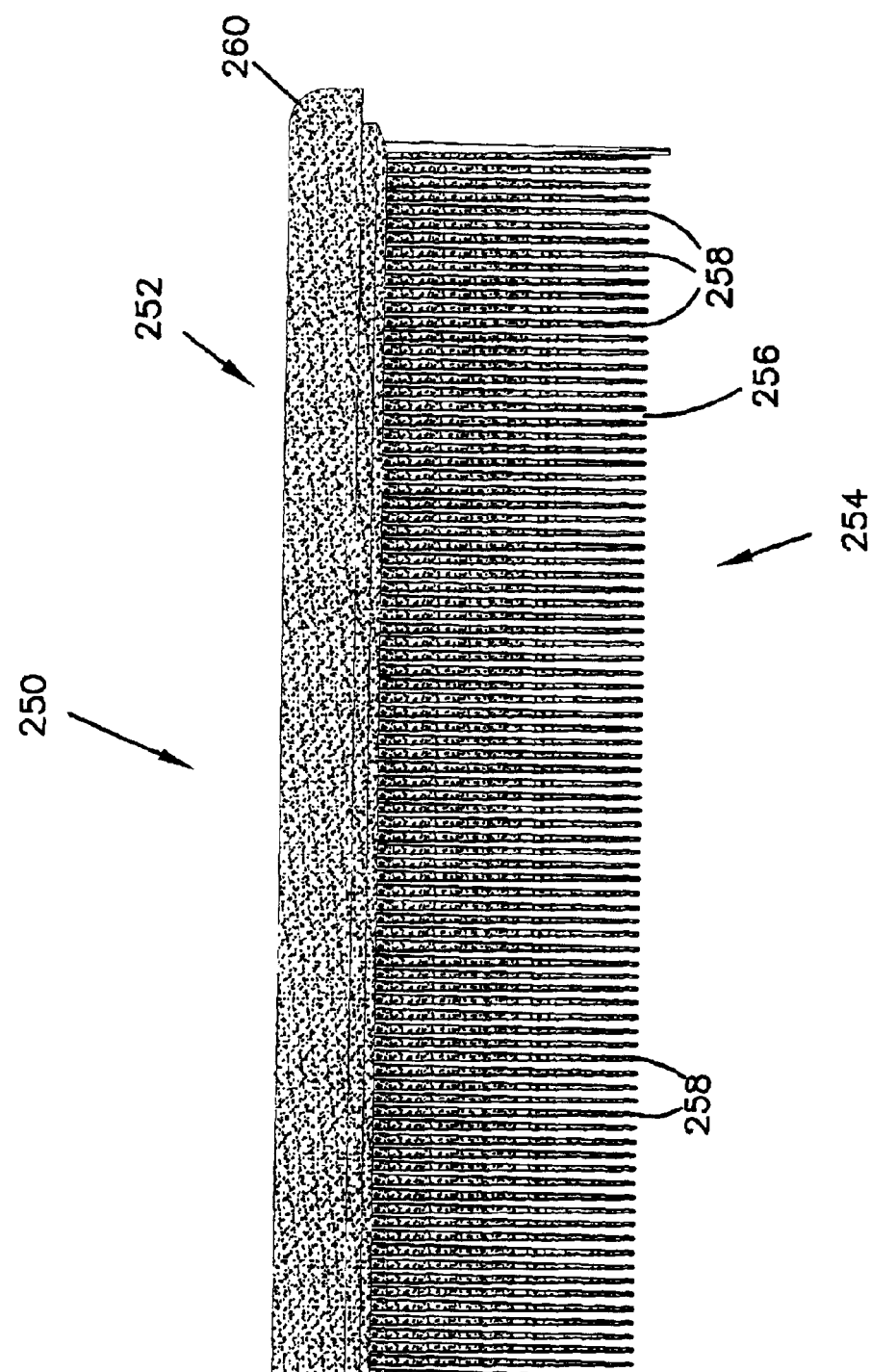
FIG. 32 is a side elevational view of a panel filter element that may be utilized with the engine system depicted in FIG. 20.
Figure 33:
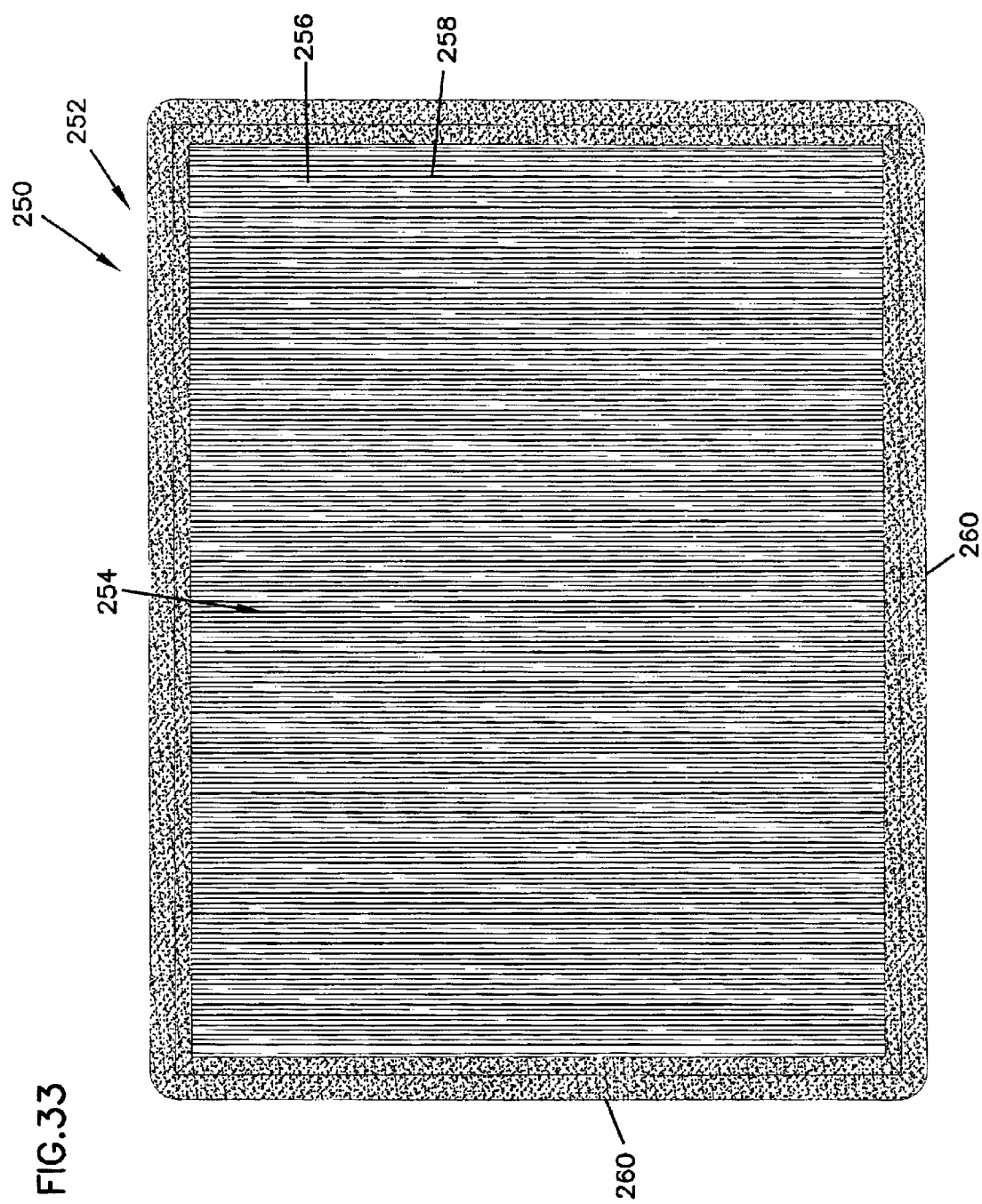
FIG. 33 is a top plan view of the panel filter depicted in FIG. 32.

Another embodiment of a filter element is shown in FIGS. 32 and 33. In this embodiment, the filter element 250 takes the form of a panel filter 252. The panel filter element 252 includes a media pack 254 in the form of a pleated construction 256. As can be seen from review of FIGS. 32 and 33, the pleated construction 256 forms generally a flat panel with a plurality of pleats 258.

The panel filter construction 252 has an outer perimeter gasket member 260 in order to form a seal with a cooperating housing.

The media pack 254 includes a media construction that is specially formulated for operation in high temperature conditions, such as in engine system 20. The panel filter element 252 with the specially formulated media pack 254 is also usable in systems such as fluid compressors.

E. Typical System; Fluid Compressor

Figure 34:
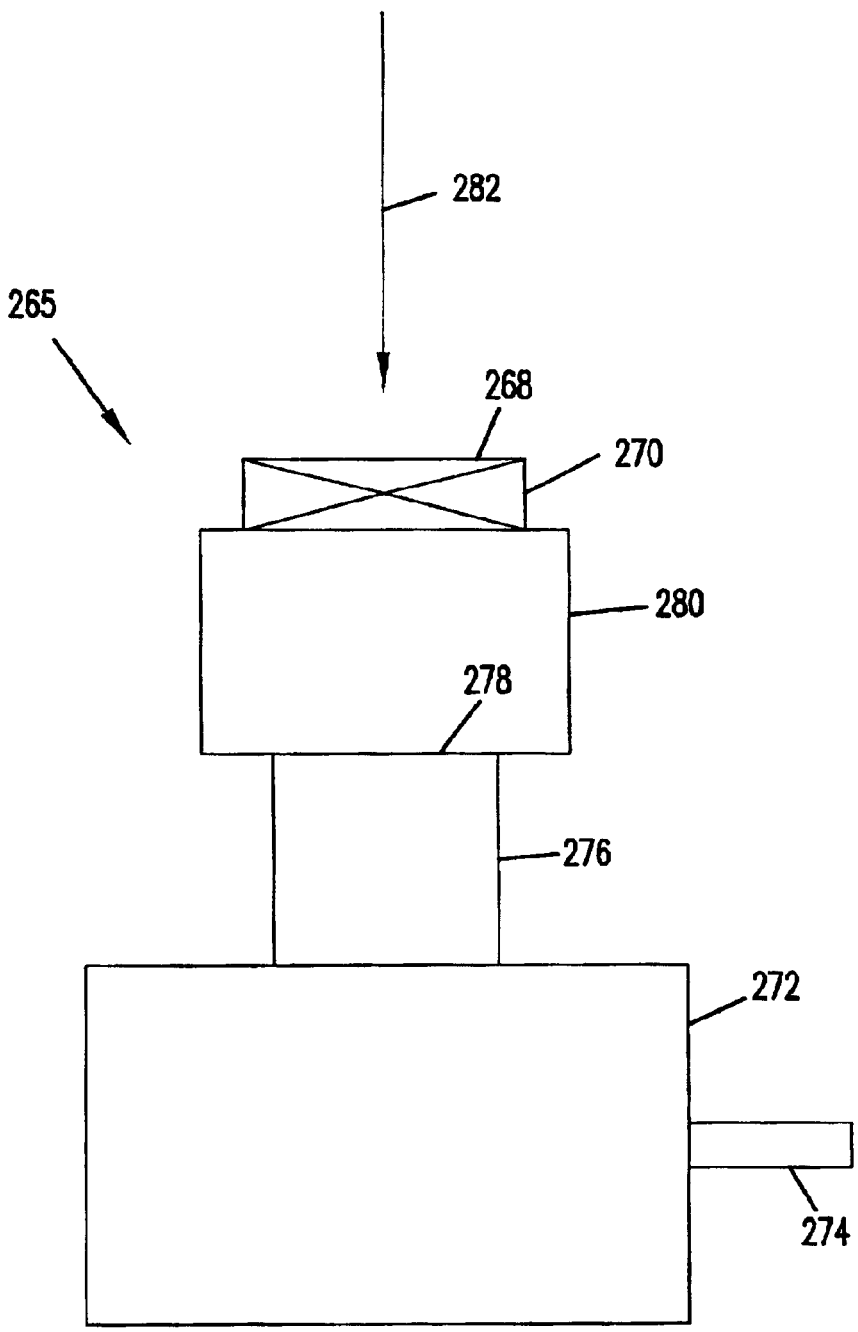
FIG. 34 is a schematic view of a system having a fluid compressor with an air intake system and a primary filter element therein.

A fluid compressor is shown schematically in FIG. 34 at 265. The fluid compressor 265 includes an air cleaner 268 with a filter element 270. One usable filter element 270 is the panel filter construction 252 (FIGS. 32 and 33). The fluid compressor 265 includes a frame 272 that encloses a crankshaft 274 and piston connecting rods for driving piston members in a conventional manner through a cylinder 276. A valve plate 278 is sandwiched between the top of the cylinder 276 and a compressor head 280. In general, the compressor 265 is a reciprocating, piston type compressor well known to one skilled in the art. Air to be compressed enters the compressor 265 in the direction shown at arrow 282. The air flows through the air cleaner 268, where particulates are removed by the filter element 270. The cleaned air then flows into the head 280, and the compressor 265 operates to compress the air.

Compressors 265 are sometimes used in environments that are high temperature (greater than 140° F.).

F. Typical Media Sizes

For the filter elements described herein, each preferably includes a pleated construction. In these types of applications, the pleat length is at least 6 inches, no greater than 50 inches, and may be 8–40 inches. The pleat depth is usually at least 0.5 inches, no greater than 12 inches, and may be 1–6 inches.

For tubular constructions, the outer diameter of the pleated construction is usually at least 4 inches, no greater than 50 inches, and may typically be 6–30 inches. For panel filter constructions, there are usually at least 40 pleats, no greater than 200 pleats, and typically 50–100 pleats.

G. Typical System; Tank with Gas Turbine

Figure 35:
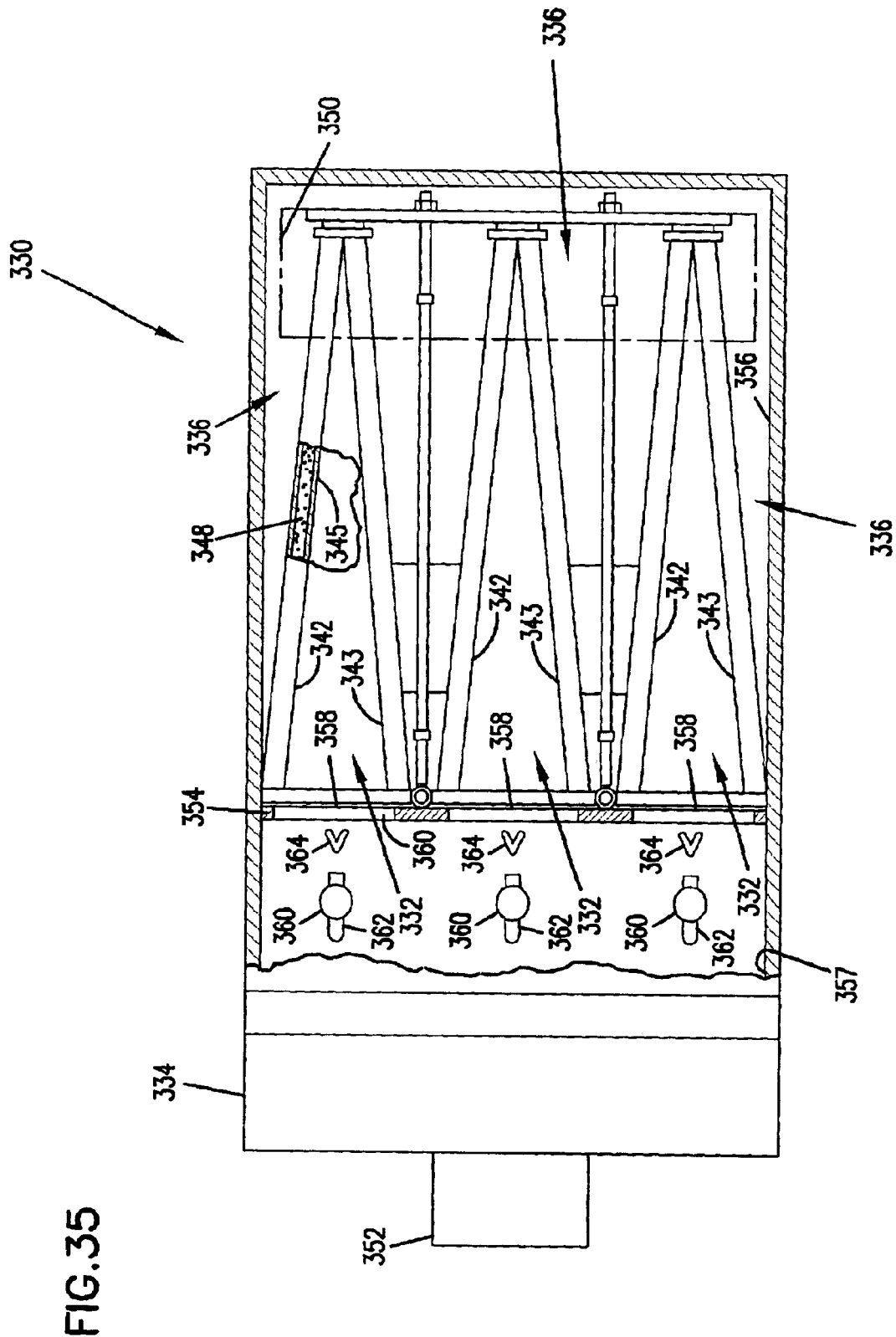
FIG. 35 is a plan view of an air filter arrangement, with a portion broken away.

In FIGS. 35, 36 and 37, an M1 tank filter is shown. The M1 tank is gas turbine powered. The turbine engine is generally located under armor plating. The gas turbine engine requires large amounts of ambient air for operation. The ambient air should be filtered for removal of particulate matter therein before it is directed into the gas turbine engine. The tank includes an air inlet to take in air for the turbine engine. The tank includes an air cleaner under the armor plating at. The tank also includes a scavenger outlet for exhaust of particulate material from the air cleaner.

H. Example Air Cleaner for Tank

In FIGS. 35, 36 and 37, one example air cleaner 330 useable in the tank is illustrated. The air cleaner 330 includes a plurality of filter elements 332 positioned within a filter housing 334. For the particular arrangement shown, each filter element 332 includes a V-shaped media pack 336. In the one shown, the housing 334 is sized to operably receive 3 V-shaped media packs 336 therein, aligned side by side but spaced apart, during use and assembly.

With the exception of the preferred media formulation described below in Section H, the air cleaner 330, together with the system for the tank is described in U.S. Pat. No. 5,575,826, which is incorporated by reference herein. Further, other than the preferred media formulation discussed in Section H below, each of the V-shaped media packs 336 is described in U.S. Pat. No. 4,364,751, which is incorporated herein by reference.

In reference to FIGS. 35, 36 and 37, each media pack 336 includes a frame 338 with end caps 340, 341. For the embodiment shown, each V-shaped media pack 336 includes 2 panels 342, 343 oriented in a V-shaped configuration with an internal channel or space 345 positioned therebetween. For the arrangement utilized, each internal space 345 is divided into 3 compartments by internal baffles 346, 347.

Panels 342, 343 are each occupied by pleated filter media 348. The pleated media 348 includes cellulose media treated with fine fiber. This type of media helps to improve the efficiency of the air cleaner 330 in high temperature environments, such as those that the tank experiences.

In FIGS. 35, 36 and 37, the filter housing 334 includes an inlet 350, and an outlet 352. Each of the 3 media packs 336 can be seen within the housing 334, arranged side-by-side. A partition 354 provides a surface in which each of the media packs 336 seals against in order to separate the dirty air side 356 from the clean air side 357. In particular, each of the media packs 336 includes a gasket 358 that compresses against the partition 354 and helps to inhibit airflow from the dirty side 356 from bypassing the media 348 and flowing directly into the clean side 357. The partition 354 includes airflow apertures 360 in order to allow for the flow of cleaned air from the volume or space 345 and into the clean air side 357.

Operation of the V-shaped media packs 336 is generally as follows. The air enters the air cleaner 330 through the inlet 352 in the housing 334. The air enters the panels 342, 343 and is directed toward the internal space 345. Particulate material is left on the exterior surfaces of the panels 342, 343 (on the side or surface of the panel directed away from the internal space 345) or on the developing filter cake. The filtered air occupies the internal volume 345 and flows through the ports or apertures 360 and into the clean air side 357. From there, the air flows out through the outlet 352 and is directed to the gas turbine.

The air cleaner 330 also includes a pulse jet system for cleaning. In general, such a system provides for a selected jet pulse of air directed backwards through the filter panels 342, 343. By backwards in this context, it is meant that the pulse jet is directed opposite to normal air flow (i.e., filtering air flow) during filtering of ambient air. For the arrangements shown, this direction would be with the pulse jet aimed into space 345 to ultimately direct air through the panels 342, 343 and then outwardly from the surface of the pleated media 348.

In FIG. 35, a pulse jet cleaning systems includes 3 valves 360 connected to stand pipes 362, which are in air flow communication with compressed air. Each of the valves 360 connect with diffusers nozzles 364, that are positioned so that the nozzles are directed centrally into the chambers or spaces 345.

Periodically, all or selected ones of the pulse jet valves 360 may be opened to release a pulse or jet of air into an associated portion of the internal space 345 of the V-shaped media pack 336. This jet pulse will tend to flush dirt, dust, or the like off of the panels 342, 343. The particulate material will tend to disburse into the region immediately surrounding the panel from which it is flushed.

I. Preferred Media Formulations

For each of the filter elements described herein, the media packs include a media composite, which includes a substrate at least partially treated or coated or covered by a layer of non-woven fibers.

The fine fibers that comprise the micro- or nanofiber containing layer of the invention can be fiber and can have a diameter of about 0.001 to 10 micron, preferably 0.05 to 0.5 micron. In certain applications, the fiber can be sized to 0.001 to 2 microns, 0.01 to 5 microns and 0.05 to 10 microns. The thickness of the typical fine fiber filtration layer ranges from about 1 to 100 times the fiber diameter with a basis weight ranging from about 0.01 to 240 micrograms-cm$^{-2}$.

Fluid streams such as air and gas streams often carry particulate material therein. The removal of some or all of the particulate material from the fluid stream is needed. For example, air intake streams to the cabins of motorized vehicles, air in computer disk drives, HVAC air, clean room ventilation and applications using filter bags, barrier fabrics, woven materials, air to engines for motorized vehicles, or to power generation equipment; gas streams directed to gas turbines; and, air streams to various combustion furnaces, often include particulate material therein. In the case of cabin air filters it is desirable to remove the particulate matter for comfort of the passengers and/or for aesthetics. With respect to air and gas intake streams to engines, gas turbines and combustion furnaces, it is desirable to remove the particulate material because particulate can cause substantial damage to the internal workings to the various mechanisms involved. In other instances, production gases or off gases from industrial processes or engines may contain particulate material therein. Before such gases can be, or should be, discharged through various downstream equipment to the atmosphere, it may be desirable to obtain a substantial removal of particulate material from those streams.

A general understanding of some of the basic principles and problems of air filter design can be understood by consideration of the following types of filter media: surface loading media; and, depth media. Each of these types of media has been well studied, and each has been widely utilized. Certain principles relating to them are described, for example, in U.S. Pat. Nos. 5,082,476; 5,238,474; and 5,364,456. The complete disclosures of these three patents are incorporated herein by reference.

The "lifetime" of a filter is typically defined according to a selected limiting pressure drop across the filter. The pressure buildup across the filter defines the lifetime at a defined level for that application or design. Since this buildup of pressure is a result of load, for systems of equal efficiency a longer life is typically directly associated with higher capacity. Efficiency is the propensity of the media to trap, rather than pass, particulates. It should be apparent that typically the more efficient a filter media is at removing particulates from a gas flow stream, in general the more rapidly the filter media will approach the "lifetime" pressure differential (assuming other variables to be held constant).

Paper filter elements are widely used forms of surface loading media. In general, paper elements comprise dense mats of cellulose, synthetic or other fibers oriented across a gas stream carrying particulate material. The paper is generally constructed to be permeable to the gas flow, and to also have a sufficiently fine pore size and appropriate porosity to inhibit the passage of particles greater than a selected size therethrough. As the gases (fluids) pass through the filter paper, the upstream side of the filter paper operates through diffusion and interception to capture and retain selected sized particles from the gas (fluid) stream. The particles are collected as a dust cake on the upstream side of the filter paper. In time, the dust cake also begins to operate as a filter paper, increasing efficiency. This is sometimes referred to as "seasoning," i.e. development of an efficiency greater than initial efficiency.

A simple filter design such as that described above is subject to at least two types of problems. First, a relatively simple flaw, i.e. rupture of the paper, results in failure of the system. Secondly, particulate material rapidly builds up on the upstream side of the filter, as a thin dust cake or layer, increasing the pressure drop. Various methods have been applied to increase the "lifetime" of surface-loaded filter systems, such as paper filters. One method is to provide the media in a pleated construction, so that the surface area of media encountered by the gas flow stream is increased relative to a flat, non-pleated construction. While this increases filter lifetime, it is still substantially limited. For this reason, surface loaded media has primarily found use in applications wherein relatively low velocities through the filter media are involved, generally not higher than about 20–30 feet per minute and typically on the order of about 10 feet per minute or less. The term "velocity" in this context is the average velocity through the media (i.e. flow volume per media area).

In general, as air flow velocity is increased through a pleated paper media, filter life is decreased by a factor proportional to the square of the velocity. Thus, when a pleated paper, surface loaded, filter system is used as a particulate filter for a system that requires substantial flows of air, a relatively large surface area for the filter media is needed. For example, a typical cylindrical pleated paper filter element of an over-the-highway diesel truck will be about 9–15 inches in diameter and about 12–24 inches long, with pleats about 1–2 inches deep. Thus, the filtering surface area of media (one side) is typically 30 to 300 square feet.

In many applications, especially those involving relatively high flow rates, an alternative type of filter media, sometimes generally referred to as "depth" media, is used. A typical depth media comprises a relatively thick tangle of fibrous material. Depth media is generally defined in terms of its porosity, density or percent solids content. For example, a 2–3% solidity media would be a depth media mat of fibers arranged such that approximately 2–3% of the overall volume comprises fibrous materials (solids), the remainder being air or gas space.

Another useful parameter for defining depth media is fiber diameter. If percent solidity is held constant, but fiber diameter (size) is reduced, pore size or interfiber space is reduced; i.e. the filter becomes more efficient and will more effectively trap smaller particles.

A typical conventional depth media filter is a deep, relatively constant (or uniform) density, media, i.e. a system in which the solidity of the depth media remains substantially constant throughout its thickness. By "substantially constant" in this context, it is meant that only relatively minor fluctuations in density, if any, are found throughout the depth of the media. Such fluctuations, for example, may result from a slight compression of an outer engaged surface, by a container in which the filter media is positioned.

Gradient density depth media arrangements have been developed. some such arrangements are described, for example, in U.S. Pat. Nos. 4,082,476; 5,238,474; and 5,364,456. In general, a depth media arrangement can be designed to provide "loading" of particulate materials substantially throughout its volume or depth. Thus, such arrangements can be designed to load with a higher amount of particulate material, relative to surface loaded systems, when full filter lifetime is reached. However, in general the tradeoff for such arrangements has been efficiency, since, for substantial loading, a relatively low solidity media is desired. Gradient density systems such as those in the patents referred to above, have been designed to provide for substantial efficiency and longer life. In some instances, surface loading media is utilized as a "polish" filter in such arrangements.

A filter media construction according to the present invention includes a first layer of permeable coarse fibrous media or substrate having a first surface. A first layer of fine fiber media is secured to the first surface of the first layer of permeable coarse fibrous media. Preferably the first layer of permeable coarse fibrous material comprises fibers having an average diameter of at least 10 microns, typically and preferably about 12 (or 14) to 30 microns. Also preferably the first layer of permeable coarse fibrous material comprises a media having a basis weight of no greater than about 200 grams/meter$^2$, preferably about 0.50 to 150 g/m$^2$, and most preferably at least 8 g/m$^2$. Preferably the first layer of permeable coarse fibrous media is at least 0.0005 inch (12 microns) thick, and typically 0.0006 to 0.02 (15 to 500 microns) thick and preferably is about 0.001 to 0.030 inch (25–800 microns) thick.

In preferred arrangements, the first layer of permeable coarse fibrous material comprises a material which, if evaluated separately from a remainder of the construction by the Frazier permeability test, would exhibit a permeability of at least 1 meter(s)/min, and typically and preferably about 2–900 meters/min. Herein when reference is made to efficiency, unless otherwise specified, reference is meant to efficiency when measured according to ASTM-1215-89, with 0.78$\mu$ monodisperse polystyrene spherical particles, at 20 fpm (6.1 meters/min) as described herein.

Preferably the layer of fine fiber material secured to the first surface of the layer of permeable coarse fibrous media is a layer of nano- and microfiber media wherein the fibers have average fiber diameters of no greater than about 2 to 10 microns, generally and preferably no greater than about 5 microns, and typically and preferably have at least some fiber with diameters smaller than 0.5 micron and within the range of about 0.05 to 0.5 micron. Also, preferably the first layer of fine fiber material secured to the first surface of the first layer of permeable coarse fibrous material has an overall thickness that is no greater than about 30 microns, more preferably no more than 20 microns, most preferably no greater than about 10 microns, and typically and preferably that is within a thickness of about 1–8 times (and more preferably no more than 5 times) the fine fiber average diameter of the layer.

Certain preferred arrangements according to the present invention include filter media as generally defined, in an overall filter construction. Some preferred arrangements for such use comprise the media arranged in a cylindrical, pleated configuration with the pleats extending generally longitudinally, i.e. in the same direction as a longitudinal axis of the cylindrical pattern. For such arrangements, the media may be imbedded in end caps, as with conventional filters. Such arrangements may include upstream liners and downstream liners if desired, for typical conventional purposes.

In some applications, media according to the present invention may be used in conjunction with other types of media, for example conventional media, to improve overall filtering performance or lifetime. For example, media according to the present invention may be laminated to conventional media, be utilized in stack arrangements; or be incorporated (an integral feature) into media structures including one or more regions of conventional media. It may be used upstream of such media, for good load; and/or, it may be used downstream from conventional media, as a high efficiency polishing filter.

Certain arrangements according to the present invention may also be utilized in liquid filter systems, i.e. wherein the particulate material to be filtered is carried in a liquid. Also, certain arrangements according to the present invention may be used in mist collectors, for example arrangements for filtering fine mists from air.

According to the present invention, methods are provided for filtering. The methods generally involve utilization of media as described to advantage, for filtering. As will be seen from the descriptions and examples below, media according to the present invention can be specifically configured and constructed to provide relatively long life in relatively efficient systems, to advantage.

Various filter designs are shown in patents disclosing and claiming various aspects of filter structure and structures used with the filter materials. Engel et al., U.S. Pat. No. 4,720,292, disclose a radial seal design for a filter assembly having a generally cylindrical filter element design, the filter element being sealed by a relatively soft, rubber-like end cap having a cylindrical, radially inwardly facing surface. Kahlbaugh et al., U.S. Pat. No. 5,082,476, disclose a filter design using a depth media comprising a foam substrate with pleated components combined with the microfiber materials of the invention. Stifelman et al., U.S. Pat. No. 5,104,537, relate to a filter structure useful for filtering liquid media. Liquid is entrained into the filter housing, passes through the exterior of the filter into an interior annular core and then returns to active use in the structure. Such filters are highly useful for filtering hydraulic fluids. Engel et al., U.S. Pat. No. 5,613,992, show a typical diesel engine air intake filter structure. The structure obtains air from the external aspect of the housing that may or may not contain entrained moisture. The air passes through the filter while the moisture can pass to the bottom of the housing and can drain from the housing. Gillingham et al., U.S. Pat. No. 5,820,646, disclose a Z filter structure that uses a specific pleated filter design involving plugged passages that require a fluid stream to pass through at least one layer of filter media in a "Z" shaped path to obtain proper filtering performance. The filter media formed into the pleated Z shaped format can contain the fine fiber media of the invention. Glen et al., U.S. Pat. No. 5,853,442, disclose a bag house structure having filter elements that can contain the fine fiber structures of the invention. Berkhoel et al., U.S. Pat. No. 5,954,849, show a dust collector structure useful in processing typically air having large dust loads to filter dust from an air stream after processing a workpiece generates a significant dust load in an environmental air. Lastly, Gillingham, U.S. Design Pat. No. 425,189, discloses a panel filter using the Z filter design.

The foregoing general description of the various aspects of the polymeric materials of the invention, the fine fiber materials of the invention including both microfibers and nanofibers and the construction of useful filter structures from the fine fiber materials of the invention provides an understanding of the general technological principles of the operation of the invention. The specific exemplary materials set forth below are examples of materials that can be used in the formation of the fine fiber materials of the invention and the following materials disclose a best mode. These exemplary materials were manufactured with the following characteristics and process conditions in mind. Electrospinning small diameter fiber less than 10 micron is obtained using an electrostatic force from a strong electric field acting as a pulling force to stretch a polymer jet into a very fine filament. A polymer melt can be used in the electrospinning process, however, fibers smaller than 1 micron are best made from polymer solution. As the polymer mass is drawn down to smaller diameter, solvent evaporates and contributes to the reduction of fiber size. Choice of solvent is critical for several reasons. If solvent dries too quickly, then fibers tends to be flat and large in diameter. If the solvent dries too slowly, solvent will redissolve the formed fibers. Therefore matching drying rate and fiber formation is critical. At high production rates, large quantities of exhaust air flow helps to prevent a flammable atmosphere, and to reduce the risk of fire. A solvent that is not combustible is helpful. In a production environment the processing equipment will require occasional cleaning. Safe low toxicity solvents minimize worker exposure to hazardous chemicals. Electrostatic spinning can be done at a flow rate of 1.5 ml/min per emitter, a target distance of 8 inches, an emitter voltage of 88 kV, an emitter rpm of 200 and a relative humidity of 45%.

The choice of polymer system is important for a given application. For pulse cleaning application, an extremely thin layer of microfiber can help to minimize pressure loss and provide an outer surface for particle capture and release. A thin layer of fibers of less than 2-micron diameter, preferably less than 0.3-micron diameter is preferred. Good adhesion between microfiber or nanofiber and substrates upon which the microfibers or nanofibers are deposited is important. When filters are made of composites of substrate and thin layer of micro- and nanofibers, such composite makes an excellent filter medium for self-cleaning application. Cleaning the surface by back pulsing repeatedly rejuvenates the filter medium. As a great force is exerted on the surface, fine fiber with poor adhesion to substrates can delaminate upon a back pulse that passes from the interior of a filter through a substrate to the micro fiber. Therefore, good cohesion between micro fibers and adhesion between substrate fibers and electrospun fibers is critical for successful use.

Products that meet the above requirements can be obtained using fibers made from different polymer materials. Small fibers with good adhesion properties can be made from such polymers like polyvinylidene chloride, poly vinyl alcohol and polymers and copolymers comprising various nylons such as nylon 6, nylon 4,6; nylon 6,6; nylon 6,10 and copolymers thereof. Excellent fibers can be made from PVDF, but to make sufficiently small fiber diameters requires chlorinated solvents. Nylon 6, Nylon 66 and Nylon 6,10 can be electrospun. But, solvents such as formic acid, m-cresol, tri-fluoro ethanol, hexafluoro isopropanol are either difficult to handle or very expensive. Preferred solvents include water, ethanol, isopropanol, acetone and N-methyl pyrrolidone due to their low toxicity. Polymers compatible with such solvent systems have been extensively evaluated. We have found that fibers made from PVC, PVDC, polystyrene, polyacrylonitrile, PMMA, PVDF require additional adhesion means to attain structural properties. We also found that when polymers are dissolved in water, ethanol, isopropanol, acetone, methanol and mixtures thereof and successfully made into fibers, they have excellent adhesion to the substrate, thereby making an excellent filter medium for self-cleaning application. Self-cleaning via back air pulse or twist is useful when filer medium is used for very high dust concentration. Fibers from alcohol soluble polyamides and poly(vinyl alcohol)s have been used successfully in such applications. Examples of alcohol soluble polyamides include Macromelt 6238, 6239, and 6900 from Henkel, Elvamide 8061 and 8063 from duPont and SVP 637 and 651 from Shakespeare Monofilament Company. Another group of alcohol soluble polyamide is type 8 nylon, alkoxy alkyl modifies nylon 66 (Ref. Page 447, Nylon Plastics handbook, Melvin Kohan ed. Hanser Publisher, New York, 1995). Examples of poly(vinyl alcohol) include PVA-217, 224 from Kuraray, Japan and Vinol 540 from Air Products and Chemical Company.

EXPERIMENTAL

The following materials were produced using the following electrospin process conditions.

The following materials were spun using either a rotating emitter system or a capillary needle system. Both were found to produce substantially the same fibrous materials.

The flow rate was 1.5 mil/min per emitter, a target distance of 8 inches, an emitter voltage of 88 kV, a relative humidity of 45%, and for the rotating emitter an rpm of 35.

Example 1

Effect of Fiber Size

Figure 12:
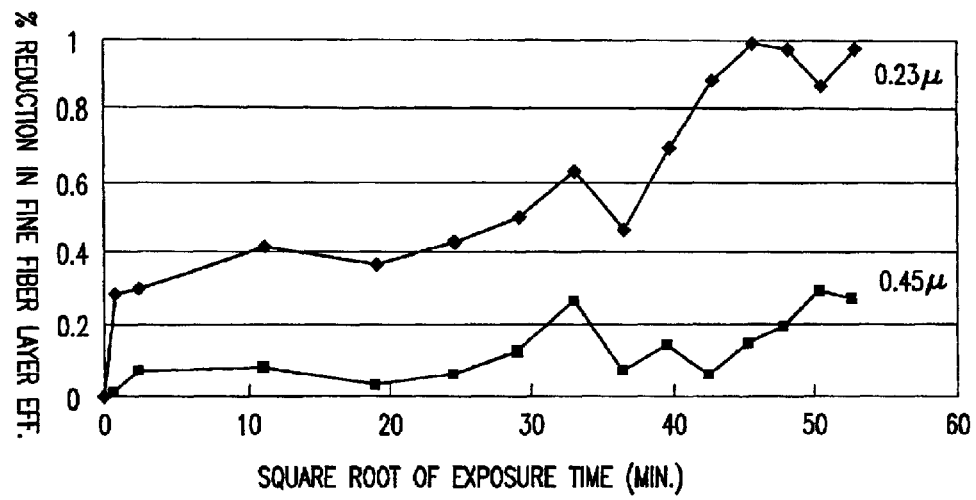
FIG. 12 shows the stability of the 0.23 and 0.45 microfiber material of the invention from Example 5.

Fine fiber samples were prepared from a copolymer of nylon 6, 66, 610 nylon copolymer resin (SVP-651) was analyzed for molecular weight by the end group titration. (J. E. Walz and G. B. Taylor, determination of the molecular weight of nylon, Anal. Chem. Vol. 19, Number 7, pp 448–450 (1947). Number average molecular weight was between 21,500 and 24,800. The composition was estimated by the phase diagram of melt temperature of three component nylon, nylon 6 about 45%, nylon 66 about 20% and nylon 610 about 25%. (Page 286, Nylon Plastics Handbook, Melvin Kohan ed. Hanser Publisher, New York (1995)). Reported physical properties of SVP 651 resin are:

| Property | ASTM Method | Units | Typical Value |
| --- | --- | --- | --- |
| Specific Gravity | D-792 | — | 1.08 |
| Water Absorption (24 hr immersion) | D-570 | % | 2.5 |
| Hardness | D-240 | Shore D | 65 |
| Melting Point | DSC | ° C.(° F.) | 154 (309) |
| Tensile Strength @ Yield | D-638 | MPa (kpsi) | 50 (7.3) |
| Elongation at Break | D-638 | % | 350 |
| Flexural Modulus | D-790 | MPa (kpsi) | 180 (26) |
| Volume Resistivity | D-257 | ohm-cm | $10^{12}$ | to produce fiber of 0.23 and 0.45 micron in diameter. Samples were soaked in room temperature water, air-dried and its efficiency was measured. Bigger fiber takes longer time to degrade and the level of degradation was less as can be seen in the plot of FIG. 12. While wishing not to be limited by certain theory, it appears that smaller fibers with a higher surface/volume ratio are more susceptible to degradation due to environmental effects. However, bigger fibers do not make as efficient filter medium.

Example 2

Cross-linking of Nylon Fibers with Phenolic Resin and Epoxy Resin

In order to improve chemical resistance of fibers, chemical cross-linking of nylon fibers was attempted. Copolyamide (nylon 6, 66, 610) described earlier is mixed with phenolic resin, identified as Georgia Pacific 5137 and spun into fiber. Nylon:Phenolic Resin ratio and its melt temperature of blends are shown here;

| Composition | Melting Temperature (F.°) |
| --- | --- |
| Polyamide:Phenolic = 100:0 | 150 |
| Polyamide:Phenolic = 80:20 | 110 |
| Polyamide:Phenolic = 65:35 | 94 |
| Polyamide:Phenolic = 50:50 | 65 |

We were able to produce comparable fiber from the blends. The 50:50 blend could not be cross-linked via heat as the fibrous structure was destroyed. Heating 65:35 blend below 90 degree C. for 12 hours improves the chemical resistance of the resultant fibers to resist dissolution in alcohol. Blends of polyamide with epoxy resin, such Epon 828 from Shell and Epi-Rez 510 can be used.

Example 3

Surface Modification though Fluoro Additive (Scotchgard®) Repellant

Alcohol miscible Scotchgard® FC-430 and 431 from 3M Company were added to polyamide before spinning. Add-on amount was 10% of solids. Addition of Scotchgard did not hinder fiber formation. THC bench shows that Scotchgard-like high molecular weight repellant finish did not improve water resistance. Scotchgard added samples were heated at 300° F. for 10 minutes as suggested by manufacturer.

Example 4

Modification with Coupling Agents

Polymeric films were cast from polyamides with tinanate coupling agents from Kenrich Petrochemicals, Inc. They include isopropyl triisostearoyl titanate (KR TTS), neopentyl (diallyl) oxytri (dioctyl) phosphato titanate (LICA12), neopentyl (dially) oxy, tri (N-ethylene diamino) ethyl zirconate (NZ44). Cast films were soaked in boiling water. Control sample without coupling agent loses its strength immediately, while coupling agent added samples maintained its form for up to ten minutes. These coupling agents added samples were spun into fiber (0.2 micron fiber).

Example 5

Modification with Low Molecular Weight p-tert-butyl phenol polymer

Oligomers of para-tert-butyl phenol, molecular weight range 400 to 1100, was purchased from Enzymol International, Columbus, Ohio. These low molecular weight polymers are soluble in low alcohols, such as ethanol, isopropanol and butanol. These polymers were added to co-polyamide described earlier and electrospun into 0.2 micron fibers without adverse consequences. Some polymers and additives hinder the electrospinning process. Unlike the conventional phenolic resin described in Example 2, we have found that this group of polymers does not interfere with fiber forming process.

We have found that this group of additive protects fine fibers from wet environment as see in the plot. FIGS. 13–16 show that oligomers provide a very good protection at 140° F., 100% humidity and the performance is not very good at 160° F. We have added this additive between 5% and 15% of polymer used. We have found that they are equally effective protecting fibers from exposure to high humidity at 140° F. We have also found out that performance is enhanced when the fibers are subjected to 150° C. for short period of time.

Table 1 shows the effect of temperature and time exposure of 10% add-on to polyamide fibers.

TABLE 1

Efficiency Retained (%) After 140 deg. F. Soak:

| | Heating Time | | |
| --- | --- | --- | --- |
| Temperature | 1 min | 3 min | 10 min |
| 150 C.° | 98.9 | 98.8 | 98.5 |
| | 98.8 | 98.9 | 98.8 |
| 130 C.° | 95.4 | 98.7 | 99.8 |
| | 96.7 | 98.6 | 99.6 |
| 110 C.° | 82.8 | 90.5 | 91.7 |
| | 86.2 | 90.9 | 85.7 |

This was a surprising result. We saw dramatic improvement in water resistance with this family of additives. In order to understand how this group of additive works, we have analyzed the fine fiber mat with surface analysis techniques called ESCA. 10% add-on samples shown in Table 1 were analyzed with ESCA at the University of Minnesota with the results shown in Table 2.

TABLE 2

Surface Composition (Polymer: Additive Ratio)

| | Heating Time | | |
| --- | --- | --- | --- |
| Temperature | 1 min | 3 min | 10 min |
| 150 C.° | 40:60 | 40:60 | 50:50 |
| 130 C.° | 60:40 | 56:44 | 62:82 |
| 110 C.° | 63:37 | 64:36 | 59:41 |
| No Heat | 77:23 | | |

Initially, it did not seem to make sense to find surface concentration of additive more than twice of bulk concentration. However, we believe that this can be explained by the molecular weight of the additives. Molecular weight of the additive of about 600 is much smaller than that of host fiber forming polymer. As they are smaller in size, they can move along evaporating solvent molecules. Thus, we achieve higher surface concentration of additives. Further treatment increases the surface concentration of the protective additive. However, at 10 min exposure, 150° C., did not increase concentration. This may be an indication that mixing of two components of copolyamide and oligomer molecules is happening as long chain polymer has a time to move around. What this analysis has taught us is that proper selection of post treatment time and temperature can enhance performance, while too long exposure could have a negative influence.

We further examined the surface of these additive laden microfibers using techniques called Time of Flight SIMS. This technique involves bombarding the subject with electrons and observes what is coming from the surface. The samples without additives show organic nitrogen species are coming off upon bombardment with electron. This is an indication that polyamide species are broken off. It also shows presence of small quantity of impurities, such as sodium and silicone. Samples with additive without heat treatment (23% additive concentration on surface) show a dominant species of t-butyl fragment, and small but unambiguous peaks observed peaks observed for the polyamides. Also observed are high mass peaks with mass differences of 148 amu, corresponding to t-butyl phenol. For the sample treated at 10 min at 150° C. (50% surface additive concentration by ESCA analysis), inspection shows dominance of t-butyl fragments and trace, if at all, of peaks for polyamide. It does not show peaks associated with whole t-butyl phenol and its polymers. It also shows a peak associated with $C_2H_3O$ fragments.

The ToF SIMS analysis shows us that bare polyamide fibers will give off broken nitrogen fragment from exposed polymer chain and contaminants on the surface with ion bombardment. Additive without heat treatment shows incomplete coverage, indicating that additives do not cover portions of surface. The t-butyl oligomers are loosely organized on the surface. When ion beam hits the surface, whole molecules can come off along with labile t-butyl fragment. Additive with heat treatment promotes complete coverage on the surface. In addition, the molecules are tightly arranged so that only labile fragments such as t-butyl-, and possibly CH=CH—OH, are coming off and the whole molecules of t-butyl phenol are not coming off. ESCA and ToF SIMS look at different depths of surface. ESCA looks at deeper surface up to 100 Angstrom while ToF SIMS only looks at 10 Angstrom depth. These analyses agree.

Example 6

Development of Surface Coated Interpolymer

Type 8 Nylon was originally developed to prepare soluble and crosslinkable resin for coating and adhesive application. This type of polymer is made by the reaction of polyamide 66 with formaldehyde and alcohol in the presence of acid. (Ref. Cairns, T. L.; Foster, H. D.; Larcher, A. W.; Schneider, A. K.; Schreiber, R. S. J. Am. Chem. Soc. 1949, 71, 651). This type of polymer can be electrospun and can be crosslinked. However, formation of fiber from this polymer is inferior to copolyamides and crosslinking can be tricky.

In order to prepare type 8 nylon, 10-gallon high-pressure reactor was charged with the following ratio:

| | |
|---|---|
| Nylon 66 (duPont Zytel 101) | 10 pounds |
| Methanol | 15.1 pounds |
| Water | 2.0 pounds |
| Formaldehyde | 12.0 pounds |

The reactor is then flushed with nitrogen and is heated to at least 135° C. under pressure. When the desired temperature was reached, small quantity of acid was added as catalyst. Acidic catalysts include trifluoroacetic acid, formic acid, toluene sulfonic acid, maleic acid, maleic anhydride, phthalic acid, phthalic anhydride, phosphoric acid, citric acid and mixtures thereof. Nafion® polymer can also be used as a catalyst. After addition of catalyst, reaction proceeds up to 30 minutes. Viscous homogeneous polymer solution is formed at this stage. After the specified reaction time, the content of the high pressure vessel is transferred to a bath containing methanol, water and base, like ammonium hydroxide or sodium hydroxide to shortstop the reaction. After the solution is sufficiently quenched, the solution is precipitated in deionized water. Fluffy granules of polymer are formed. Polymer granules are then centrifuged and vacuum dried. This polymer is soluble in, methanol, ethanol, propanol, butanol and their mixtures with water of varying proportion. They are also soluble in blends of different alcohols.

Figure 13:
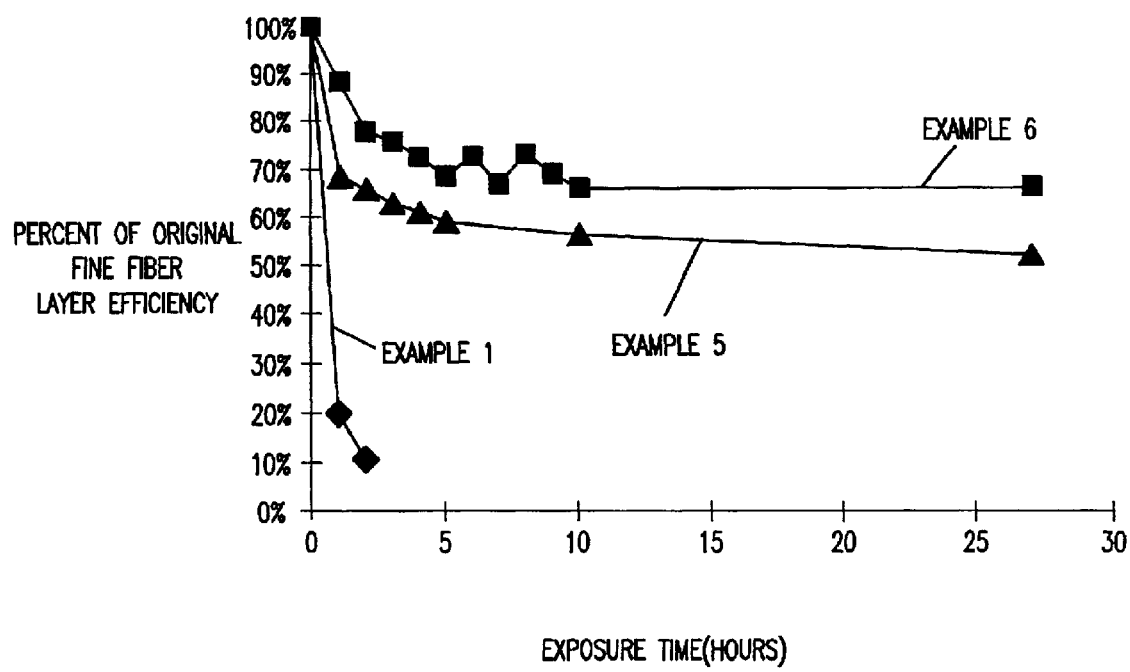
FIGS. 13 through 16 show the improved temperature and humidity stability of the materials of Examples 5 and 6 when compared to unmodified nylon copolymer solvent soluble polyamide.
Figure 14:
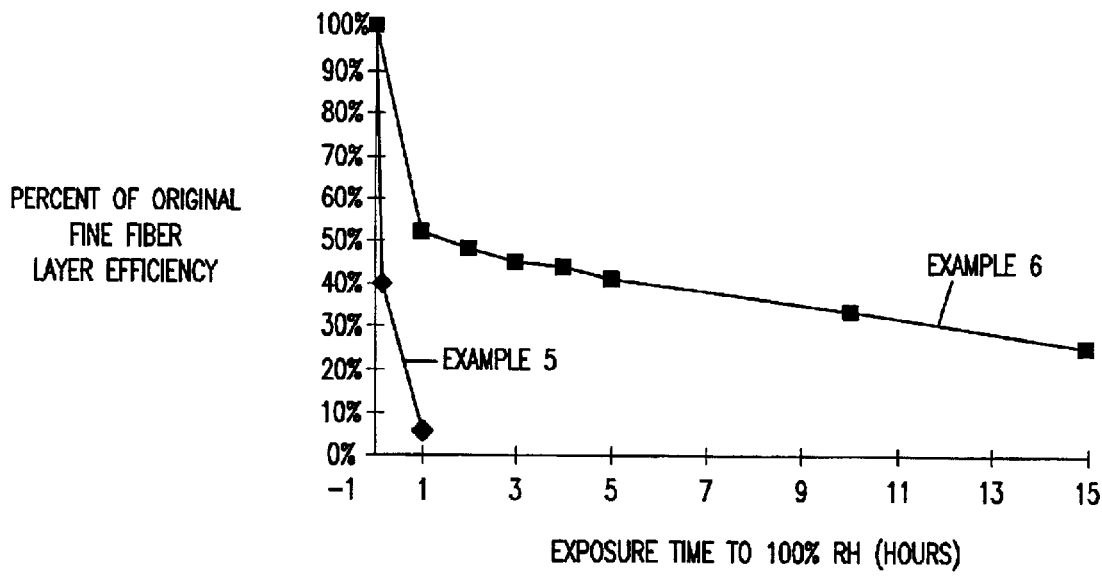
Figure 15:
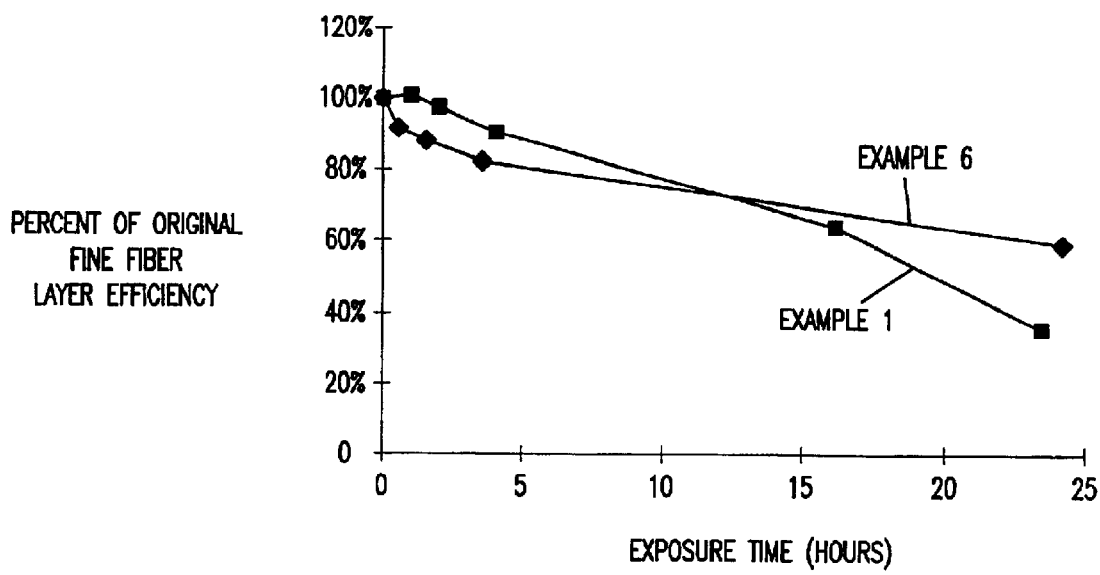
Figure 16:
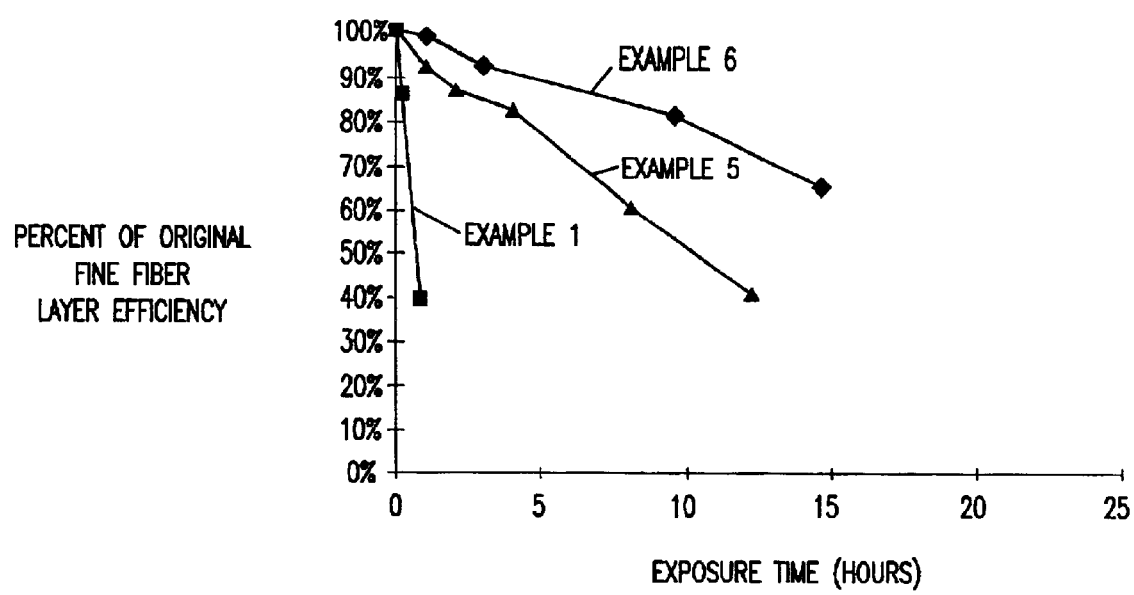
Figure 17:
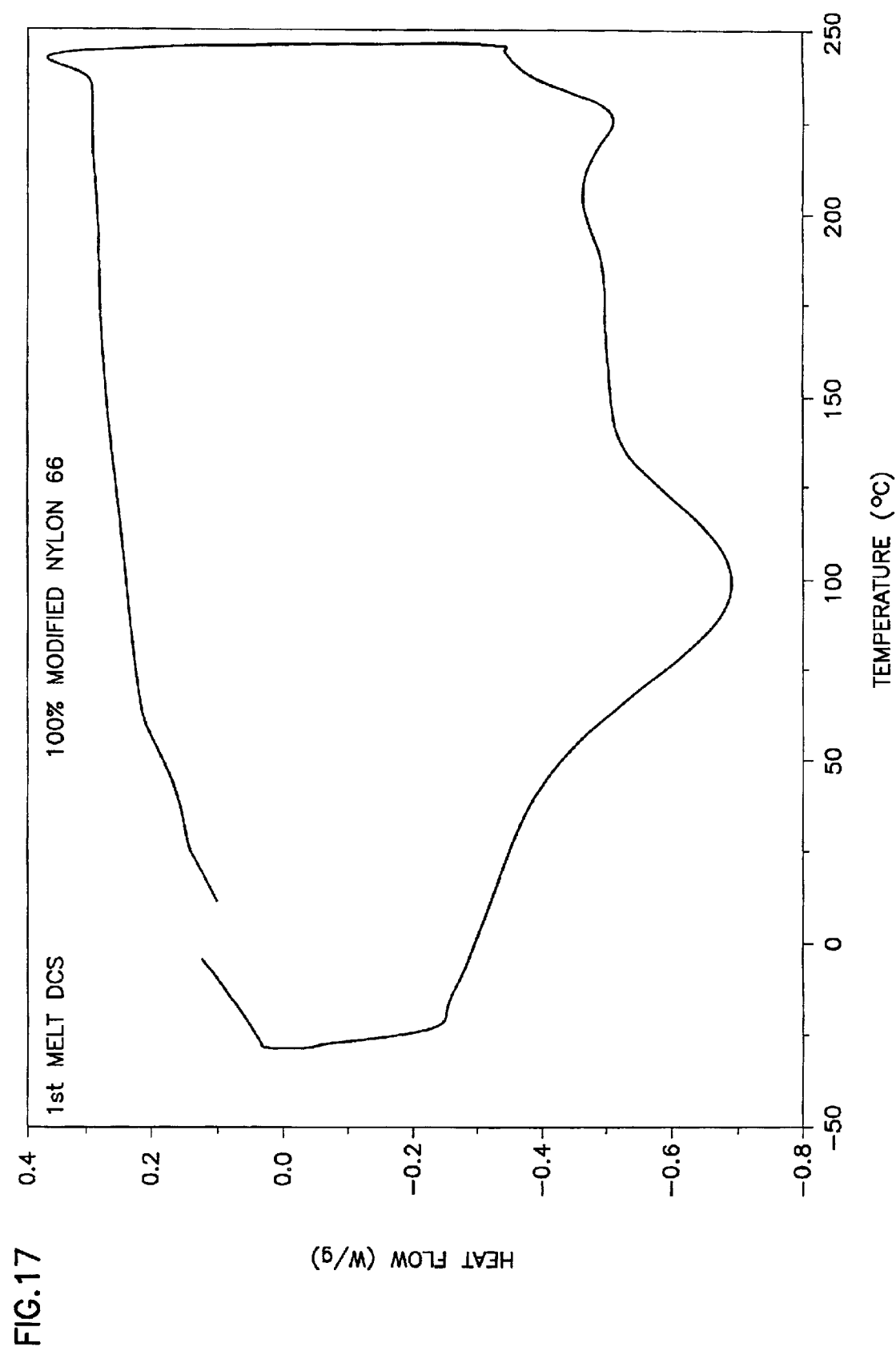
FIGS. 17 through 19a demonstrate that the blend of two copolymers, a nylon homopolymer and a nylon copolymer, once heat treated and combined with additives form a single component material that does not display distinguishable characteristics of two separate polymer materials, but appears to be a crosslinked or otherwise chemically joined single phase.
Figure 18:
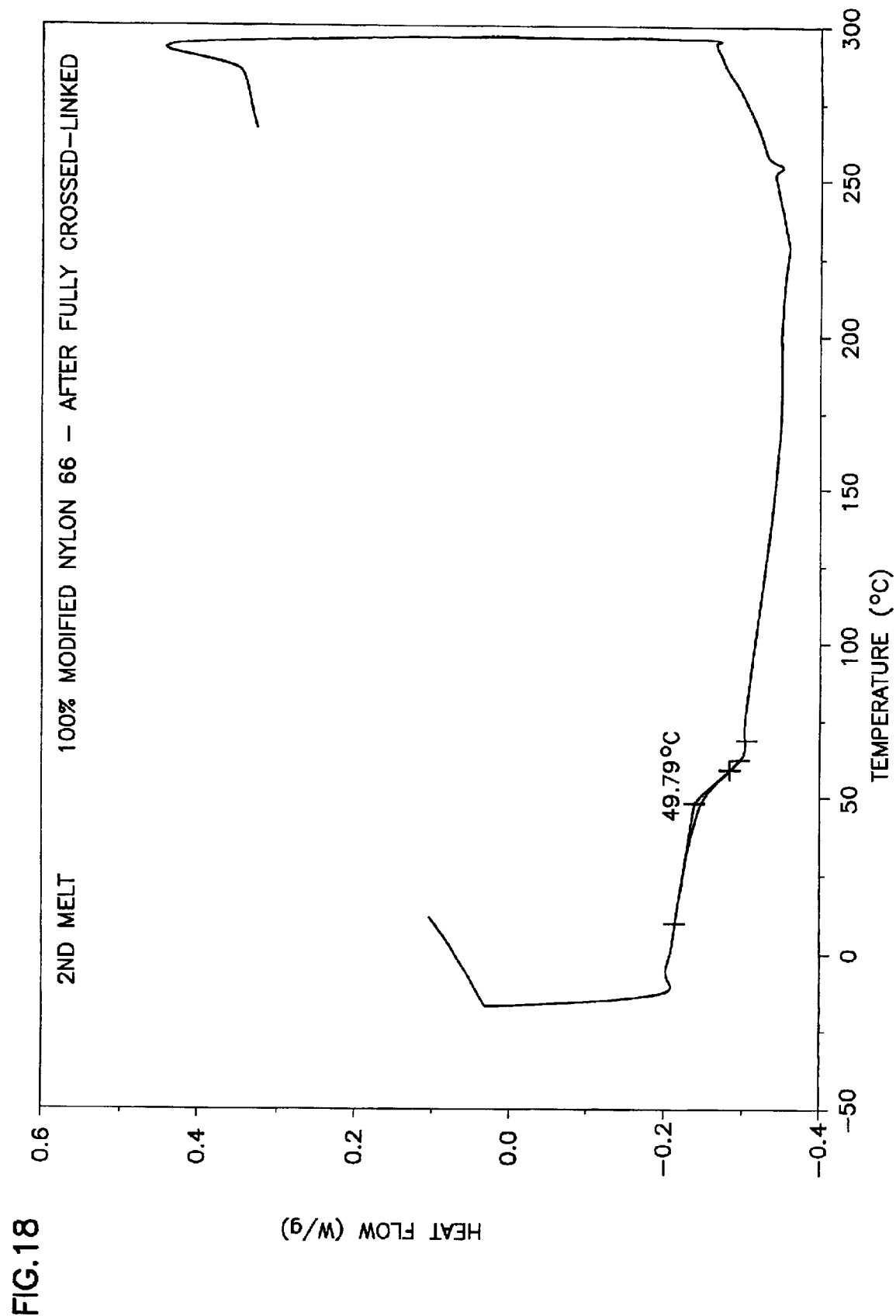
Figure 19:
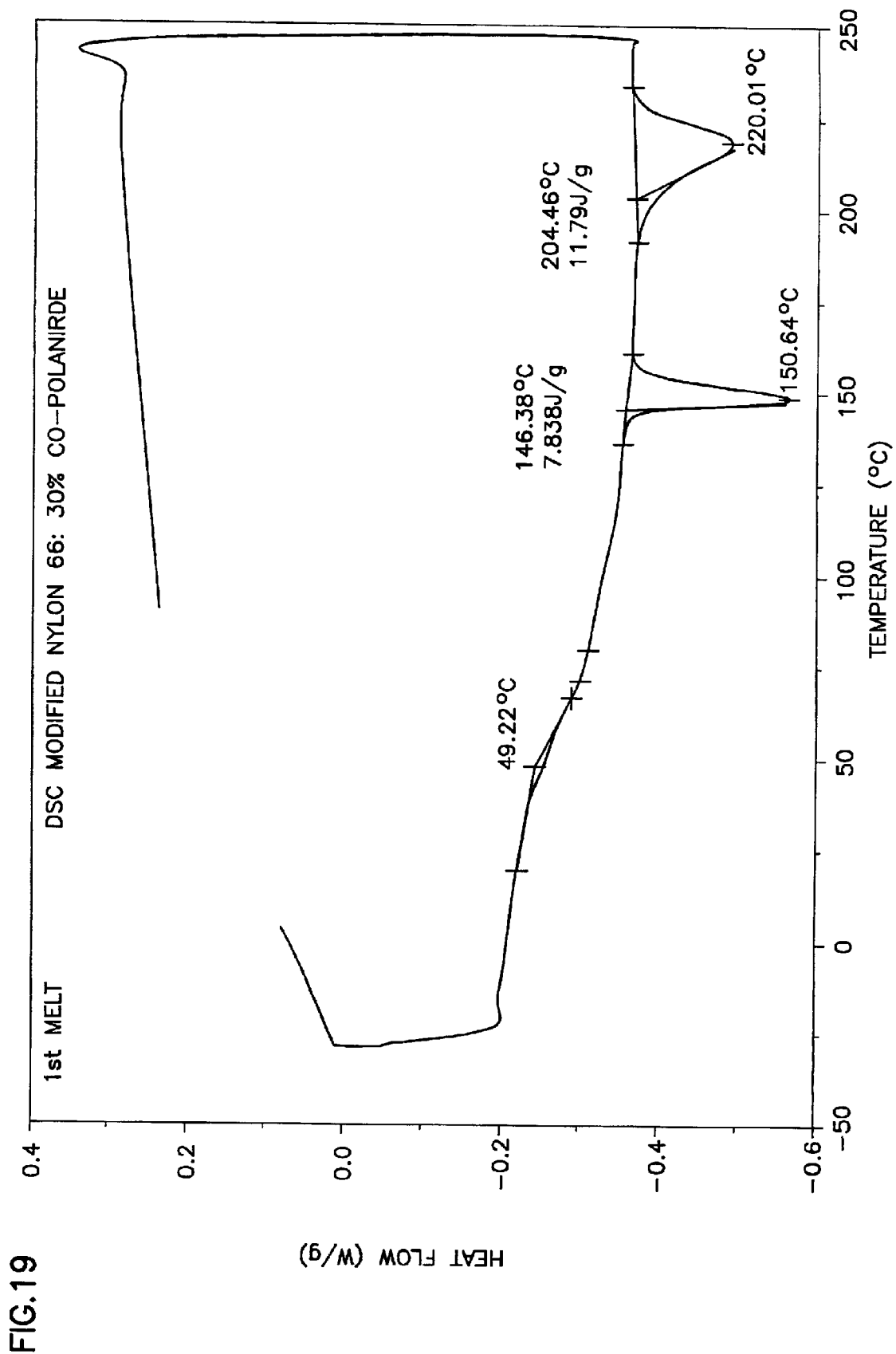
Figure 19A:
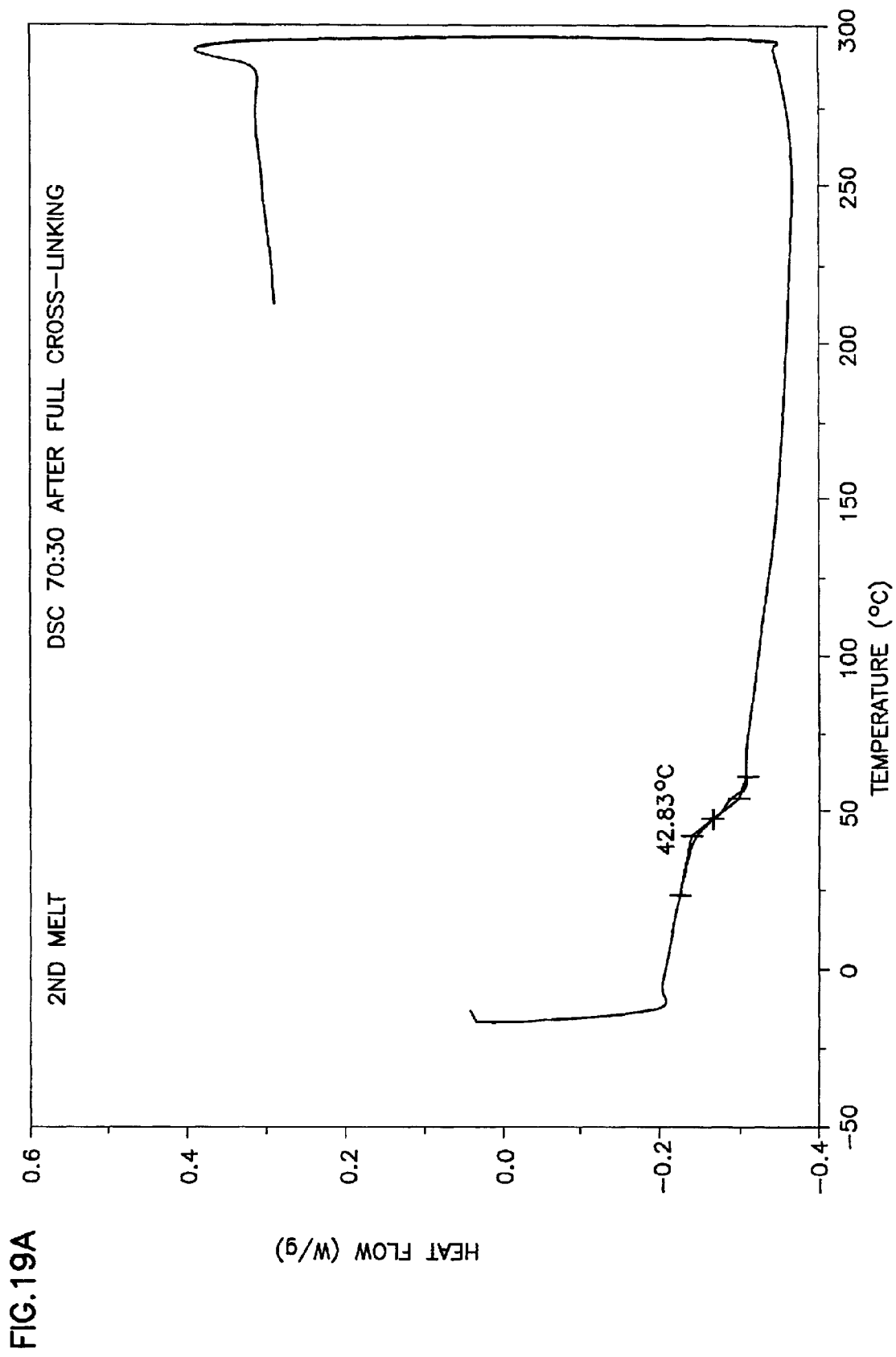

Thus formed alkoxy alkyl modified type 8 polyamide is dissolved in ethanol/water mixture. Polymer solution is electrospun in a manner described in Barris U.S. Pat. No. 4,650,516. Polymer solution viscosity tends to increase with time. It is generally known that polymer viscosity has a great influence in determining fiber sizes. Thus, it is difficult to control the process in commercial scale, continuous production. Furthermore, under same conditions, type 8 polyamides do not form microfibers as efficiently as copolyamides. However, when the solution is prepared with addition of acidic catalyst, such as toluene sulfonic acid, maleic anhydride, trifluoro methane sulfonic acid, citric acid, ascorbic acid and the like, and fiber mats are carefully heat-treated after fiber formation, the resultant fiber has a very good chemical resistance. (FIG. 13). Care must be taken during the crosslinking stage, so that one does not destroy fibrous structure.

We have found a surprising result when type 8 polyamide (polymer B) is blended with alcohol soluble copolyamides. By replacing 30% by weight of alkoxy alkyl modified polyamide 66 with alcohol soluble copolyamide like SVP 637 or 651 (polymer A), Elvamide 8061, synergistic effects were found. Fiber formation of the blend is more efficient than either of the components alone. Soaking in ethanol and measuring filtration efficiency shows better than 98% filtration efficiency retention, THC bench testing showing comparable results with Type 8 polyamide alone. This type blend shows that we can obtain advantage of efficient fiber formation and excellent filtration characteristic of copolyamide with advantage of excellent chemical resistance of crosslinked type 8 polyamide. Alcohol soak test strongly suggests that non-crosslinkable copolyamide has participated in crosslinking to maintain 98% of filtration efficiency.

DSC (see FIGS. 17–19a) of blends of polymer A and B become indistinguishable from that of polymer A alone after they are heated to 250° C. (fully crosslinked) with no distinct melt temperature. This strongly suggests that blends of polymer A and B are a fully integrated polymer by polymer B crosslinking with polymer A. This is a completely new class of polyamide.

Similarly, melt-blend poly (ethylene terephthalate) with poly(butylene terephthalate) can have similar properties. During the melt processing at temperatures higher than melt temperature of either component, ester group exchange occurs and inter polymer of PET and PBT formed. Furthermore, our crosslinking temperature is lower than either of single component. One would not have expected that such group exchange occur at this low temperature. Therefore, we believe that we found a new family of polyamide through solution blending of Type A and Type B polyamide and crosslinking at temperature lower than the melting point of either component.

When we added 10% by weight of t-butyl phenol oligomer (Additive 7) and heat treated at temperature necessary for crosslinking temperature, we have found even better results. We theorized that hydroxyl functional group of t-butyl phenol oligomers would participate in reaction with functional group of type 8 nylons. What we have found is this component system provides good fiber formation, improved resistance to high temperature and high humidity and hydrophobicity to the surface of fine fiber layers.

We have prepared samples of mixture of Polymer A and Polymer B (Sample 6A) and another sample of mixture of Polymer A, Polymer B and Additive & (Sample 6B). We then formed fiber by electrospinning process, exposed the fiber mat at 300° F. for 10 minutes and evaluated the surface composition by ESCA surface analysis.

Table shows ESCA analysis of Samples 6A and 6B.

| Composition (%) | Sample 6A | | Sample 6B | |
|---|---|---|---|---|
| Polymer A | 30 | | 30 | |
| Polymer B | 70 | | 70 | |
| Additive 7 | 0 | | 10 | |
| Surface Composition | W/O Heat | W/Heat | W/O Heat | W/Heat |
| Polymer A&B (%) | 100 | 100 | 68.9 | 43.0 |
| Additive 7 | 0 | 0 | 31.1 | 57.0 |

Figure 4:
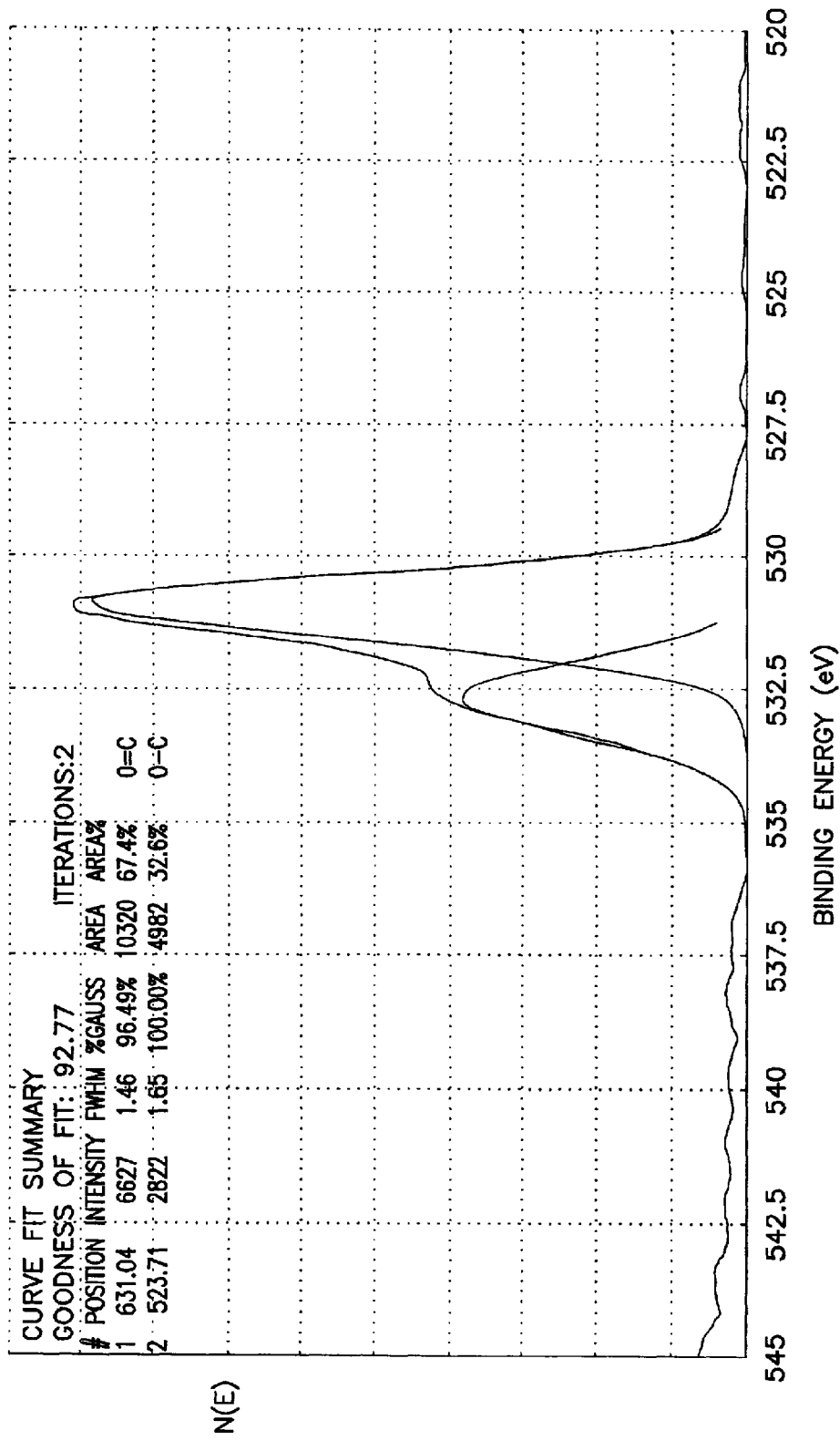
FIGS. 4 through 11 are analytical ESCA spectra relating to Example 13.
Figure 5:
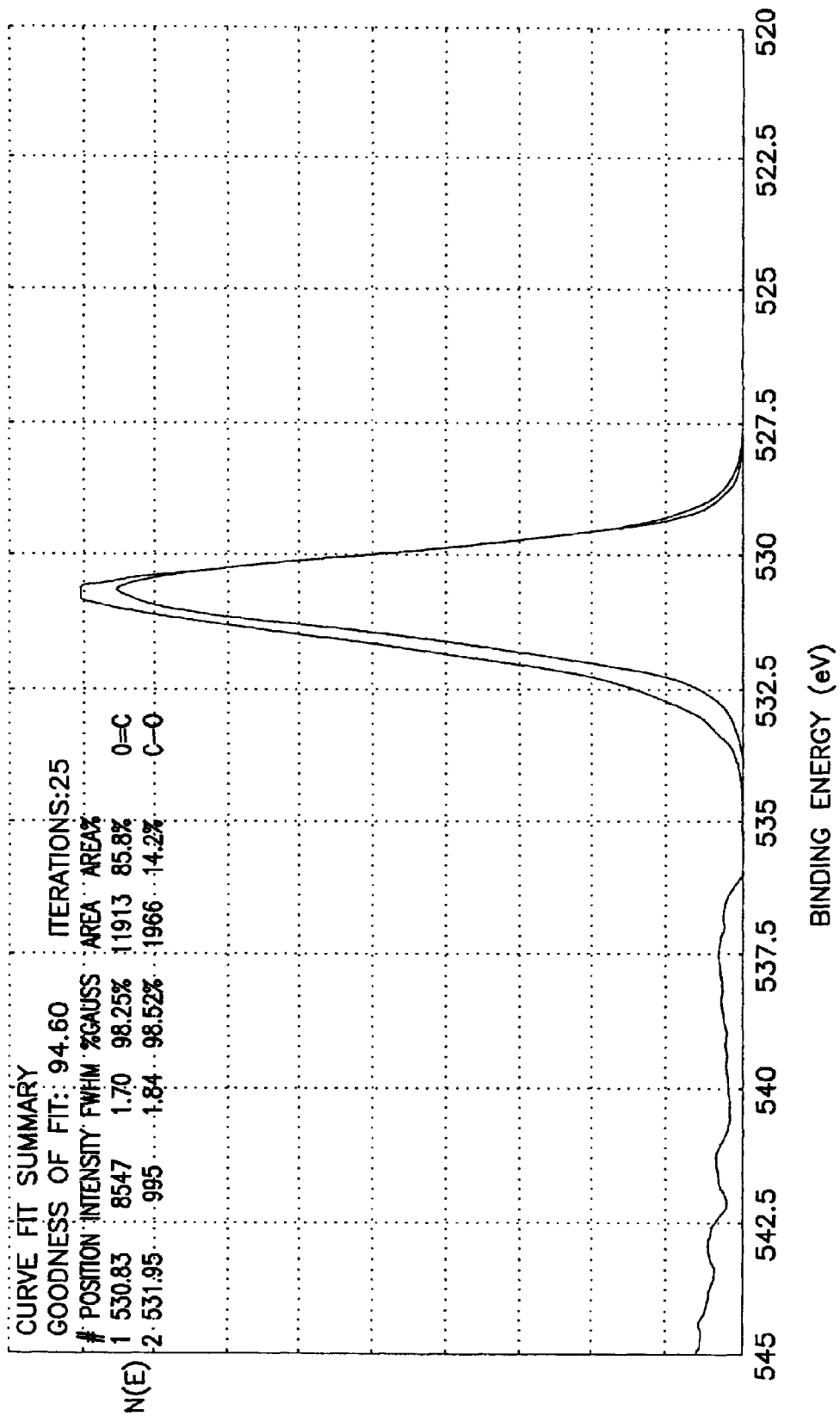
Figure 6:
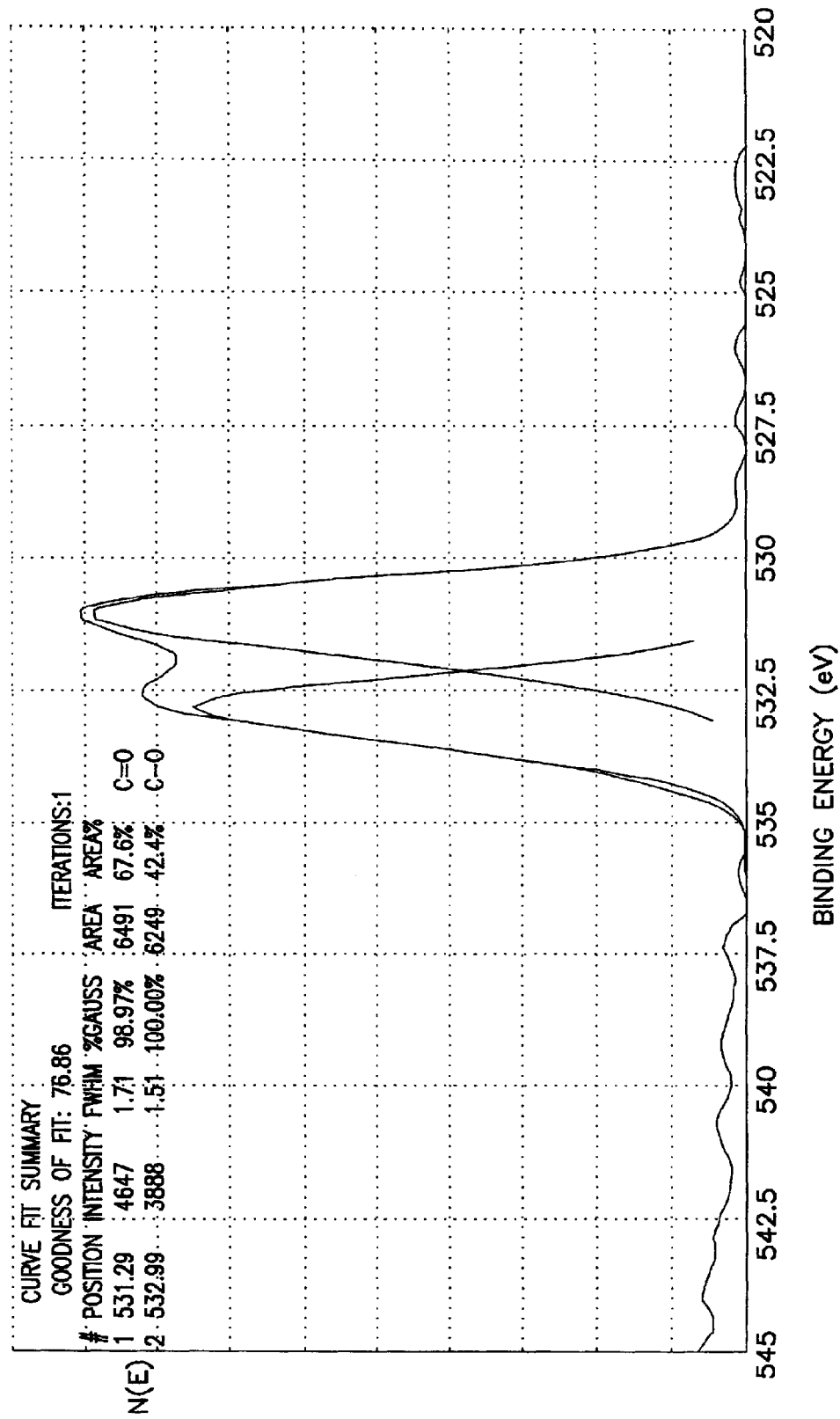
Figure 7:
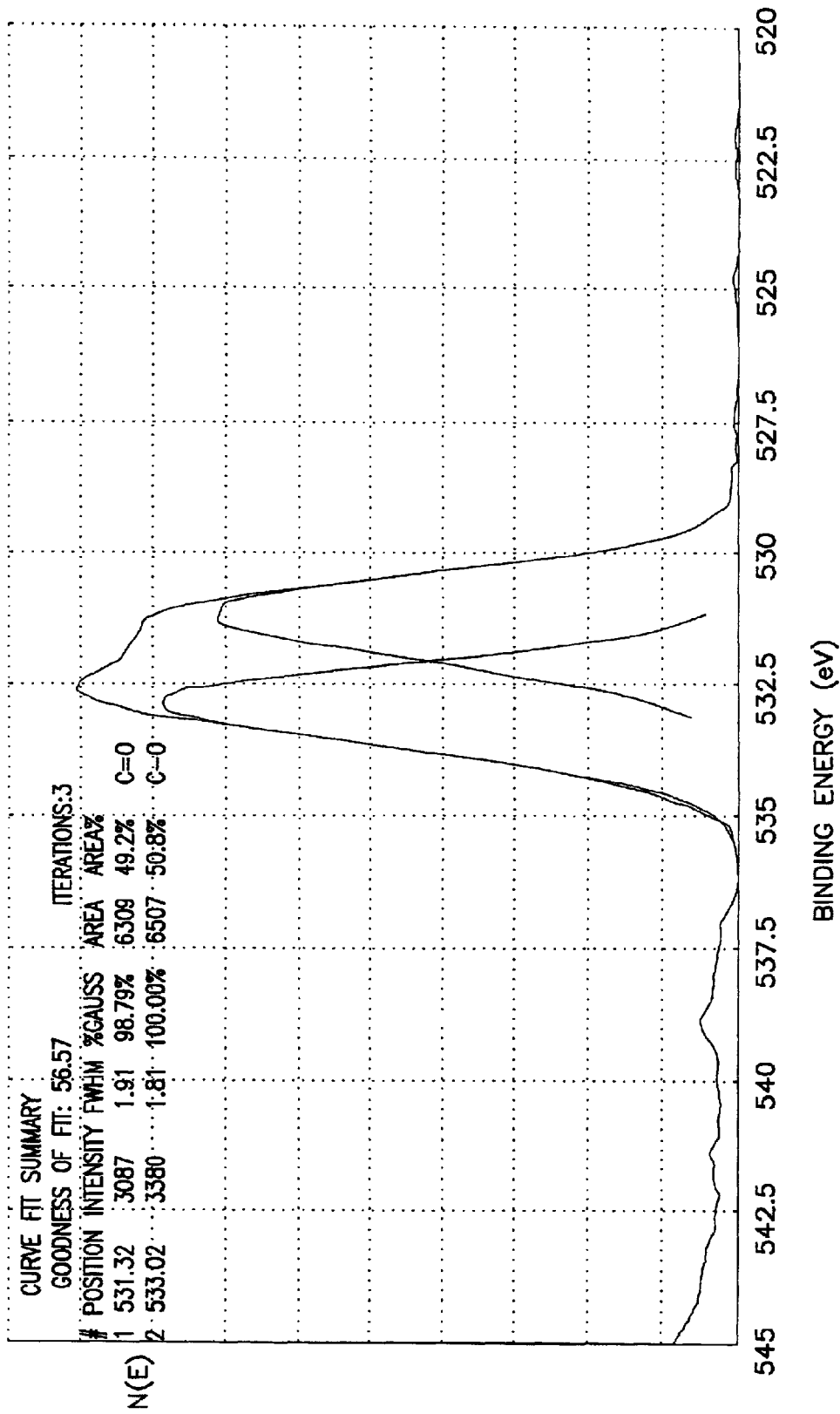
Figure 8:
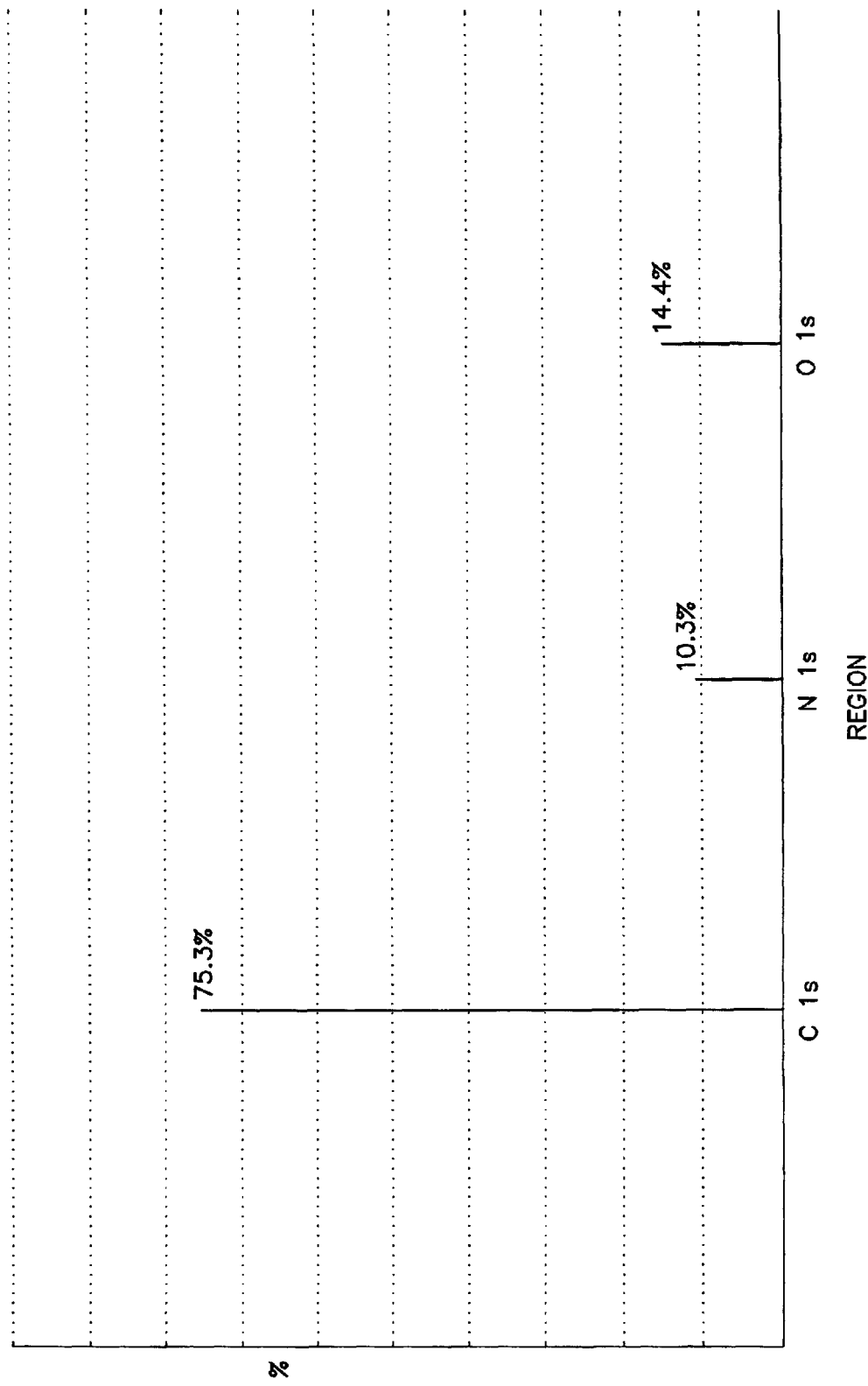
Figure 9:
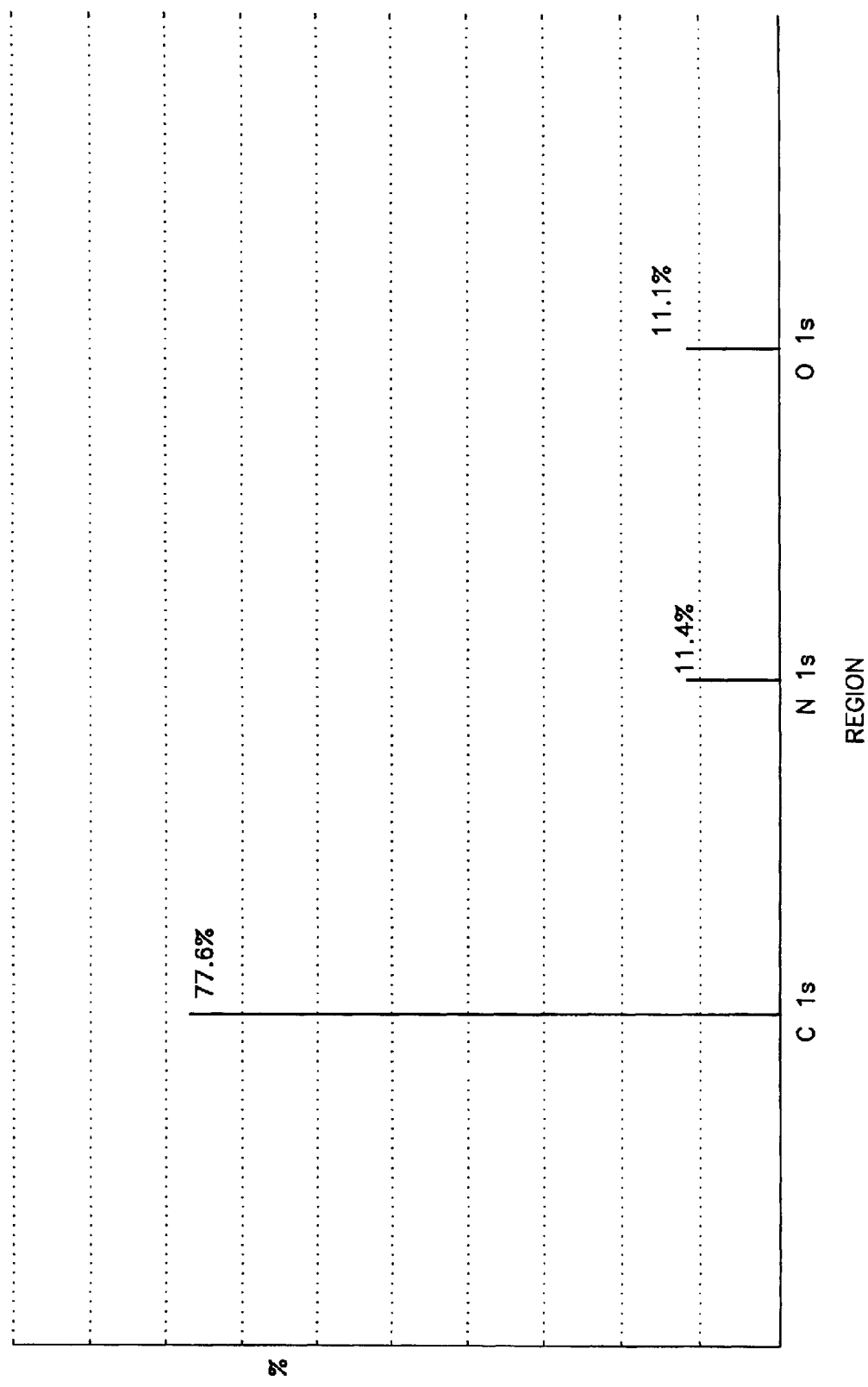
Figure 10:
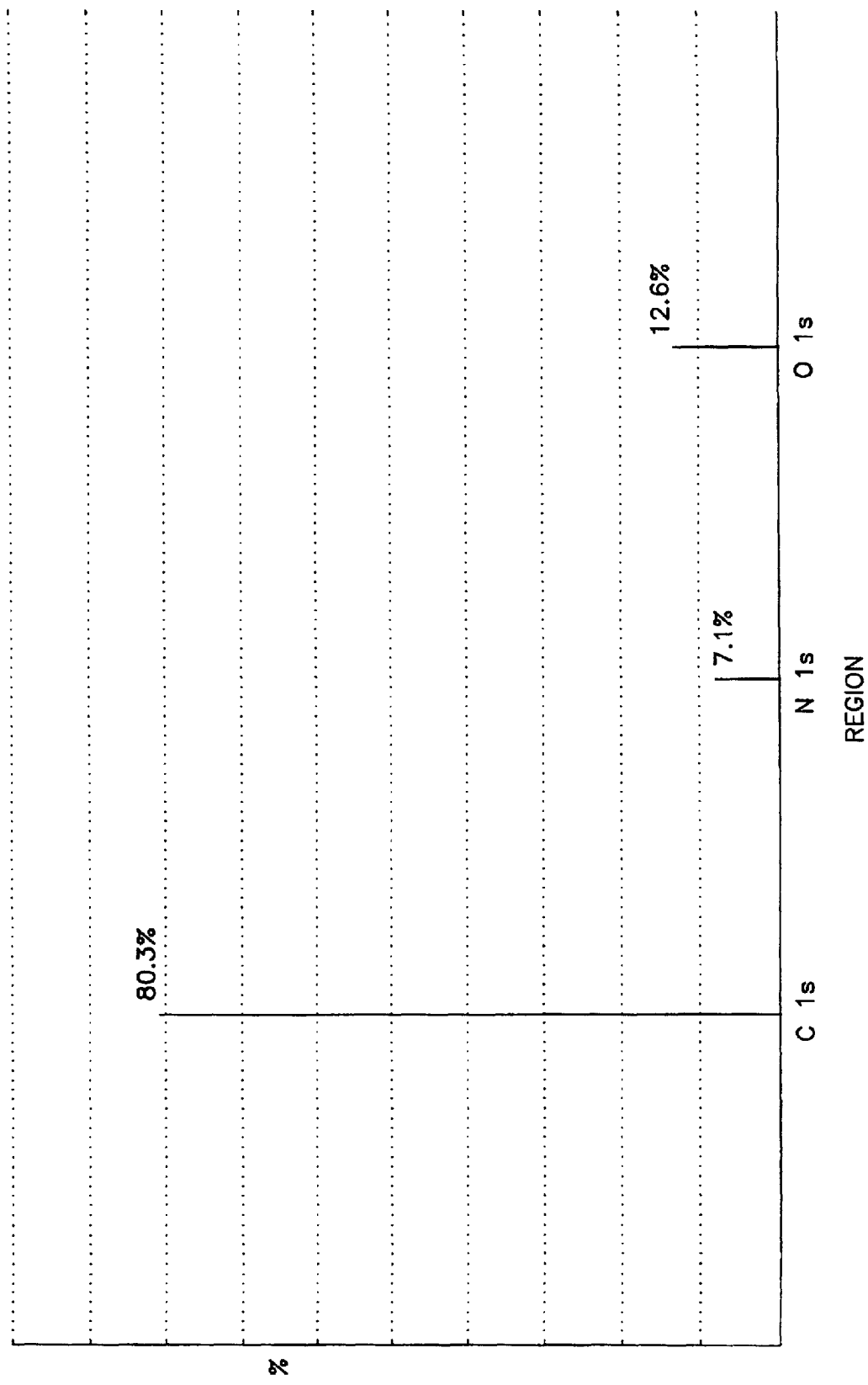
Figure 11:
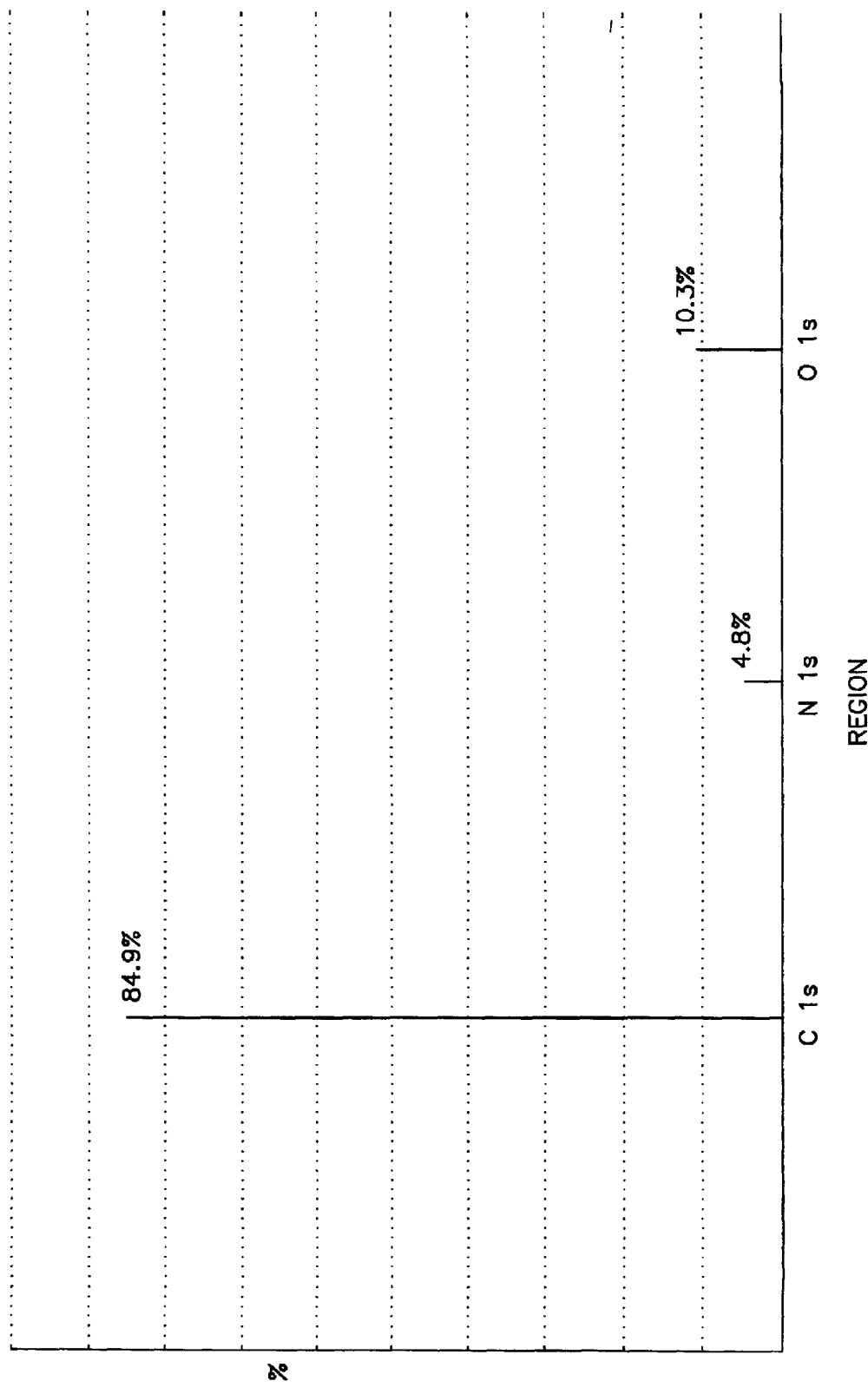

ESCA provides information regarding surface composition, except the concentration of hydrogen. It provides information on carbon, nitrogen and oxygen. Since the Additive 7 does not contain nitrogen, we can estimate the ratio of nitrogen containing polyamides and additive that does not contain nitrogen by comparing concentration of nitrogen. Additional qualitative information is available by examining O 1s spectrum of binding energy between 535 and 527 eV. C=O bond has a binding energy at around 531 eV and C—O bond has a binding energy at 533 eV. By comparing peak heights at these two peaks, one can estimate relative concentration of polyamide with predominant C=O and additive with solely C—O groups. Polymer B has C—O linkage due to modification and upon crosslinking the concentration of C—O will decrease. ESCA confirms such reaction had indeed occurred, showing relative decrease of C—O linkage. (FIG. 4 for non heat treated mixture fiber of Polymer A and Polymer B, FIG. 5 for heat treated mixture fiber of Polymer A and Polymer B). When Additive 7 molecules are present on the surface, one can expect more of C—O linkage. This is indeed the case as can be seen in FIGS. 6 and 7. (FIG. 6 for as-spun mixture fibers of Polymer A, Polymer B and Additive 7. FIG. 7 for heat treated mixture fibers of Polymer A, Polymer B and Additive 7). FIG. 6 shows that the concentration of C—O linkage increases for Example 7. The finding is consistent with the surface concentration based on XPS multiplex spectrum of FIGS. 8 through 11.

It is apparent that t-butyl oligomer molecules migrated toward the surface of the fine fibers and form hydrophobic coating of about 50 Å. Type 8 nylon has functional groups such as —$CH_2OH$ and —$CH_2OCH_3$, which we expected to react with —OH group of t-butyl phenol. Thus, we expected to see less oligomer molecules on the surface of the fibers. We have found that our hypothesis was not correct and we found the surface of the interpolymer has a thin coating.

Samples 6A, 6B and a repeat of sample described in Section 5 have been exposed THC bench at 160° F. at 100% RH. In previous section, the samples were exposed to 140° F. and 100% RH. Under these conditions, t-butyl phenol protected terpolymer copolyamide from degradation. However, if the temperature is raised to 160° F. and 100% RH, then the t-butyl phenol oligomer is not as good in protecting the underlying terpolymer copolyamide fibers. We have compared samples at 160° F. and 100% RH.

TABLE

| Retained Fine Fiber Efficiency after Exposure to 160° F. and 100% RH | | | |
|---|---|---|---|
| Sample | After 1 Hr. | After 2 Hrs. | After 3 Hrs. |
| Sample 6A | 82.6 | 82.6 | 85.9 |
| Sample 6B | 82.4 | 88.4 | 91.6 |
| Sample 5 | 10.1 | | |

The table shows that Sample 6B helps protect exposure to high temperature and high humidity.

More striking difference shows when we exposed to droplets of water on a fiber mat. When we place a drop of DI water in the surface of Sample 6A, the water drops immediately spread across the fiber mat and they wet the substrate paper as well. On the other hand, when we place a drop of water on the surface of Sample 6B, the water drop forms a bead and did not spread on the surface of the mat. We have modified the surface of Sample 16 to be hydrophobic by addition of oligomers of p-t-butyl phenol. This type of product can be used as a water mist eliminator, as water drops will not go through the fine fiber surface layer of Sample 6B.

Samples 6A, 6B and a repeat sample of Section 5 were placed in an oven where the temperature was set at 310° F. Table shows that both Samples 6A and 6B remain intact while Sample of Section 5 was severely damaged.

TABLE

| Retained Fine Fiber Efficiency after Exposure to 310° F. | | |
|---|---|---|
| Sample | After 6 Hrs. | After 77 Hrs. |
| Sample 6A | 100% | 100% |
| Sample 6B | 100% | 100% |
| Sample 5 | 34% | 33% |

While addition of oligomer to Polymer A alone improved the high temperature resistance of fine fiber layer, the addition of Additive 7 has a neutral effect on the high temperature exposure.

We have clearly shown that the mixture of terpolymer copolyamide, alkoxy alkyl modified nylon 66 and oligomers of t-butyl phenol provides a superior products in helping fine fibers under severe environment with improved productivity in manufacturing over either mixture of terpolymer copolyamide and t-butyl phenol oligomer or the mixture of terpolymer copolyamide and alkoxy alkyl modified nylon 66. These two components mixture are also improvement over single component system.

Example 7

Compatible Blend of Polyamides and Bisphenol A Polymers

A new family of polymers can be prepared by oxidative coupling of phenolic ring (Pecora, A; Cyrus, W. U.S. Pat. No. 4,900,671(1990) and Pecora, A; Cyrus, W.; Johnson, M. U.S. Pat. No. 5,153,298(1992)). Of particular interest is polymer made of Bisphenol A sold by Enzymol Corp. Soybean Peroxidase catalyzed oxidation of Bisphenol A can start from either side of two —OH groups in Bisphenol A. Unlike Bisphenol A based polycarbonate, which is linear, this type of Bisphenol A polymer forms hyperbranched polymers. Because of hyperbranched nature of this polymer, they can lower viscosity of polymer blend.

We have found that this type of Bisphenol A polymer can be solution blended with polyamides. Reported Hansen's solubility parameter for nylon is 18.6. (Page 317, Handbook of Solubility Parameters and other cohesion parameters, A. Barton ed., CRC Press, Boca Raton Fla., 1985) If one calculates solubility parameter (page 61, Handbook of Solubility Parameters), then the calculated solubility parameter is 28.0. Due to the differences in solubility parameter, one would not expect that they would be miscible with each other. However, we found that they are quite miscible and provide unexpected properties.

50:50 blend of Bisphenol A resin of M.W. 3,000 and copolyamide was made in ethanol solution. Total concentration in solution was 10%. Copolyamide alone would have resulted in 0.2 micron fiber diameter. Blend resulted in lofty layer of fibers around 1 micron. Bisphenol A of 7,000 M.W. is not stable with copolyamide and tends to precipitate.

DSC of 50:50 blend shows lack of melting temperature. Copolyamide has melting temperature around 150 degree C. and Bisphenol A resin is a glassy polymer with Tg of about 100. The blend shows lack of distinct melting. When the fiber mat is exposed to 100 degree C., the fiber mat disappears. This blend would make an excellent filter media where upper use temperature is not very high, but low-pressure drop is required. This polymer system could not be crosslinked with a reasonable manner.

Example 8

Dual Roles of Bisphenol A Polymer As Solvent and Solid in Blend

A surprising feature of Bisphenol A polymer blend is that in solution form Bisphenol A polymer acts like a solvent and in solid form the polymer acts as a solid. We find dual role of Bisphenol A polymer truly unique.

The following formulation is made:

| | |
|---|---|
| Alkoxy alkyl modified PA 66: Polymer B | 180 g |
| Bisphenol A Resin (3,000 MW): Polymer C | 108 g |
| Ethanol 190 Grade | 827 g |
| Acetone | 218 g |
| DI water | 167 g |
| Catalyst | 9.3 g |

The viscosity of this blend was 32.6 centipoise by Brookfield viscometer. Total polymer concentration was be 19.2%. Viscosity of Polymer B at 19.2% is over 200 centipoise. Viscosity of 12% polymer B alone in similar solvent is around 60 centipoise. This is a clear example that Bisphenol A resin acts like a solvent because the viscosity of the total solution was lower than expected. Resultant fiber diameter was 0.157 micron. If polymer B alone participated in fiber formation, the expected fiber size would be less than 0.1 micron. In other words, Polymer C participated in fiber formation. We do not know of any other case of such dramatic dual role of a component. After soaking the sample in ethanol, the filtration efficiency and fiber size was measured. After alcohol soak, 85.6% of filtration efficiency was retained and the fiber size was unchanged. This indicates that Polymer C has participated in crosslinking acting like a polymer solid.

Another polymer solution was prepared in the following manner:

| | |
|---|---|
| Alkoxy alkyl modified PA 66: Polymer B | 225 g |
| Bisphenol A Resin (3,000 MW): Polymer C | 135 g |

-continued

| | |
|---|---|
| Ethanol 190 Grade | 778 g |
| Acetone | 205 g |
| DI water | 157 g |
| Catalyst | 11.6 g |

Viscosity of this blend was 90.2 centipoise. This is a very low viscosity value for 24% solid. Again, this is an indication Polymer C acts like a solvent in the solution. However, when they are electrospun into fiber, the fiber diameter is 0.438 micron. 15% solution of Polymer B alone would have produced around 0.2-micron fibers. In final state, Polymer C contributes to enlarging fiber sizes. Again, this example illustrates that this type of branched polymer acts as a solvent in solution and acts as a solid in final state. After soaking in ethanol solution, 77.9% of filtration efficiency was retained and fiber size was unchanged.

Example 9

Development of Crosslinked Polyamides/Bisphenol A Polymer Blends

Three different samples were prepared by combining resins, alcohols and water, stirring 2 hours at 60 degree C. The solution is cooled to room temperature and catalyst was added to solution and the mixture was stirred another 15 minutes. Afterward, viscosity of solution was measured and spun into fibers.

The Following Table Shows These Examples

| Recipe (g) | Sample 9A | Sample 9B | Sample 9C |
|---|---|---|---|
| Polymer B | 8.4 | 12.6 | 14.7 |
| Polymer A | 3.6 | 5.4 | 6.3 |
| Polymer C | 7.2 | 10.8 | 12.6 |
| Ethanol 190 Grade | 89.3 | 82.7 | 79.5 |
| Isopropanol | 23.5 | 21.8 | 21.0 |
| DI Water | 18.0 | 16.7 | 15.9 |
| Catalyst | .45 | 0.58 | 0.79 |
| Viscosity (cP) | 22.5 | 73.5 | 134.2 |
| Fiber Size (micron) | 0.14 | 0.258 | 0.496 |

We have found out that this blend generates fibers efficiently, producing about 50% more mass of fiber compared to Polymer A recipe. In addition, resultant polymeric microfibers produce a more chemically resistant fiber. After alcohol soak, a filter made from these fibers maintained more than 90% filtration efficiency and unchanged fiber diameter even though inherently crosslinkable polymer is only 44% of the solid composition. This three-polymer composition of co-polyamide, alkoxy alkyl modified Nylon 66 and Bisphenol A creates excellent fiber forming, chemically resistant material.

Example 10

Alkoxy alkyl Modified Co-polymer of Nylon 66 and Nylon 46

In a 10-gallon high-pressure reactor, the following reactions were made, and resultant polymers were analyzed. After reaction temperature was reached, catalyst were added and reacted for 15 minutes. Afterward, the polymer solution was quenched, precipitated, washed and dried.

| Reactor Charge (LB) | Run 10A | Run 10B | Run 10C | Run 10D | Run 10E |
|---|---|---|---|---|---|
| Nylon 4,6 (duPont Zytel 101) | 10 | 5 | 5 | 5 | 5 |
| Nylon 6,6 (DSM Stanyl 300) | 0 | 5 | 5 | 5 | 5 |
| Formaldehyde | 8 | 10 | 8 | 10 | 8 |
| DI Water | 0.2 | 0.2 | 2 | 0.2 | 2 |
| Methanol | 22 | 20 | 20 | 20 | 20 |
| Reaction Temp (C. °) | 140 | 140 | 140 | 150 | 150 |
| Tg (C. °) | 56.7 | 38.8 | 37.7 | 38.5 | 31.8 |
| Tm (C. °) | 241.1 | 162.3 | 184.9 | 175.4 | 189.5 |
| Level of Substitution | | | | | |
| Alkoxy (wt. %) | 11.9 | 11.7 | 7.1 | 11.1 | 8.4 |
| Methylol (wt %) | 0.14 | 0.13 | 0.14 | 0.26 | 0.24 |

DSC of the polymer made with Nylon 46 and Nylon 66 shows broad single melt temperature, which are lower than the melting temperature of modified Nylon 46 (241° C.) or modified Nylon 66 (210° C.). This is an indication that during the reaction, both components are randomly distributed along the polymer chain. Thus, we believe that we have achieved random copolymer of Nylon 46 and Nylon 66 with alkoxy alkyl modification. These polymers are soluble in alcohols and mixtures of alcohol and water.

| Property | ASTM | Nylon 6.6 | Nylon 4.6 |
|---|---|---|---|
| $T_m$ | | 265° C. | 295° C. |
| Tensile Strength | D638 | 13.700 | 8.500 |
| Elongation at Break | D638 | 15–80 | 60 |
| Tensile Yield Strength | D638 | 8000–12,000 | |
| Flexural Strength | D790 | 17,8000 | 11,500 |
| Tensile Modulus x $10^3$ psi | D638 | 230–510 | 250 |
| Izod Impact ft-lb/in of notch | D256A | 0.55–1.0 | 17 |
| Deflection Temp Under Flexural Load 264 psi | D648 | 158 | 194 |

Both are highly crystalline and are not soluble in common alcohols.
Source: Modern Plastics Encyclopedia 1998

Example 11

Development of Interpolymer of Copolyamides and Alkoxyalkyl Modified Nylon 46/66 Copolymer and Formation of Electrospun Fibers Runs 10B and 10D samples were made into fibers by methods described in above. Alkoxy alkyl modified Nylon 46/66 (Polymer D) alone were successfully electrospun. Blending Polymer D with Polymer A brings additional benefits of more efficient fiber formation and ability to make bigger fibers without sacrificing the crosslinkability of Polymer D as can be seen in the following table:

| | Polymer 10B | | Polymer 10D | |
|---|---|---|---|---|
| | Alone | w/30% Polymer A | Alone | w/30% Polymer A |
| Fiber Size(micron) | 0.183 | 0.464 | 0.19 | 0.3 |
| Fiber Mass Ratio | 1 | 3 | 1 | 2 |
| Filtration Effi. Retention(%) | 87 | 90 | 92 | 90 |

Fiber Mass Ratio is calculated by (total length of fiber times cross sectional area). Filtration Efficiency Retention is measured soaking filter sample in ethanol. Fiber size was unchanged by alcohol soak.

Example 12

Crosslinked, Electrospun PVA

PVA powders were purchased from Aldrich Chemicals. They were dissolved either in water or 50/50 mixture of methanol and water. They were mixed with crosslinking agent and toluene sulfonic acid catalyst before electrospinning. The resulting fiber mat was crosslinked in an oven at 150° C. for 10 minutes before exposing to THC bench.

| | Sample 12A | Sample 12B | Sample 12C | Sample 12D |
|---|---|---|---|---|
| PVA | | | | |
| Hydrolysis | 98–99 | 87–89 | 87–89 | 87–89 |
| M.W. | 31,500–50,000 | 31,500–50,000 | 31,500–50,000 | 31,500–50,000 |
| PVA.(wt.-%) | 10 | 10 | 10 | 10 |
| Solvent | Water | Mixture | Mixture (c) | Mixture (d) |
| Other Polymer | None | None | Acrylic Acid | Cymel 385 |
| Other Polymer/PVA (%) | 0 | 0 | 30 | 30 |
| Fiber Retained THC, 1 hr. (%) | 0 (a) | 0 (a,b) | 95 (b) | 20 (b) |
| Fiber Retained THC, 3 hr. (%) | | | 90 (a) | |

(a): Temperature 160° F., 100% humidity
(b): Temperature 140° F., 100% humidity
(c): Molecular Weight 2000
(d): Melamine formaldehyde resin from Cytec

Example 13

A conventional cellulose air filter media was used as the substrate. This substrate had a basis weight of 67 pounds per 3000 square feet, a Frazier permeability of 16 feet per minute at 0.5 inches of water pressure drop, a thickness of 0.012 inches, and a LEFS efficiency of 41.6%. A fine fiber layer of Example 1 was added to the surface using the process described with a nominal fiber diameter of 0.2 microns. The resulting composite had a LEFS efficiency of 63.7%. After exposure to 140 F air at 100% relative humidity for 1 hour the substrate only sample was allowed to cool and dry, it then had a LEFS efficiency of 36.5%. After exposure to 140 F air at 100% relative humidity for 1 hour the composite sample was allowed to cool and dry, it then had a LEFS efficiency of 39.7%. Using the mathematical formulas described, the fine fiber layer efficiency retained after 1 hour of exposure was 13%, the number of effective fine fibers retained was 11%.

Example 14

A conventional cellulose air filter media was used as the substrate. This substrate had a basis weight of 67 pounds per 3000 square feet, a Frazier permeability of 16 feet per minute at 0.5 inches of water pressure drop, a thickness of 0.012 inches, and a LEFS efficiency of 41.6%. A fine fiber layer of Example 5 was added to the surface using the process described with a nominal fiber diameter of 0.2 microns. The resulting composite had a LEFS efficiency of 96.0%. After exposure to 160 F air at 100% relative humidity for 3 hours the substrate only sample was allowed to cool and dry, it then had a LEFS efficiency of 35.3%. After exposure to 160 F air at 100% relative humidity for 3 hours the composite sample was allowed to cool and dry, it then had a LEFS efficiency of 68.0%. Using the mathematical formulas described, the fine fiber layer efficiency retained after 3 hours of exposure was 58%, the number of effective fine fibers retained was 29%.

Example 15

A conventional cellulose air filter media was used as the substrate. This substrate had a basis weight of 67 pounds per 3000 square feet, a Frazier permeability of 16 feet per minute at 0.5 inches of water pressure drop, a thickness of 0.012 inches, and a LEFS efficiency of 41.6%. A fine fiber layer of a blend of Polymer A and Polymer B as described in Example 6 was added to the surface using the process described with a nominal fiber diameter of 0.2 microns. The resulting composite had a LEFS efficiency of 92.9%. After exposure to 160 F air at 100% relative humidity for 3 hours the substrate only sample was allowed to cool and dry, it then had a LEFS efficiency of 35.3%. After exposure to 160 F air at 100% relative humidity for 3 hours the composite sample was allowed to cool and dry, it then had a LEFS efficiency of 86.0%. Using the mathematical formulas described, the fine fiber layer efficiency retained after 3 hours of exposure was 96%, the number of effective fine fibers retained was 89%.

Example 16

A conventional cellulose air filter media was used as the substrate. This substrate had a basis weight of 67 pounds per 3000 square feet, a Frazier permeability of 16 feet per minute at 0.5 inches of water pressure drop, a thickness of 0.012 inches, and a LEFS efficiency of 41.6%. A fine fiber layer of Polymer A, Polymer B, t-butyl phenol oligomer as described in Example 6 was added to the surface using the process described with a nominal fiber diameter of 0.2 microns. The resulting composite had a LEFS efficiency of 90.4%. After exposure to 160 F air at 100% relative humidity for 3 hours the substrate only sample was allowed to cool and dry, it then had a LEFS efficiency of 35.3%. After exposure to 160 F air at 100% relative humidity for 3 hours the composite sample was allowed to cool and dry, it then had a LEFS efficiency of 87.3%. Using the mathematical formulas described, the fine fiber layer efficiency retained after 3 hours of exposure was 97%, the number of effective fine fibers retained was 92%.

Example 17

A conventional cellulose air filter media was used as the substrate. This substrate had a basis weight of 67 pounds per 3000 square feet, a Frazier permeability of 16 feet per minute at 0.5 inches of water pressure drop, a thickness of 0.012 inches, and a LEFS efficiency of 41.6%. A fine fiber layer of crosslinked PVA with polyacrylic acid of Example 12 was added to the surface using the process described with a nominal fiber diameter of 0.2 microns. The resulting composite had a LEFS efficiency of 92.9%. After exposure to 160 F air at 100% relative humidity for 2 hours the substrate only sample was allowed to cool and dry, it then had a LEFS efficiency of 35.3%. After exposure to 160 F air at 100% relative humidity for 2 hours the composite sample was allowed to cool and dry, it then had a LEFS efficiency of 83.1%. Using the mathematical formulas described, the fine fiber layer efficiency retained after 2 hours of exposure was 89%, the number of effective fine fibers retained was 76%.

Example 18

The following filter medias have been made with the methods described in Example 1–17.

Filter Media Examples

| Substrate | Substrate perm (Frazier) | Substrate Basis wt (lbs/3000 sq ft) | Substrate Thickness (in) | Substrate Eff (LEFS) | Composite Eff (LEFS) |
|---|---|---|---|---|---|
| Single fine fiber layer on single substrate (flow either direction through media | (+/−10%) | (+/−10%) | (+/−25%) | (+/−5%) | (+/−5%) |
| Cellulose air filter media | 58 | 67 | 0.012 | 11% | 50% |
| Cellulose air filter media | 16 | 67 | 0.012 | 43% | 58% |
| Cellulose air filter media | 58 | 67 | 0.012 | 11% | 65% |
| Cellulose air filter media | 16 | 67 | 0.012 | 43% | 70% |
| Cellulose air filter media | 22 | 52 | 0.010 | 17% | 70% |
| Cellulose air filter media | 16 | 67 | 0.012 | 43% | 72% |
| Cellulose/synthetic blend with moisture resistant resin | 14 | 70 | 0.012 | 30% | 70% |
| Flame retardant cellulose air filter media | 17 | 77 | 0.012 | 31% | 58% |
| Flame retardant cellulose air filter media | 17 | 77 | 0.012 | 31% | 72% |
| Flame retardant synthetic air filter media | 27 | 83 | 0.012 | | 77% |

-continued

| Substrate | Substrate perm (Frazier) | Substrate Basis wt (lbs/3000 sq ft) | Substrate Thickness (in) | Substrate Eff (LEFS) | Composite Eff (LEFS) |
|---|---|---|---|---|---|
| Spunbond Remay (polyester) | 1200 | 15 | 0.007 | 5% | 55% |
| Synthetic/cellulose air filter media | 260 | 76 | 0.015 | 6% | 17% |
| Synthetic/glass air filter media | 31 | 70 | 0.012 | 55% | 77% |
| Synthetic/glass air filter media | 31 | 70 | 0.012 | 50% | 90% |
| Synthetic (Lutrador-polyester) | 300 | 25 | 0.008 | 3% | 65% |
| Synthetic (Lutrador-polyester) | | | 0.016 | | 90% |

Media has been used flat, corrugated, pleated, corrugated and pleated, in flatsheets, pleated flat panels, pleated round filters, and other filter structures and configurations.

Test Methods

Hot Water Soak Test

Using filtration efficiency as the measure of the number of fine fibers effectively and functionally retained in structure has a number of advantages over other possible methods such as SEM evaluation.

- the filtration measure evaluates several square inches of media yielding a better average than the tiny area seen in SEM photomicrographs (usually less than 0.0001 square inch
- the filtration measurement quantifies the number of fibers remaining functional in the structure. Those fibers that remain, but are clumped together or otherwise existing in an altered structure are only included by their measured effectiveness and functionality.

Nevertheless, in fibrous structures where the filtration efficiency is not easily measured, other methods can be used to measure the percent of fiber remaining and evaluated against the 50% retention criteria.

Description: This test is an accelerated indicator of filter media moisture resistance. The test uses the LEFS test bench to measure filter media performance changes upon immersion in water. Water temperature is a critical parameter and is chosen based on the survivability history of the media under investigation, the desire to minimize the test time and the ability of the test to discriminate between media types. Typical water temperatures re 70° F., 140° F. or 160° F.

Procedure

A 4" diameter sample is cut from the media. Particle capture efficiency of the test specimen is calculated using 0.8 $\mu$m latex spheres as a test challenge contaminant in the LEFS (for a description of the LEFS test, see ASTM Standard F1215-89) bench operating at 20 FPM. The sample is then submerged in (typically 140° F.) distilled water for 5 minutes. The sample is then placed on a drying rack and dried at room temperature (typically overnight). Once it is dry the sample is then retested for efficiency on the LEFS bench using the same conditions for the initial calculation.

The previous steps are repeated for the fine fiber supporting substrate without fine fiber.

From the above information one can calculate the efficiency component due only to the fine fiber and the resulting loss in efficiency due to water damage. Once the loss in efficiency due to the fine fiber is determined one can calculate the amount of efficiency retained.

Calculations

Fine fiber layer efficiency:

$E_i$=Initial Composite Efficiency;

$E_s$=Initial Substrate Efficiency;

$F_e$=Fine Fiber Layer $F_e=1-EXP(Ln(1-E_i)-Ln(1-E_s))$

Fine fiber layer efficiency retained:

$F_i$=Initial fine fiber layer efficiency;

$F_x$=Post soak fine fiber layer efficiency;

$F_r$=Fine fiber retained $$F_r=F_x/F_i$$

The percentage of the fine fibers retained with effective functionality can also be calculated by:

$$\%=\log(1-F_x)/\log(1-F_i)$$

Pass/Fail Criteria: >50% efficiency retention

In most industrial pulse cleaning filter applications the filter would perform adequately if at least 50% of the fine fiber efficiency is retained.

THC Bench (Temperature, Humidity

Description: The purpose of this bench is to evaluate fine fiber media resistance to the affects of elevated temperature and high humidity under dynamic flow conditions. The test is intended to simulate extreme operating conditions of either an industrial filtration application, gas turbine inlet application, or heavy duty engine air intake environments. Samples are taken out, dried and LEFS tested at intervals. This system is mostly used to simulate hot humid conditions but can also be used to simulate hot/cold dry situations.

Temperature −31 to 390° F.

Humidity 0 to 100% RH (Max temp for 100% RH is 160° F. and max continuous duration at this condition is 16 hours)

Flow Rate 1 to 35 FPM

Procedure

A 4" diameter sample is cut from the media.

Particle capture efficiency of the test specimen is calculated using 0.8 $\mu$m latex spheres as a test challenge contaminant in the LEFS bench operating at 20 FPM.

The sample is then inserted into the THC media chuck. Test times can be from minutes to days depending on testing conditions.

The sample is then placed on a drying rack and dried at room temperature (typically overnight). Once it is dry the sample is then retested for efficiency on the LEFS bench using the same conditions for the initial calculation.

The previous steps are repeated for the fine fiber supporting substrate without fine fiber.

From the above information one can calculate the efficiency component due only to the fine fiber and the resulting loss in efficiency due to alcohol damage.

Once the loss in efficiency due to the fine fiber is determined one can calculate the amount of efficiency retained.

Pass/Fail Criteria: >50% efficiency retention

In most industrial pulse cleaning filter applications the filter would perform adequately if at least 50% of the fine fiber efficiency is retained.

Alcohol (Ethanol) Soak Test

Description: The test uses the LEFS test bench to measure filter media performance changes upon immersion in room temperature ethanol.

Procedure

A 4" diameter sample is cut from the media. Particle capture efficiency of the test specimen is calculated using 0.8 µm latex spheres as a test challenge contaminant in the LEFS bench operating at 20 FPM. The sample is then submerged in alcohol for 1 minute. The sample is then placed on a drying rack and dried at room temperature (typically overnight). Once it is dry the sample is then retested for efficiency on the LEFS bench using the same conditions for the initial calculation. The previous steps are repeated for the fine fiber supporting substrate without fine fiber. From the above information one can calculate the efficiency component due only to the fine fiber and the resulting loss in efficiency due to alcohol damage. Once the loss in efficiency due to the fine fiber is determined one can calculate the amount of efficiency retained.

Pass/Fail Criteria: >50% efficiency retention.

The above specification, examples and data provide an explanation of the invention. However, many variations and embodiments can be made to the disclosed invention. The invention is embodied in the claims herein after appended.

What is claimed is:

1. A system including an engine rated at an engine intake air flow of at least 3 cfm and having an air cleaner constructed and arranged to filter the engine intake air; the air cleaner including a housing and a primary filter element operably positioned therein, the primary filter element comprising:
   (a) a media pack comprising a sheet-like substrate, said pack having a first end and an opposite second end;
      (i) said substrate having a plurality of pleats having a length extending from said first end to said second end, the substrate comprising a filter medium having an efficiency whom tested with particles having a diameter of 0.01 to 1 µm; and
      (ii) said substrate at least partially covered by a single layer;
         (A) said layer comprising a fine fiber having a diameter of about 0.01 to 0.5 microns such that after test exposure for a test period of 16 hours to test conditions of 140° F. air and a relative humidity of 100% retains greater than 30% of the fiber unchanged for filtration purposes, said fiber comprising a polymer composition selected from the group consisting of:
            (1) an addition polymer and about 2 to 25 wt % of an additive, the additive comprising a resinous material having a molecular weight of about 500 to 3000 and an aromatic character, the additive being miscible in the polymer but forms a hydrophobic coating on the fiber,
            (2) a condensation polymer and about 2 to 25 wt % of an additive, the additive comprising a resinous material having a molecular weight of about 500 to 3000, and an aromatic character wherein the additive is miscible in the condensation polymer but forms a hydrophobic coating on the fiber, and
            (3) mixtures thereof.

2. A filter element according to claim 1 wherein said seal is a radially directed seal.

3. A filter element according to claim 1 further including:
   (a) an inner support liner extending between said first and second end caps;
      (i) said inner support liner being between said sealing portion and said media pack.

4. A filter element according to claim 3 wherein:
   (a) at least one of said first and second end caps includes an outer radial surface;
      (i) said sealing portion comprising said outer radial surface.

5. A filter element according to claim 4 further including:
   (a) an inner support liner extending between said first and second end caps;
   (b) an outer support liner extending between said first and second and caps; and wherein
      (i) each of said plurality of pleats has a pleat length of at least 6 inches and a pleat depth of at least 1 inch.

6. The system of claim 1 wherein the polymer is a component of a solution, the solution comprising a major proportion of an aqueous alcoholic solvent and about 3 to 30 wt % of the polymeric composition based on the solution and the fiber retains a trace amount of solvent.

7. The system of claim 1 wherein the addition polymer comprises a polyvinyl halide polymer, a polyvinylidene halide polymer or mixtures thereof.

8. The system of claim 1 wherein the condensation polymer comprises a nylon polymer comprising a homopolymer having repenting units derived from a cyclic lactam.

9. The system of claim 1 wherein the condensation polymer comprises a nylon copolymer combined with a second nylon polymer, the second nylon polymer differing in molecular weight or monomer composition.

10. The system of claim 1 wherein the polymer comprises a polyvinylalcohol.

11. The system of claim 10 wherein the polyvinylalcohol is crosslinked with about 1 to 40 wt. % of a crosslinking agent.

12. The system of claim 8 wherein the nylon polymer is combined with a second nylon polymer, the second nylon polymer comprising an alkoxy alkyl modified polyamide.

13. The system of claim 12 wherein the polymers are treated to form a single polymeric composition as measured by a differential scanning calorimeter showing a single phase material.

14. The system of claim 1 wherein the polymer comprises a polyvinylchloride.

15. The system of claim 14 wherein the polyvinylchloride is crosslinked.

16. The system of claim 1 wherein the additive comprises an oligomer comprising tertiary butyl phenol.

17. The system of claim 16 wherein the additive comprises an oligomer comprising:

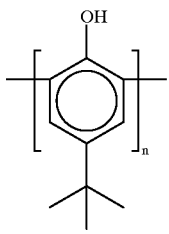

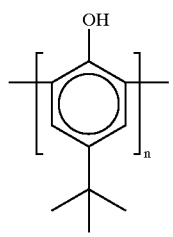

18. The system of claim 1 wherein the additive comprises an oligomer comprising bis-phenol A.

19. The system of claim 18 wherein the additive comprises:

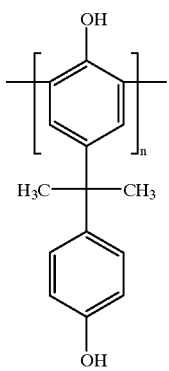

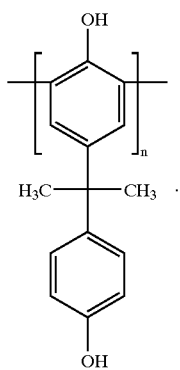

20. The system of claim 1 wherein the additive comprises an oligomer comprising dihydroxy substituted biphenyl.

21. The system of claim 20 wherein the additive comprises:

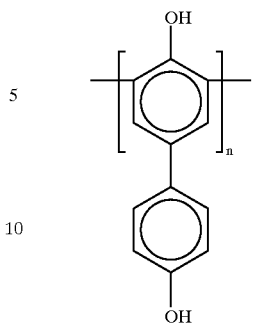

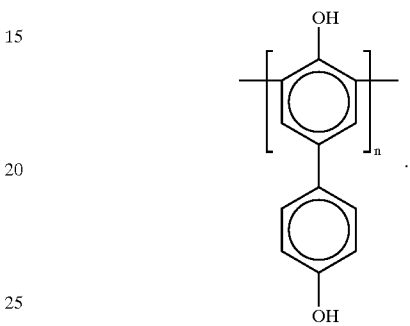

22. The system of claim 7 wherein the polyvinylidene halide comprises polyvinylidene chloride.

23. The system of claim 7 wherein the polyvinylidene halide comprises polyvinylidene fluoride.

24. The system of claim 11 wherein the crosslinked polyvinylalcohol is crosslinked using a polyacrylic acid having a molecular weight of about 1000 to 3000.

25. The system of claim 11 wherein the crosslinked polyvinylalcohol is crosslinked using a melamine-formaldehyde resin having a molecular weight of about 1000 to 3000.

26. A system according to claim 1 wherein:
   (a) the system includes an engine rated at an engine intake air flow of at least 100 cfm; and
   (b) the primary element has a size and construction providing far an initial restriction of no greater than 3 inches of $H_2O$, when evaluated at air flow rates of up to 600 cfm.

27. A system according to claim 26 wherein:
   (a) said pleated construction has a tubular shape and defines an open interior;
   (b) said air cleaner housing includes an airflow tube; said primary filter element being operably mounted on said airflow tube;
   (c) said primary filter element father includes:
      (i) a first, open end cap and a second, opposite end cap;
         (A) said media pack being bonded to said first end cap at said first end of said media pack;
         (B) said media pack being bonded to said second end cap at said second end of said media pack;
      (ii) an inner support liner extending between said first and cap and said second end cap;
      (iii) said first end cap including a radially or axially directed scaling portion;
         (A) said scaling portion being inwardly directed toward said open interior;

(B) said sealing portion comprising a polyurethane foam material compressed between and against said inner support liner and said airflow tube to form a first radial seal between said primary filter element and said air cleaner housing.

28. A system according to claim 27 wherein:
(a) said primary filter element further includes an outer support liner extending between said first and second end caps;
(b) said second end cap defines a center aperture; and
(c) said second end cap includes a sealing portion;
    (i) said sealing portion comprising a polyurethane foam material compressed between and against said outer support liner and said air cleaner to form a second radial seal between said primary filter element and said air cleaner housing.

29. A system according to claim 26 further including:
(a) a safety element operably installed in said air cleaner housing; said safety element including:
    (i) a pleated construction of a media composite; said safety element pleated construction including a plurality of pleats;
    (ii) said safety element pleated construction having a tubular shape and defining on open interior;
    (iii) a safety element first end cap and a safety element second end cap; said safety element pleated construction being bonded to and extending between said safety element first and second end caps;
        (A) said safety element first end cap being ring-shaped defining an opening;
        (B) said safety element second end cap being closed; and
    (iv) said safety element first end cap including an outwardly radially directed sealing portion; said outwardly radially directed sealing portion comprising a polyurethane material compressible to form a radial seal between said safety element and said air cleaner housing airflow tube.

30. A system according to claim 26 wherein:
(a) said pleated construction has a tubular shape and defines an open interior;
(b) said air cleaner housing includes a yoke arrangement to secure said housing to said primary filter element;
(c) said primary filter element further includes:
    (i) a first, open end cap and a second, opposite closed end cap;
        (A) said media pack being bonded to said first end cap at said first end of said media pack;
        (B) said media pack being bonded to said second end cap at said second end of said media pack;
        (C) said first end cap including an axially directed sealing potion;
    (d) said axially directed sealing portion being pressed against said air cleaner housing by said yoke arrangement to form an axial seal between said primary filter element and said air cleaner housing.

31. A system according to claim 26 wherein:
(a) said primary filter element includes first and second opposite end caps bonded to said pleated construction;
    (i) sad first end cap defining a plurality of air inlet apertures and an outlet tube;
        (A) said outlet tube being secured to an air intake conduit of said engine;
    (ii) said pleated construction being tubular in shape defining an open interior;
    (iii) said second end cap being closed; and
    (iv) said air cleaner housing being non-removably secured to said first and second end caps.

32. A system according to claim 26 wherein:
(a) said primary filter element comprises:
    (i) a panel filter construction having an outer perimeter;
    (ii) at least 40 pleats; each of said pleats having a pleat depth of at least 2 inches;
    (iii) an area within said outer perimeter of at least 35 square inches; and
    (iv) an outer gasket member along said outer perimeter comprising a polymeric material.

33. A system including a fluid compressor and having an air cleaner constructed and arranged to filter compressor intake air; the air cleaner including a housing and a primary filter element operably positioned therein, the primary filter element comprising:
(a) a media pack baying a first end and an opposite second end;
    (i) said media pack including a pleated construction of a media composite; said pleated construction including a plurality of pleats having a length extending from said first and to said second end, the substrate comprising a filter medium having an efficiency when tested with particles having a diameter of 0.01 to 1 $\mu$m; and
    (ii) said media composite including a substrate at least partially covered by a single layer;
        (A) said layer comprising a fine fiber having a diameter of about 0.01 to 0.5 microns such that after test exposure for a test period of 16 hours to test conditions of 140° F. air and a relative humidity of 100% retains greater than 30% of the fiber unchanged for filtration purposes, said fiber comprising a polymeric composition selected from the group consisting of:
            (1) an addition polymer and about 2 to 25 wt % of an additive, the additive comprising a resinous material having a molecular weight of about 500 to 3000 and an aromatic character, the additive being but forms a hydrophobic coating on the fiber miscible in the polymer,
            (2) a condensation polymer and about 2 to 25 wt % of an additive, the additive comprising a resinous material having a molecular weight of about 500 to 3000, and an aromatic character wherein the additive is miscible in the condensation polymer but forms a hydrophobic coating on the fiber, and
            (3) mixtures thereof.

34. The system of claim 33 wherein the polymer is a component of a solution, the solution comprising a major proportion of an aqueous alcoholic solvent and about 3 to 30 wt % of the polymeric composition based on the solution and the fiber retains a trace amount of solvent.

35. The system of claim 33 wherein the addition polymer comprises a polyvinyl halide polymer, a polyvinylidene halide polymer or mixtures thereof.

36. The system of claim 33 wherein the condensation polymer comprises a nylon polymer comprising a homopolymer having repeating units derived from a cyclic lactam.

37. The system of claim 33 wherein the condensation polymer comprises a nylon copolymer combined with a second nylon polymer, the second nylon polymer differing in molecular weight or monomer composition.

38. The system of claim 33 wherein the polymer comprises a polyvinylalcohol.

39. The system of claim 38 wherein the polyvinylalcohol is crosslinked with bout 1 to 40 wt. % of a crosslinking agent.

40. The system of claim 36 wherein the nylon polymer is combined with a second nylon polymer, the second nylon polymer comprising an alkoxy alkyl modified polyamide.

41. The system of claim 40 wherein the polymers are treated to form a single polymeric composition as measured by a differential scanning calorimeter showing a single phase material.

42. The system of claim 33 wherein the polymer comprises a polyvinylchloride.

43. The system of claim 42 wherein the polyvinylchloride is crosslinked.

44. The system of claim 33 wherein the additive comprises an oligomer comprising tertiary butyl phenol.

45. The system of claim 44 wherein the additive comprises an oligomer comprising:

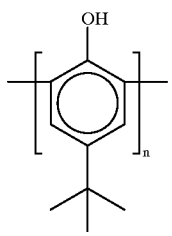

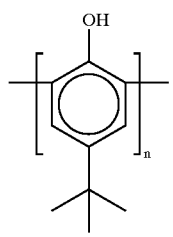

46. The system of claim 33 wherein the additive comprises an oligomer comprising bis-phenol A.

47. The system of claim 46 wherein the additive comprises:

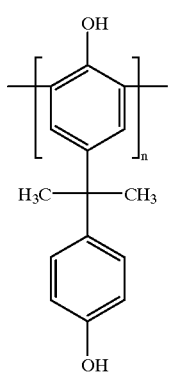

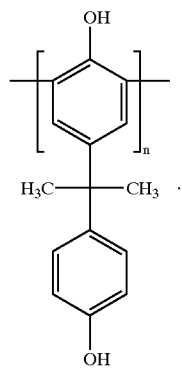

48. The system of claim 37 wherein the additive comprises an oligomer comprising dihydroxy substituted biphenyl.

49. The system of claim 18 wherein the additive comprises:

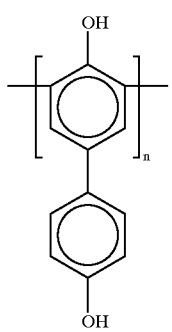

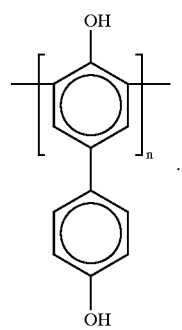

50. The system of claim 33 wherein the polymer is a component of a solution, the solution comprising a major proportion of an aqueous alcoholic solvent and about 3 to 30 wt % of the polymeric composition based on the solution.

51. The system of claim 35 wherein the polyvinylidene halide comprises polyvinylidene chloride.

52. The system of claim 35 wherein the polyvinylidene halide comprises polyvinylidene fluoride.

53. The system of claim 39 wherein the crosslinked polyvinylalcohol is crosslinked using a polyacrylic acid having a molecular weight of about 1000 to 3000.

54. The system of claim 39 wherein the crosslinked polyvinylalcohol is crosslinked using a melamine-formaldehyde resin having a molecular weight of about 1000 to 3000.

55. A system according to claim 33 wherein:
(a) the system includes an engine rated at an engine intake sir flow of at least 500 cfm; and
(b) the primary element has a size and construction providing for an initial restriction of no greater than 3 inches of H₂O, when evaluated at air flow rates of tip to 600 cfm.

56. A system according to claim 55 wherein:
(a) said pleated construction has a tubular shape and defines an open interior;
(b) said air cleaner housing includes an airflow tube; said primary filter element being operably mounted on said airflow tube;
(c) said primary filter element further includes:
   (i) a first, open end cap and a second, opposite end cap;
      (A) said media pack being bonded to said first end cap at said first end of said media pack;
      (B) said media pack being bonded to said second end cap at said second end of said media pack;
   (ii) an inner support liner extending between said first end cap and said second end cap;
   (iii) said tint end cap including a sealing portion;
      (A) said sealing portion being inwardly directed toward said open interior;
      (B) said sealing portion comprising a polyurethane foam material compressed between and against said inner support liner and said airflow tube to form a seal between said primary filter element and said air cleaner housing.

57. A system according to claim 56 wherein:
(a) said primary filter element further including an outer support liner extending between said first and second end caps;
(b) said second end cap defines a center aperture; and
(c) said second end cap includes a sealing portion;
   (i) said sealing portion comprising a polyurethane foam material compressed between and against said outer support liner and said air cleaner to form a second seal between said primary filter element and said air cleaner housing.

58. A system according to claim 55 further including:
(a) a safety element operably installed in said air cleaner housing; said safety element including:
   (i) a pleated construction of a media composite; said safety element pleated construction including a plurality of pleats;
   (ii) said safety element pleated construction having a tubular shape and defining an open interior;
   (iii) a safety element first end cap and a safety element second end cap; said safety element pleated construction being bonded to and extending between said safety element first and second end caps;
      (A) said safety element first end cap being ring-shaped defining an opening;
      (B) said safety element second end cap being closed; and
   (iv) said safety element first end cap including an outwardly radially directed sealing portion; said outwardly radially directed sealing portion comprising a polyurethane material compressible to form a radial seal between said safety element and said air cleaner housing airflow tube.

59. A system according to claim 55 wherein:
(a) said pleated construction has a tubular shape and defines an open interior;

(b) said air cleaner housing includes a yoke arrangement to secure said housing to said primary filter element;
(c) said primary filter element further includes:
   (i) a first, open end cap and a second, opposite closed end cap;
      (A) said media pack being bonded to said first end cap at said first end of said media pack;
      (B) said media pack being bonded to said second end cap at said second end of said media pack;
      (c) said first end cap including an axially directed sealing potion;
      (d) said axially directed sealing portion being pressed against said air cleaner housing by said yoke arrangement to form an axial seal between said primary filter element and said air cleaner housing.

60. A system according to claim 55 wherein:
(a) said primary filter element includes first and second opposite end caps bonded to said pleated construction;
   (i) said first end cap defining a plurality of air inlet apertures and an outlet tube;
      (A) said outlet tube being secured to an air intake conduit of said engine;
   (ii) said pleated construction being tubular in shape defining an open interior;
   (iii) said second end cap being closed; and
   (iv) said air cleaner housing being non-removably secured to said first and second end caps.

61. A system according to claim 55 wherein:
(a) said primary filter element comprises
   (i) a panel filter construction having an outer perimeter;
   (ii) at least 40 pleats; each of said pleats having a pleat depth of at least 2 inches;
   (iii) an area within said outer perimeter of at least 35 square inches; and
   (iv) an outer gasket member along said outer perimeter comprising a polymeric material.

62. A system according to claim 33 wherein:
(a) said pleated construction has a tubular shape and defines an open interior;
(b) said air cleaner housing includes a yoke arrangement to secure said housing to said primary filter element;
(c) said primary filter element further includes:
   (i) a first, open end cap and a second, opposite closed end cap:
      (A) said media pack being bonded to said first end cap at said first end of said media pack;
      (B) said media pack being bonded to said second end cap at said second end of said media pack;
      (C) said first end cap including an axially directed sealing portion;
      (D) said axially directed sealing portion being pressed against said air cleaner housing by said yoke arrangement to form an axial seal between said primary filter element and said air cleaner housing.

63. A system including a vehicle powered by a gas turbine engine end having an air cleaner constructed and arranged to filter gas turbine intake air; the air cleaner comprising:
(a) a media pack having a first filter panel and a second filter panel;
   (i) each of said first filter panel and second filter panel including a pleated construction of a media composite; said pleated construction, the substrate comprising a filter medium having an efficiency when tested with particles having a diameter of 0.01 to 1 μm including a plurality of pleats;

(ii) said media composite including a substrate at least partially covered by a single layer;
(A) said layer comprising a fine fiber having a diameter of about 0.1 to 0.5 microns such that after test exposure for a test period of 16 hours to test conditions of 140° F. air and a relative humidity of 100% retains greater than 30% of the fiber unchanged for filtration purposes; said fiber comprising a polymeric composition selected from the group consisting of:
(1) an addition polymer and about 2 to 25 wt % of an additive, the additive comprising a resinous material having a molecular weight of about 500 to 3000 and an aromatic character, the additive being miscible in the polymer but forms a hydrophobic coating on the fiber,
(2) a condensation polymer and about 2 to 25 wt % of an additive, the additive comprising a resinous material having a molecular weight of about 500 to 3000, and an aromatic character wherein the additive is miscible in the condensation polymer but forms a hydrophobic coating on the fiber, and
(3) mixtures thereof.

64. The system of claim 63 wherein the addition polymer comprises a polyvinyl halide polymer, a polyvinylidene halide polymer or mixtures thereof.

65. The system of claim 63 wherein the condensation polymer comprises a nylon polymer comprising a homopolymer having repeating units derived from a cyclic lactam.

66. The system of claim 63 wherein the condensation polymer comprises a nylon copolymer combined with a second nylon polymer, the second nylon polymer differing in molecular weight or monomer composition.

67. The system of claim 63 wherein the polymer comprises a polyvinylalcohol.

68. The system of claim 63 wherein the polyvinylalcohol is crosslinked with about 1 to 40 wt. % of a crosslinking agent.

69. The system of claim 65 wherein the nylon polymer is combined with a second nylon polymer, the second nylon polymer comprising an alkoxy alkyl modified polyamide.

70. The system of claim 69 wherein the polymers are treated to form a single polymeric composition as measured by a differential scanning calorimeter showing a single phase material.

71. The system of claim 63 wherein the polymer comprises a polyvinylchloride.

72. The system of claim 71 wherein the polyvinylchloride is crosslinked.

73. The system of claim 63 wherein the additive comprises an oligomer comprising tertiary butyl phenol.

74. The system of claim 73 wherein the additive comprises an oligomer comprising:

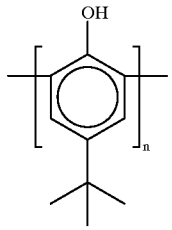

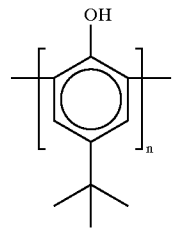

75. The system of claim 63 wherein the additive comprises an oligomer comprising bis-phenol A.

76. The system of claim 75 wherein the additive comprises:

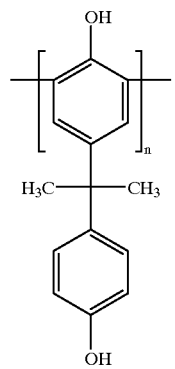

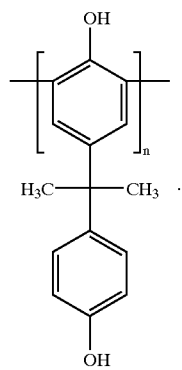

77. The system of claim 63 wherein the additive comprises an oligomer comprising dihydroxy substituted biphenyl.

78. The system of claim 77 wherein the additive comprises:

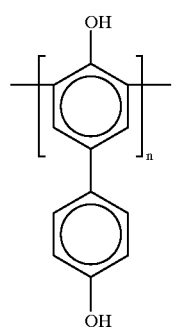

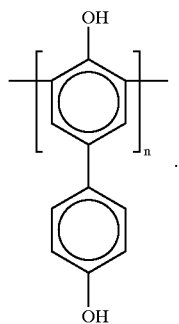

79. A system according to claim 63 wherein:
(a) said media pack includes a first end and a second end; and
(b) said first and second filter panels are oriented in a V-configuration and diverge from one another along a direction of extension from said first end to said second end to form a clean air space in said media pack between said first and second filter panels.

80. A method for filtering air, the air having a temperature of at least 140° F., the method comprising:
(a) directing the air through a media composite
 (i) the composite comprising a sheet-like substrate in a pleated construction, the substrate comprising a filter medium having an efficiency when tested with particles having a diameter of 0.01 to 1 μm; and
 (ii) the substrate at least partially covered by a single layer, the layer comprising a fine fiber having a diameter of about 0.1 to 0.5 microns such that after test exposure for a test period of 16 hours to test conditions of 140° F. air and a relative humidity of 100% retains greater than 30% of the fiber unchanged for filtration purposes, said fiber comprising a polymeric composition selected from the group consisting of:
  (A) an addition polymer and about 2 to 25 wt % of an additive, the additive comprising a resinous material having a molecular weight of about 500 to 3000 and an aromatic character, the additive being miscible in the polymer but forms a hydrophobic coating on the fiber,
  (B) a condensation polymer and about 2 to 25 wt % of an additive, the additive comprising a resinous material having a molecular weight of about 500 to 3000, and an aromatic character wherein the additive is miscible in the condensation polymer but forms a hydrophobic coating on the fiber; and
  (C) mixtures thereof.

81. A method according to claim 80 wherein:
(a) the step of directing the air through a media pack includes directing the air into an air intake conduit of an engine rated at an engine intake air flow of at least 3 cfm; the pleated construction having a tubular shape with a plurality of pleats extending between first and second opposite end caps.

82. A method according to claim 80 wherein the step of directing the air through a media pack includes directing the air into an air intake conduit of a fluid compressor and the pleated construction being a panel filter with at least 40 pleats each having a pleat depth of at least 2 inches.

83. A method according to claim 80 wherein:
(a) the step of directing the air through a media pack includes directing the air into an air intake conduit of a gas-turbine powered tank; the pleated construction including first and second pleated filter panels oriented in a V-configuration.

84. A filter element comprising:
(a) a media pack comprising:
 (i) a construction of a media composite; said construction including substrate having a plurality of pleats having a length extending from said first end to said second end, the substrate comprising a filter medium having an efficiency when tested with particles having a diameter of 0.01 to 1 μm;
 (ii) said construction having a tubular shape and defining an open interior having a first and a second opposite ends; and
 (iii) said substrate at least partially covered by a single layer;
  (A) said layer comprising a polymeric fine fiber having a diameter of about 0.01 to 0.5 microns such that after test exposure for a test period of 16 hours to test conditions of 140° F. air and a relative humidity of 100% retains greater than 30% of the fiber unchanged for filtration purposes, said fiber comprising a condensation polymer and about 2 to 25 wt % of an additive, the additive comprising a resinous material having a molecular weight of about 500 to 3000, and an aromatic character wherein the additive is miscible in the condensation polymer but forms a hydrophobic coating on the fiber, said condensation polymer comprising a copolymer other than a copolymer formed from a cyclic lactam and a $C_{6-10}$ diamine monomer or a $C_{6-10}$ diacid monomer;
(b) a first end cap and a second end cap;
 (i) said media pack being secured to said first end cap at said first end of said media pack;
 (ii) said media pack being secured to said second end cap at said second end of said media pack;
 (iii) at least one of said first and second end caps including a sealing portion; said sealing portion comprising a material compressible in a direction toward said media pack.

85. The element of claim 84 wherein the polymer of the fiber is formed from a component of a solution, the solution comprising a major proportion of an aqueous alcoholic solvent and about 3 to 30 wt % of the polymeric composition based on the solution and retains trace amounts of solvent in the fiber.

86. The element of claim 84 wherein the condensation polymer comprises a polyalkylene terephthalate.

87. The element of claim 84 wherein the condensation polymer comprises a polyalkylene naphthalate.

88. The element of claim 87 wherein the condensation polymer comprises a polyethylene terephthalate.

89. The element of claim 84 wherein the condensation copolymers is combined with a second nylon polymer, the second nylon polymer differing in molecular weight or monomer composition.

90. The element of claim 84 wherein the condensation copolymer is combined with a second nylon polymer, the second nylon polymer comprising an alkoxy alkyl modified polyamide.

91. A filter element according to claim 84 wherein:
(a) said first end cap is ring-shaped defining an open center and includes an inner surface facing the open center;
 (i) said sealing portion comprising said inner surface.

92. A filter element according to claim 84 further including:
(a) an inner support liner extending between said first end second end caps;
  (i) said inner support liner being between said scaling portion and said media pack.

93. A filter element according to claim 84 wherein:
(a) at least one of said first and second end caps includes an outer radial surface;
  (i) said scaling portion comprising said outer radial surface.

94. A filter element according to claim 84 further including:
(a) an inner support liner extending between said first and second and caps;
(b) an outer support liner, extending between said first and second end caps; and wherein:
  (i) each of said plurality of pleats bas a pleat length of at least 6 inches and a pleat depth of at least 1 inch.

95. The filter element of claim 63 wherein the vehicle comprises a military tank.

96. The filter element of claim 63 wherein the vehicle comprises a bus.

97. A method for filtering vehicle cabin ventilation air, the vehicle having a temperature of at least 140° F. during any period of operation, the method comprising:
(a) directing the air through a media composite
  (i) the composite comprising a substrate in a pleated construction, the substrate comprising a filter medium having an efficiency when tested with particles having a diameter of 0.01 to 1 μm; and
  (ii) the substrate at least partially covered by a single layer, the layer comprising a fine fiber having a diameter of about 0.1 to 0.5 microns such that after test exposure for a test period of 16 hours to test conditions of 140° F. air and a relative humidity of 100% retains greater than 30% of the fiber unchanged for filtration purposes, said fiber comprising a polymeric composition selected from the group consisting of:
  (A) an addition polymer and about 2 to 25 wt % of an additive, the additive comprising a resinous material having a molecular weight of about 500 to 3000 and an aromatic character, the additive being miscible in the polymer but forms a hydrophobic coating on the fiber,
  (B) a condensation polymer and about 2 to 25 wt % of an additive, the additive comprising a resinous material having a molecular weight of about 500 to 3000, and an aromatic character wherein the additive is miscible in the condensation polymer but forms a hydrophobic coating on the fiber; and
  (C) mixtures thereof.

98. A method according to claim 97 wherein:
(a) the step of directing the air through a media pack includes directing the air into an air intake conduit of an engine rated at an engine intake air flow of at least 3 cfm; the pleated construction having it tubular shape with a plurality of pleats extending between first and second opposite end caps.

99. A method according to claim 98 wherein the step of directing the air through a media pack includes directing the air into an air intake conduit of a fluid compressor and the pleated construction being a panel filter with at least 40 pleats each having a pleat depth of at least 2 inches.

100. A method according to claim 99 wherein:
(a) the step of directing the air through a media pack includes directing the air into an air intake conduit; the pleated construction including first and second pleated filter panels oriented in a V-configuration.

* * * * *

UNITED STATES PATENT AND TRADEMARK OFFICE
CERTIFICATE OF CORRECTION

PATENT NO. : 6,800,117 B2
DATED : October 5, 2004
INVENTOR(S) : Barris et al.

It is certified that error appears in the above-identified patent and that said Letters Patent is hereby corrected as shown below:

Column 47,
Line 48, "efficiency whom tested" should read -- efficiency when tested --

Column 48,
Line 14, "said scaling" should read -- said sealing --
Line 27, "second and caps;" should read -- second end caps; --
Line 42, "having repenting units" should read -- having repeating units --

Column 49,
Lines 5-24, The chemical diagram is duplicated. Delete the second chemical diagram.
Lines 35-60, The chemical diagram is duplicated. Delete the second chemical diagram.

Column 50,
Lines 1-25, The chemical diagram is duplicated. Delete the second chemical diagram.
Line 45, "providing far an" should read -- providing for an --
Line 63, "and cap and" should read -- end cap and --
Line 65, "directed scaling" should read -- directed sealing --
Line 66, "said scaling portion" should read -- said sealing portion --

Column 51,
Line 1, "said scaling portion" should read -- said sealing portion --
Line 12, "said scaling portion" should read -- said sealing portion --
Line 25, "defining on open" should read -- defining an open --
Line 54, paragraph beginning with lowercase (d) should be aligned under lowercase (c)
Line 62, "sad first" should read -- said first --

Column 52,
Line 17, "pack baying" should read -- pack having --
Line 22, "first and to" should read -- first end to --
Line 48, "fiber, and" should read -- fiber; and --

Column 53,
Line 2, "with bout" should read -- with about --
Lines 25-45, The chemical diagram is duplicated. Delete the second chemical diagram.

Column 53, Line 52 to Column 54, Line 15,
The chemical diagram is duplicated. Delete the second chemical diagram.

UNITED STATES PATENT AND TRADEMARK OFFICE
CERTIFICATE OF CORRECTION

PATENT NO. : 6,800,117 B2
DATED : October 5, 2004
INVENTOR(S) : Barris et al.

It is certified that error appears in the above-identified patent and that said Letters Patent is hereby corrected as shown below:

Column 54,
Line 18, "claim 37" should read -- claim 33 --
Line 21, "claim 18" should read -- claim 48 --
Lines 25-50, The chemical diagram is duplicated. Delete the second chemical diagram.

Column 55,
Line 3, "sir flow" should read -- air flow --
Line 6, "rates of tip" should read -- rates of up --
Line 23, "said tint" should read -- said first --
Line 32, "further including" should read -- further includes --

Column 56,
Line 10, "(c) said" should read -- (C) said --
Line 12, paragraph beginning with lowercase (d) should be aligned under lowercase (c)
Line 30, "element comprises" should read -- element comprises: --
Line 58, "engine end" should read -- engine and --

Column 57,
Line 8, "purposes; said" should read -- purposes, said --
Line 24, "fiber, and" should read -- fiber; and --
Line 39, "claim 63" should read -- claim 67 --

Column 57, Line 58 to Column 58, Line 10,
The chemical diagram is duplicated. Delete the second chemical diagram.

Column 58,
Lines 18-45, The chemical diagram is duplicated. Delete the second chemical diagram.

Column 58, Line 55 to Column 59, Line 14,
The chemical diagram is duplicated. Delete the second chemical diagram.

Column 59,
Line 24, "filtering air, the air" should read -- filtering air; the air --

Column 60,
Line 56, "copolymers is" should read -- copolymer is --

UNITED STATES PATENT AND TRADEMARK OFFICE
CERTIFICATE OF CORRECTION

PATENT NO. : 6,800,117 B2
DATED : October 5, 2004
INVENTOR(S) : Barris et al.

It is certified that error appears in the above-identified patent and that said Letters Patent is hereby corrected as shown below:

Column 61,
Line 3, "first end" should read -- first and --
Line 5, "said scaling" should read -- said sealing --
Line 10, "said scaling" should read -- said sealing --
Line 14, "and caps;" should read -- end caps; --
Line 15, "liner, extending" should read -- liner extending --
Line 17, "pleats bas a" should read -- pleats has a --

Column 62,
Line 23, "having it" should read -- having a --

Signed and Sealed this

Twenty-ninth Day of March, 2005

JON W. DUDAS
*Director of the United States Patent and Trademark Office*